United States Patent
Watts et al.

(10) Patent No.: US 10,521,095 B2
(45) Date of Patent: *Dec. 31, 2019

(54) SYSTEMS, COMPUTER IMPLEMENTED METHODS, GEOGRAPHIC WEATHER-DATA SELECTION INTERFACE DISPLAY, AND COMPUTER READABLE MEDIUM HAVING PROGRAM PRODUCTS TO GENERATE USER-CUSTOMIZED VIRTUAL WEATHER DATA AND USER-CUSTOMIZED WEATHER-RISK PRODUCTS RESPONSIVE THERETO

(71) Applicant: WATTS AND ASSOCIATES, INC., Billings, MT (US)

(72) Inventors: Tim J. Watts, Billings, MT (US);
Craig R. Landgren, Billings, MT (US);
Steven A. Loar, Billings, MT (US);
John Kuhling, Belgrade, MT (US);
Myles Watts, Bozeman, MT (US)

(73) Assignee: WATTS AND ASSOCIATES, INC., Billings, MT (US)

( * ) Notice: Subject to any disclaimer, the term of this patent is extended or adjusted under 35 U.S.C. 154(b) by 472 days.

This patent is subject to a terminal disclaimer.

(21) Appl. No.: 15/051,835

(22) Filed: Feb. 24, 2016

(65) Prior Publication Data

US 2016/0170627 A1 Jun. 16, 2016

Related U.S. Application Data

(63) Continuation of application No. 14/055,329, filed on Oct. 16, 2013, now Pat. No. 9,306,811, which is a
(Continued)

(51) Int. Cl.
*G06F 3/0481* (2013.01)
*G06F 3/0484* (2013.01)
(Continued)

(52) U.S. Cl.
CPC .......... *G06F 3/04847* (2013.01); *G01W 1/00* (2013.01); *G06F 3/0481* (2013.01);
(Continued)

(58) Field of Classification Search
CPC combination set(s) only.
See application file for complete search history.

(56) References Cited

U.S. PATENT DOCUMENTS

| | | |
|---|---|---|
| 5,796,932 A | 8/1998 | Fox et al. |
| 5,897,619 A | 4/1999 | Hargrove, Jr. et al. |

(Continued)

FOREIGN PATENT DOCUMENTS

| | | |
|---|---|---|
| JP | 1995168804 | 7/1995 |
| JP | 2007149013 | 6/2007 |

(Continued)

OTHER PUBLICATIONS

ADM Crop Risk Services—Crop Insurance, Products, Copyright 2012 (2 pages).
(Continued)

*Primary Examiner* — Tuyetlien T Tran
(74) *Attorney, Agent, or Firm* — Womble Bond Dickinson (US) LLP

(57) ABSTRACT

Systems, computer implemented methods, and computer readable medium having program products are provided to customize by a user weather-risk products and to provide a customized weather-risk product to be purchased by user. Embodiments of a system include a tract-user computer having a display to display graphical user interfaces to a user and an input to receive user selections, the tract-user computer being connected to a communications network to receive graphical user interfaces and transmit user selections to a weather-risk product issuer computer. Embodiments of a system can also include a database to associate user (Continued)

selections with actuarial data, location data, and basis weather data and a weather-risk product issuer computer to transmit graphical user interfaces to the tract-user computer, receive user selections, and process user selections to generate virtual weather data and to generate weather-risk products.

3 Claims, 46 Drawing Sheets

Related U.S. Application Data continuation of application No. 13/540,436, filed on Jul. 2, 2012, now Pat. No. 8,607,154.

(60) Provisional application No. 61/505,457, filed on Jul. 7, 2011.

(51) Int. Cl.
| | |
|---|---|
| *G06F 3/0482* | (2013.01) |
| *G06Q 10/10* | (2012.01) |
| *G06F 16/951* | (2019.01) |
| *G01W 1/00* | (2006.01) |
| *H04L 12/24* | (2006.01) |

(52) U.S. Cl.
CPC .......... *G06F 3/0482* (2013.01); *G06F 3/0484* (2013.01); *G06F 3/04817* (2013.01); *G06F 3/04842* (2013.01); *G06F 16/951* (2019.01); *G06Q 10/10* (2013.01); *H04L 41/22* (2013.01)

(56) References Cited

U.S. PATENT DOCUMENTS

| | | |
|---|---|---|
| 5,933,355 A | 8/1999 | Deb |
| 5,987,435 A | 11/1999 | Weiss et al. |
| 6,275,231 B1 | 8/2001 | Obradovich |
| 6,338,040 B1 | 1/2002 | Buman et al. |
| 6,339,747 B1 | 1/2002 | Daly et al. |
| 6,584,447 B1 | 6/2003 | Fox et al. |
| 6,865,542 B2 | 3/2005 | Cox et al. |
| 6,963,853 B1 | 11/2005 | Smith |
| 6,990,459 B2 | 1/2006 | Schneider |
| 7,039,592 B1 | 5/2006 | Yegge et al. |
| 7,343,346 B2 | 3/2008 | Frankel et al. |
| 7,490,050 B2 | 2/2009 | Grover et al. |
| 7,657,469 B1 | 2/2010 | Yegge et al. |
| 7,836,850 B2 | 11/2010 | Pratt |
| 7,844,475 B1 | 11/2010 | Murphy |
| 7,898,438 B2 | 3/2011 | Brosius |
| 7,904,332 B1 | 3/2011 | Merkley, Jr. et al. |
| 8,156,022 B2 | 4/2012 | Fell et al. |
| 8,160,952 B1 | 4/2012 | Fell et al. |
| 8,335,653 B2 | 12/2012 | Pruett et al. |
| 8,364,506 B2 | 1/2013 | Munger |
| 8,417,615 B2 | 4/2013 | Johannes |
| 8,543,427 B2 | 9/2013 | Noyes |
| 8,607,154 B2 | 12/2013 | Watts et al. |
| 8,688,483 B2 | 4/2014 | Watts et al. |
| 2001/0027437 A1 | 10/2001 | Turbeville et al. |
| 2002/0004705 A1 | 1/2002 | Baron et al. |
| 2002/0023052 A1 | 2/2002 | Remley et al. |
| 2002/0052795 A1 | 5/2002 | Dines |
| 2002/0059091 A1 | 5/2002 | Hay et al. |
| 2002/0091550 A1 | 7/2002 | White et al. |
| 2002/0095317 A1 | 7/2002 | McCabe |
| 2002/0134868 A1 | 9/2002 | Hansen |
| 2002/0173980 A1 | 11/2002 | Daggett et al. |
| 2002/0183867 A1 | 12/2002 | Gupta et al. |
| 2003/0061075 A1 | 3/2003 | Heckman et al. |
| 2003/0093302 A1 | 5/2003 | Quido et al. |
| 2003/0115158 A1 | 6/2003 | Richardson |
| 2004/0002890 A1 | 1/2004 | Barker et al. |
| 2004/0024692 A1 | 2/2004 | Turbeville |
| 2004/0103003 A1 | 5/2004 | Mayers et al. |
| 2004/0117238 A1 | 6/2004 | Inman et al. |
| 2004/0119759 A1 | 6/2004 | Barros |
| 2004/0215556 A1 | 10/2004 | Merkely, Jr. et al. |
| 2004/0230519 A1 | 11/2004 | Parker |
| 2004/0243299 A1 | 12/2004 | Scaer et al. |
| 2005/0024236 A1 | 2/2005 | Gosdin et al. |
| 2005/0027572 A1 | 2/2005 | Goshert |
| 2005/0027705 A1 | 2/2005 | Sadi et al. |
| 2005/0034075 A1 | 2/2005 | Riegelman et al. |
| 2005/0125260 A1 | 6/2005 | Green et al. |
| 2005/0151656 A1 | 7/2005 | Yuen |
| 2006/0015360 A1 | 1/2006 | Ochs et al. |
| 2006/0015374 A1 | 1/2006 | Ochs et al. |
| 2006/0282294 A1 | 12/2006 | McComb et al. |
| 2006/0282295 A1 | 12/2006 | McComb et al. |
| 2006/0282296 A1 | 12/2006 | Avey et al. |
| 2006/0287896 A1 | 12/2006 | McComb et al. |
| 2007/0073841 A1 | 5/2007 | Ryan et al. |
| 2007/0112511 A1 | 5/2007 | Burfeind et al. |
| 2007/0159355 A1 | 7/2007 | Kelly et al. |
| 2007/0174095 A1 | 7/2007 | McComb et al. |
| 2007/0174770 A1 | 7/2007 | Safoutin |
| 2007/0192120 A1 | 8/2007 | Cowles et al. |
| 2008/0040165 A1 | 2/2008 | Anderson et al. |
| 2008/0055154 A1 | 3/2008 | Martucci et al. |
| 2008/0086340 A1 | 4/2008 | Foresman et al. |
| 2008/0147417 A1 | 6/2008 | Friedberg |
| 2008/0154786 A1* | 6/2008 | Friedberg ............... G06Q 40/04 705/36 R |
| 2008/0167985 A1 | 7/2008 | Yarnall |
| 2008/0180282 A1 | 7/2008 | Brosius |
| 2008/0215473 A1 | 9/2008 | Cashman et al. |
| 2008/0221914 A1 | 9/2008 | Frankel et al. |
| 2008/0249955 A1* | 10/2008 | Friedberg ............... G06Q 40/04 705/36 R |
| 2008/0278311 A1 | 11/2008 | Grange et al. |
| 2008/0306776 A1 | 12/2008 | Fell et al. |
| 2008/0306777 A1 | 12/2008 | Fell et al. |
| 2008/0312987 A1 | 12/2008 | Damondaran et al. |
| 2009/0094099 A1 | 4/2009 | Linville |
| 2009/0112637 A1 | 4/2009 | Avey et al. |
| 2009/0153492 A1 | 6/2009 | Popp |
| 2009/0160873 A1 | 6/2009 | Kew et al. |
| 2009/0164256 A1 | 6/2009 | Fisher et al. |
| 2009/0164258 A1 | 6/2009 | Brookryk |
| 2009/0210256 A1 | 8/2009 | Upadhyayula et al. |
| 2009/0243852 A1 | 10/2009 | Haupt et al. |
| 2009/0316671 A1 | 12/2009 | Rolf |
| 2010/0057362 A1 | 3/2010 | Schilke et al. |
| 2010/0145862 A1 | 6/2010 | Chang |
| 2011/0054921 A1 | 3/2011 | Lynds |
| 2011/0106727 A1 | 5/2011 | Noyes |
| 2011/0178826 A1 | 7/2011 | Fell et al. |
| 2011/0196710 A1 | 8/2011 | Rao |
| 2011/0313795 A1 | 12/2011 | Phillips et al. |
| 2012/0123817 A1 | 5/2012 | Hohenberger et al. |
| 2012/0147030 A1 | 6/2012 | Hankers et al. |
| 2012/0310679 A1 | 12/2012 | Olson et al. |
| 2012/0330690 A1 | 12/2012 | Goslinga et al. |
| 2012/0330733 A1 | 12/2012 | Tiller et al. |
| 2013/0014046 A1 | 1/2013 | Walls et al. |
| 2013/0103593 A1 | 4/2013 | Walls et al. |
| 2013/0332205 A1* | 12/2013 | Friedberg ............... G06Q 40/08 705/4 |
| 2014/0006066 A1 | 1/2014 | Watts et al. |
| 2014/0012606 A1 | 1/2014 | Watts et al. |
| 2014/0012732 A1 | 1/2014 | Lindores |
| 2014/0047344 A1 | 2/2014 | Watts et al. |
| 2014/0172470 A1 | 6/2014 | Watts et al. |

FOREIGN PATENT DOCUMENTS

| | | |
|---|---|---|
| KR | 20020012704 | 2/2002 |
| WO | 2005114513 | 12/2005 |
| WO | 2008124598 | 10/2008 |

(56) References Cited

FOREIGN PATENT DOCUMENTS

| | | |
|---|---|---|
| WO | 2013022843 | 2/2013 |
| WO | 2013148290 | 6/2013 |
| WO | 2013184811 | 12/2013 |

OTHER PUBLICATIONS

Armtech Insurance Services, Product Brochures, Copyright 2012 (5 pages).
Armtech Insurance Services, Product Brochures, Copyright 2008 (6 pages).
Armtech Insurance Services, Product Brochures, Copyright 2008 (4 pages).
Great American Insurance Company, Products, Copyright 2008 Great American Insurance Company (1 page).
NAU Country Insurance Company, Snapshot of Website, Mar. 15, 2004 (1 page).
Rain and Hail, LLC, Crop-Hail Production Plan, General Summary, Mar. 8, 2012 (3 pages).
Rain and Hail, LLC, MPCI, Livestock, Crop-Hail, Private Products and Specialty Lines, Copyright 2000-2012 (3 pages).
Rain and Hail, LLC, Website, Jul. 15, 1997 (1 page).
Rain and Hail, LLC, Website Overview, West Des Moines, IA, Copyright 1996 (10 pages).
American Farm Bureau Insurance Services, Inc., Crop Hail, Copyright 2005 (2 pages).
AgriLogic Insurance Services, LLC, Products, Copyright 2009 (2 pages).
American Farm Bureau Insurance Services, Inc., Crop Hail, Copyright 2005 (1 pages).
Rain and Hail Agricultural Insurance, Rain and Hail Crop-Hail Endorsements, Copyright 2000-2013 Rain and Hail, LLC (2 pages).
Rain and Hail, LLC, Crop-Hail General Summary, Mar. 2, 2011 (1 page).
Global Ag Insurance Services, LLC, Products, Copyright 2012 (2 pages).
Great American Insurance Company, Crop Insurance—Products, Copyright 2012 (1 page).
Heartland Crop Insurance, Inc., Production Plan Hail Coverage, Copyright 2010 (1 page).
Heartland Crop Insurance, Inc., Companion Hail Coverage, Copyright 2010 (1 page).
Heartland Crop Insurance, Inc., Named Peril Coverage, Copyright 2010 (1 page).
Heartland Crop Insurance, Inc., Products, Copyright 2010 (1 page).
Heartland Crop Insurance, Inc., Supplemental Coverage, Copyright 2010 (1 page).
Heartland Crop Insurance, Inc., Traditional Crop-Hail Coverage, Copyright 2010 (1 page).
Hudson Insurance Group, Crop Hail Production Plan, Copyright 2012 (1 page).
Rain and Hail Agricultural Insurance, Private Stand Alone Programs, Copyright 2000-2013 (8 pages).
AFBIS, Inc., Website Screen Shot Showing Date of Brochure and Pasture, Rangeland and Forage Brochure, Nov. 2, 2012 (4 pages).
RCIS, Website Screen Shot Showing Date of RCIS Product Offerings (PDF) and RCIS Product Offerings Document, Apr. 29, 2013 (3 pages).
Deer & Company, John Deere Crop Insurance Policies & Crop Insurance Agents, Crop Insurance, Apr. 11, 2013 (3 pages).
Deere & Company, Private Products, Jul. 20, 2013 (22 pages).
Rain and Hail Agricultural Insurance/ACE Property and Casualty Insurance Company, May 2010 and Dec. 12, 2011 (45 pages).
Rain and Hail Agricultural Insurance/ACE Property and Casualty Insurance Company, May 2010 and Jun. 5, 2001 (37 pages).
Guide One Specialty Mutual Insurance Co., Citrus Fruit Freeze New Program Filing, Jul. 16, 2007 (63 pages).
Guide One Specialty Mutual Insurance Co., Crop Hail New Program Filing, Mar. 23, 2007 (69 pages).
ARMtech Insurance Services, APH-Based Crop Hail, Jul. 2013 (2 pages).
Guide One Specialty Mutual Insurance Co., Citrus Packers Business Interruption New Program Filing, Aug. 7, 2007 (63 pages).
Guide One Specialty Mutual Insurance Co., Crop-Hail New Filing, Mar. 1, 2002 (39 pages).
Guide One Specialty Mutual Insurance Co., Named Peril Crop Hail New Program Filing, Dec. 20, 2006 (49 pages).
Farmers Mutual Hail Insurance Company, Products and Crop Hail Agent Training Manual 2012 (90 pages).
Farmers Mutual Hail Insurance Company of Iowa, Crop Hail Form Filing, Dec. 4, 2012 (67 pages).
AgriLogic Insurance Services, LLC, Crop Replant Supplemental Insurance Coverage, 2013 (6 pages).
Occidental Fire & Casualty Company of North Carolina/AgriLogic Insurance Services, Crop Replant Option Forms Form Filing, Feb. 10, 2012 (52 pages).
American Agri-Business Insurance Company, Crop Hail Form Filing, Feb. 19, 2009 (18 pages).
North American Elite Insurance Company, Commercial Weather Form Filing, Dec. 27, 2012 (75 pages).
The Climate Corporation, Products, 2013 (7 pages).
Starr Indemnity & Liability Company, 2013 California Crop Hail Rates, Forms, & Rules Form/Rate/Rule Filing, Apr. 16, 2013 (155 pages).
GuideOne Mutual Insurance Company, 2013 GMI WI Form Filing, Dec. 11, 2012 (80 pages).
Diversified Crop Insurance Services, Yield Protection, Sep. 2010 (2 pages).
Diversified Crop Insurance Services, Revenue Protection, Oct. 2010 (2 pages).
Diversified Crop Insurance Services, Policies, 2013 (5 pages).
ARMtech Insurance Services, PRF Pasture, Rangeland, and Forage, May 25, 2014.
Hudson Insurance Group, Application for Named Peril Area Revenue Coverage (ARC) and Declaration Page, Overland, KS, Jan. 2012 (1 page).
Silveus Insurance Group, Corn ARC Coverage Level table, 2011 (1 page).
Cole, Shawn et al., The Effectiveness of Index-Based Micro-Insurance in Helping Smallholders Manage Weather-Related Risks, University of London, Jul. 2012 (84 pages).
Private Crop Insurers and the Reinsurance Fund Allocation Decision Keith H. Coble, Robert Dismukes, and Joseph W. Glauber; Amer. J. Agr. Econ. 89(3) (Aug. 2007). (14 pages).
Unknown, Monte Carlo method, May 5, 2012, Wikipedia.org. (13 pages).
Singerman, Ariel, et al., Demand for Crop Insurance by Organic Corn and Soybean Farmers in Three Major Producing States, Working Paper No. 10007, May 2010, Iowa State University, Ames, Iowa (27 pages).
Vedenov, Dmitry V., et al, Portfolio Allocation and Alternative Structures of the Standard Reinsurance Agreeement, Journal of Agriculture and Resource Economics 31 (57-73), Copyright 2006 Western Agricultural Economics Association (17 pages).
Shields, Dennis A., Federal Crop Insurance: Background, Congressional Research Service, Jul. 5700, Dec. 12, 2013 (28 pages).
Babcock, Bruce A., et al., Actuarial Fairness of Crop Insurance Rates with Constant Rate Relativities, Amer. J. Agr. Econ. 86(3), Aug. 2004, 563-575, Copyright 2004 American Agricultural Economics Association (13 pages).
Vedenov, Dmitry V., et al, Efficiency of Weather Derivatives as Primary Crop Insurance Instruments, Journal of Agricultural and Resource Economics 29(3) (387-403), Copyright 2004 Western Agricultural Economics Association (17 pages).
Lubben, Bradley D. et al., Analyzing Federal Farm Program and Crop Insurance Options to Assess Policy Design and Risk Management Implications for Crop Producers, Department of Agricultural Economics, University of Nebraska—Lincoln, Louisville, KY, Oct. 2013 (20 pages).
Coble, Keith H. et al., Implications of Crop Yield and Revenue Insurance for Producer Hedging, Journal of Agricultural and Resource

(56) References Cited

OTHER PUBLICATIONS

Economics 25(2) (432-452), Copyright 2000 Western Agricultural Economics Association (21 pages).
PCT/US12/45387 Search Report and Written Opinion dated Nov. 2, 2012 (11 pages).

* cited by examiner

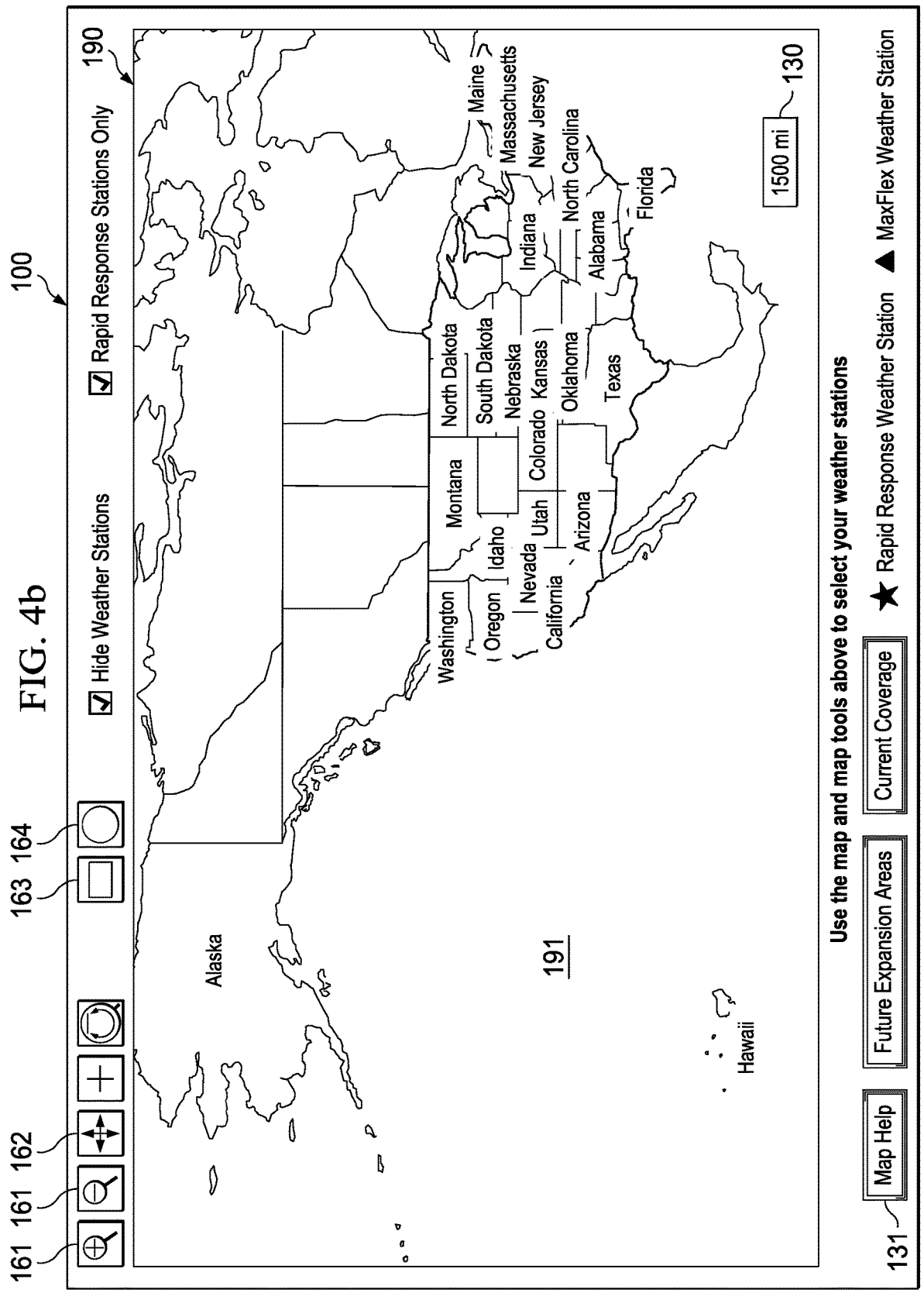

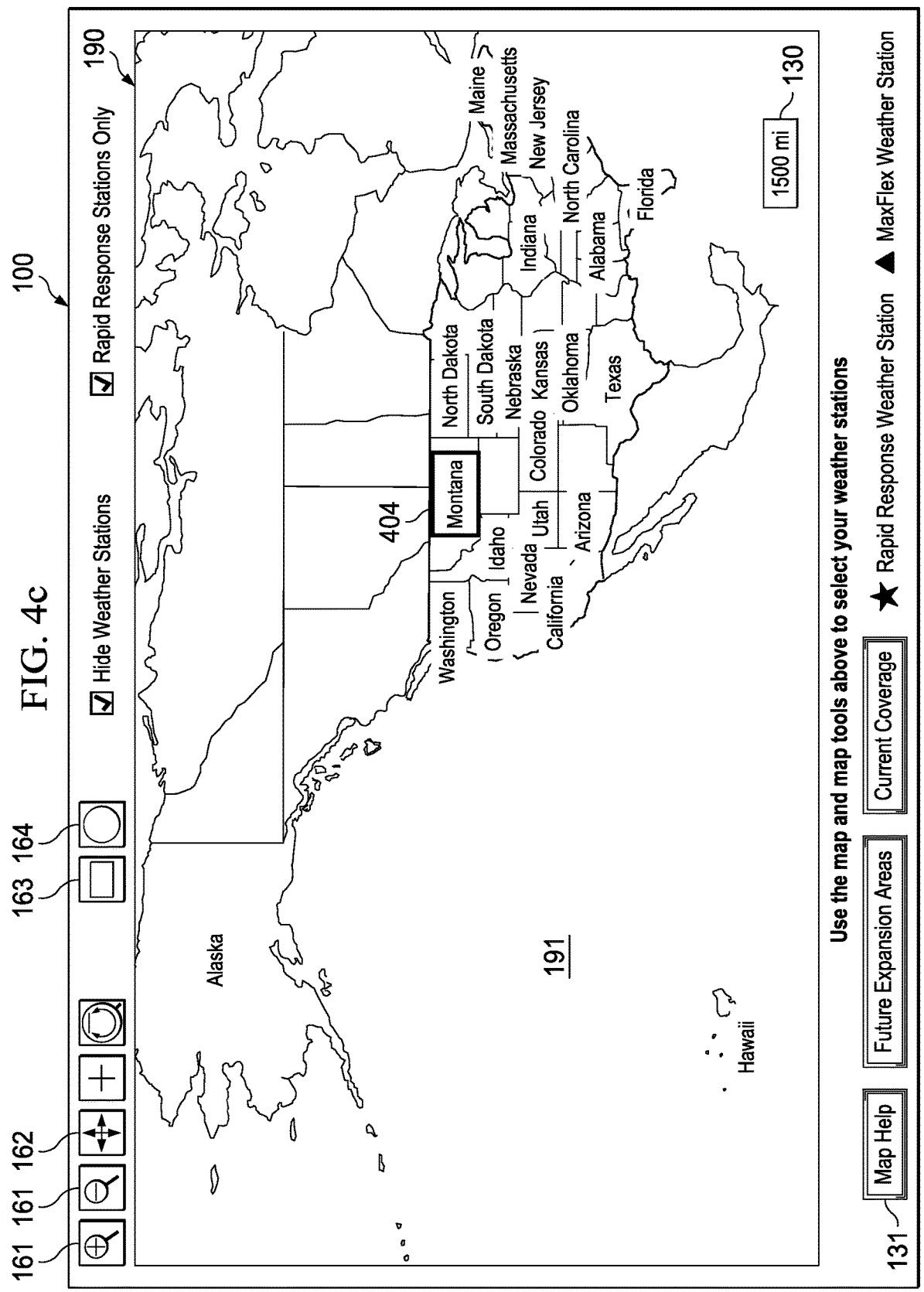

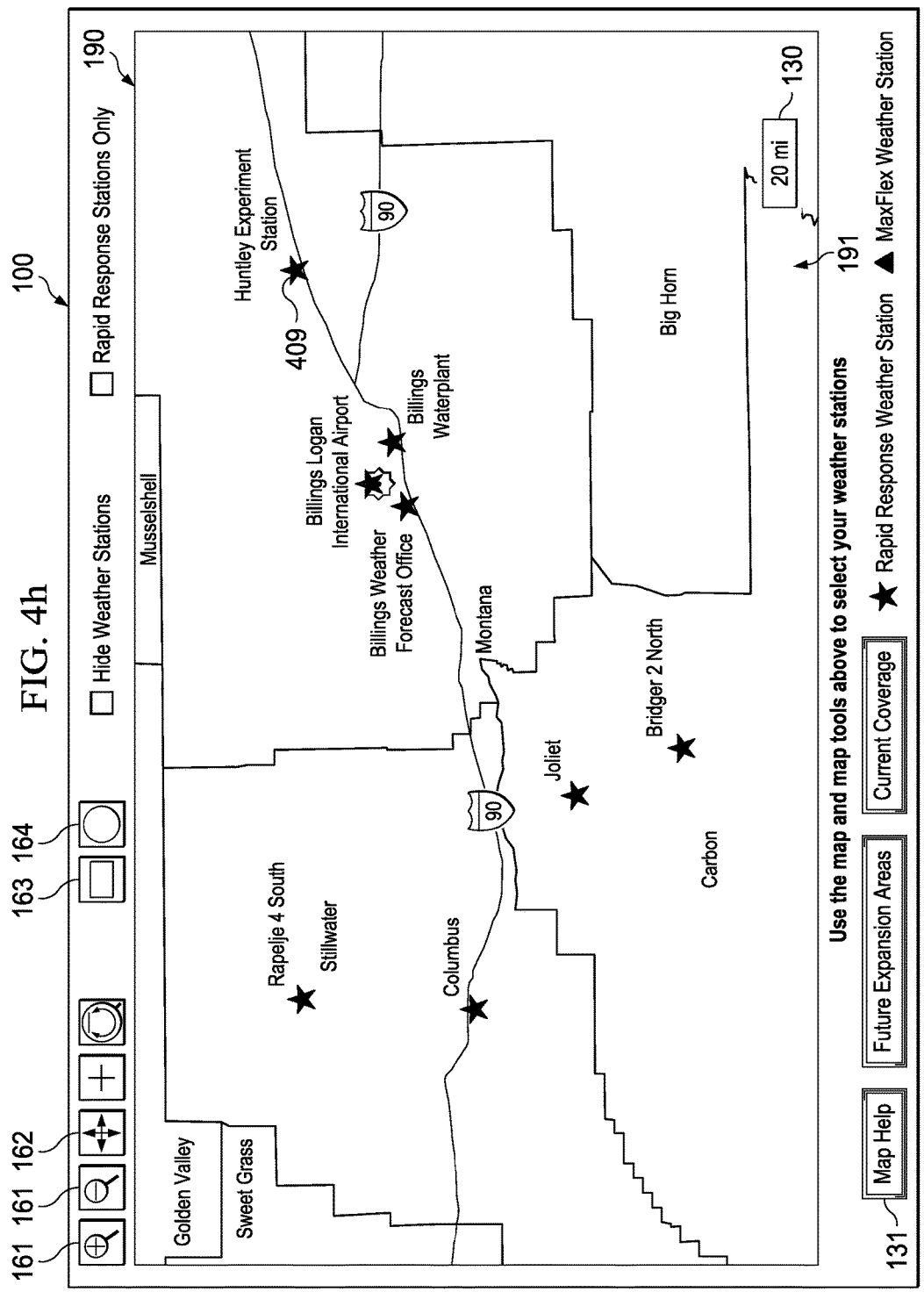

FIG. 6d

Contract Amount in US$: 100000
Contract Name: Montana Demo

Weather Concern
Cold ▼ [?] ← 613

Type of Weather Risk
Lowest Daily Temperature in Period ▼ [?] ← 615

620 {

Risk Start Date — 621
May 2011
| Su | Mo | Tu | We | Th | Fr | Sa |
|----|----|----|----|----|----|----|
| 24 | 25 | 26 | 27 | 28 | 29 | 30 |
| 1  | 2  | 3  | 4  | 5  | 6  | 7  |
| 8  | 9  | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 1  | 2  | 3  | 4  |

Risk End Date — 622
May 2011
| Su | Mo | Tu | We | Th | Fr | Sa |
|----|----|----|----|----|----|----|
| 24 | 25 | 26 | 27 | 28 | 29 | 30 |
| 1  | 2  | 3  | 4  | 5  | 6  | 7  |
| 8  | 9  | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 1  | 2  | 3  | 4  |

[Confirm Risk Selection] — 614

[Submit Risk Info] — 623

600

[Reset Weather Risk] — 602

[Reset Page] — 601

FIG. 6e

Contract Amount in US$: 100000
Contract Name: Montana Demo

Weather Concern: Cold [?] — 613

Type of Weather Risk: Lowest Daily Temperature in Period [?] — 615

620 {

Risk Start Date — 621
May 2011
| Su | Mo | Tu | We | Th | Fr | Sa |
|---|---|---|---|---|---|---|
| 24 | 25 | 26 | 27 | 28 | 29 | 30 |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 1 | 2 | 3 | 4 |

Risk End Date — 622
May 2011
| Su | Mo | Tu | We | Th | Fr | Sa |
|---|---|---|---|---|---|---|
| 24 | 25 | 26 | 27 | 28 | 29 | 30 |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 1 | 2 | 3 | 4 |

Effect Begins at: 30 °F — 624
100% Damage at: 20 °F — 625

[Submit Risk Info] — 623

[Confirm Risk Selection] — 614

630 {
Observations between 5/15 and 5/31 for Excessive Cold Peril — 634
Minimum Value: 27.00 — 631
Average Value: 34.95 — 632
Maximum Value: 44.00 — 633

[Reset Page] — 601
[Reset Weather Risk] — 602

Contract Amount in US$: 100000
Contract Name: Montana Demo

Weather Concern
Cold

Type of Weather Risk
Custom Degree Days

621 — Risk Start Date
May 2011
Su Mo Tu We Th Fr Sa
24 25 26 27 28 29 30
1 2 3 4 5 6 7
8 9 10 11 12 13 14
15 16 17 18 19 20 21
22 23 24 25 26 27 28
29 30 31 1 2 3 4

622 — Risk End Date
May 2011
Su Mo Tu We Th Fr Sa
24 25 26 27 28 29 30
1 2 3 4 5 6 7
8 9 10 11 12 13 14
15 16 17 18 19 20 21
22 23 24 25 26 27 28
29 30 31 1 2 3 4

620

Effect Begins at: 5 Degree Days — 624
100% Damage at: 15 Degree Days — 625

Submit Risk Info — 623

Observations between 5/15 and 5/31 for Cumulative Excessive Cold Peril — 634
Minimum Value: 0.00 — 631
Average Value: 2.43 — 632
Maximum Value: 15.00 — 633

630

Threshold Temperature: 35 °F — 641

Weather Observation to Use — 640
⦿ Minimum Temperature
○ Average Temperature — 642
○ Maximum Temperature

Weather Concern
⦿ Excessive Degree Days — 643
○ Insufficient Degree Days

Confirm Risk Selection — 614

Reset Page — 601
Reset Weather Risk — 602

| Friendly Name | Weather Risk | Contract Begins | Contract Ends | Contract Amount | Premium | Contract | Contract ID |
|---|---|---|---|---|---|---|---|
| NY Holiday Excessive Cold | Excessive Cold | 11-22-2009 | 12-20-2009 | $1,000,000 | $117,118 | Pending Payment Posting | 100061 |
| Tucson July09 CuExMoist | Excessive Cumulative Precipitation | 7-1-2008 | 7-31-2008 | $50,000 | $5,161 | View Settlement | 100064 |
| SeaTac Ex Cu Precip | Excessive Cumulative Precipitation | 9-1-2009 | 9-30-2009 | $100,000 | $7,670 | Pay for Contract | 100059 |

FIG. 15c

Selected Contract Information for SeaTac Ex Cu Precip - Contract ID 100059 — 1531

| | | |
|---|---|---|
| Weather Peril: | Excessive Cumulative Precipitation | |
| Peril Begin Date: | 9/1/2009 | Contract Rate: 0.076673 |
| Damage Begins At: | 3 | Peril End Date: 9/30/2009 |
| Contract Amount: | $100,000 | 100% Settlement Payout At: 5 |
| | | Total Premium: $7,670 |

Weather Station Information for this Contract — 1533

| Station Name | Station ID | Weighting |
|---|---|---|
| Renton Municipal Airport | 9999994248 | 50% |
| Seattle Seattle-tacoma Intl A | 4574732433 | 50% |

1532

Payment Types

(additional fees may apply depending on payment choice)

1534
- ○ Purchase Contract with an Electronic Check (ACH)
- ○ Send a Wire Transfer
- ⊙ Send a paper check
- ○ Standing Credit Agreement Please send your payment of $7,670 to the following address:

Custom Weather Contract Payments
Attn Contract Number: 100059
P.O. Box 123

[ I have sent payment ] — 1535

Your payment must be received within 5 business days or this contract will be cancelled. Your contract will be valid when we have received payment and all US Federal Regulations regarding this transaction have been addressed. You will receive an email confirmation when this contract is in ef

| Friendly Name | Weather Risk | Contract Begins | Contract Ends | Contract Amount | Premium | Contract | Contract ID |
|---|---|---|---|---|---|---|---|
| NY Holiday Excessive Cold | Excessive Cold | 11-22-2009 | 12-20-2009 | $1,000,000 | $117,118 | Pending Payment Posting | 100061 |
| Tucson July09 CuExMoist | Excessive Cumulative Precipitation | 7-1-2008 | 7-31-2008 | $50,000 | $5,161 | View Settlement | 100064 |
| SeaTac Ex Cu Precip | Excessive Cumulative Precipitation | 9-1-2009 | 9-30-2009 | $100,000 | $7,670 | View Settlement | 100059 |

SYSTEMS, COMPUTER IMPLEMENTED METHODS, GEOGRAPHIC WEATHER-DATA SELECTION INTERFACE DISPLAY, AND COMPUTER READABLE MEDIUM HAVING PROGRAM PRODUCTS TO GENERATE USER-CUSTOMIZED VIRTUAL WEATHER DATA AND USER-CUSTOMIZED WEATHER-RISK PRODUCTS RESPONSIVE THERETO

RELATED APPLICATION

The present application is a continuation of and claims priority to and benefit of U.S. patent application Ser. No. 14/055,329, titled "Systems, Computer Implemented Methods, Geographic Weather-Data Selection Interface Display, and Computer Readable Medium Having Program Products to Generate User-Customized Virtual Weather Data and User-Customized Weather-Risk Products Responsive Thereto, and filed Oct. 16, 2013, which is a continuation of U.S. patent application Ser. No. 13/540,436, titled "Systems, Computer Implemented Methods, Geographic Weather-Data Selection Interface Display, and Computer Readable Medium Having Program Products to Generate User-Customized Virtual Weather Data and User-Customized Weather-Risk Products Responsive Thereto" and filed Jul. 2, 2011, now U.S. Pat. No. 8,607,154, issued Dec. 10, 2013, which is a non-provisional application that relates to, claims priority to, and claims the benefit of U.S. Provisional Application Ser. No. 61/505,457, titled "Systems, Computer Implemented Methods, and Computer Readable Program Products to Generate User-Customized Virtual Weather Data and User-Customized Weather-Risk Products Responsive Thereto" and filed on Jul. 7, 2011, each of which is incorporated herein by reference in its entirety.

BACKGROUND OF THE INVENTION

1. Field of the Invention

Embodiments of the present invention relate generally to the field of weather-risk management. More specifically, embodiments of the present invention allow a user to customize a virtual weather-data station so that weather-risk products can be customized and generated responsive thereto.

2. Description of Related Art

Many businesses face economic risks associated with weather. Conventional weather-risk management tools are extremely technical (i.e., accessible only to experts), require long periods of time for statistical analysis, or are characterized by substantial basis risk (i.e., the location of the weather monitoring location is distant from the location of the business at risk). Several attempts have been made by others to offer an automated, real-time, weather-risk management systems for the sales of weather derivatives. For example, various internet sites have marketed weather-index-based derivatives, but none of these have offered an intuitive user interface to customize the configuration of weather derivatives; a user-controlled, automated multiple-weather-station basis; a user-controlled, automated multiple-risk basis; and the ability to close the sale of a weather-risk derivative over the internet.

In further detail, conventional systems for weather-risk management exhibit several disadvantages that limit the ability of a weather-risk product to accurately reflect the actual weather-related risk for a particular land area relating to the coverage of the weather-risk product ("a covered area"). Such disadvantages relate, most generally, to the fact that weather-risk products are, conventionally, generated based on historical weather readings at a point (e.g., a weather station) that may not accurately reflect the weather risk for a covered area not congruent with that weather station. The difference between the historical weather readings at such a weather station and the actual weather (historical or future) for the covered area can be referred to as "basis error." The potential for basis error is disadvantageous for both the buyers and sellers of weather-risk products because the terms of an error-based weather-risk product may favor one party or the other depending on the nature of the basis error. A weather-risk product buyer, for example, may suffer by paying a higher premium or by not receiving payment (i.e., settlement) for coverable weather events due to basis error. And on the other hand, a weather-risk product seller or provider, for example, may suffer by receiving a lower premium from the buyer or by over-paying for coverable weather events.

SUMMARY OF THE INVENTION

Embodiments of the invention provide access to a wide variety of weather-risk management instruments and address the foregoing problems in conventional weather-risk management. For example, applicants provide solutions that overcome problems in the art due to highly technical interfaces, requirements for intensive manual statistical analysis, or substantial risk of basis error ("basis risk"). Applicants recognize, for example, that existing weather-risk management tools, such as weather-rated, weather-adjusted derivative products, for minor agricultural crops (collectively), exhibited substantial basis risk and were not easily accessible to many markets because of the complexity of their structures and the jargon employed therein so as to facilitate trading in derivatives markets.

Applicants recognize the foregoing disadvantages, and applicants further recognize that the foregoing disadvantages are most acute when a weather station relied upon in generating or settling a weather-risk product is not selected or weighted uniquely for the covered area or for the type of weather risk. Moreover, applicants recognize that one or more weather stations relied upon in generating or settling a weather-risk product can more effectively be uniquely selected or weighted for the covered area and for the type of weather risk by a user that is knowledgeable of the geographic and meteorological characteristics of the covered area and various related weather stations. Applicants also recognize that one or more weather stations relied upon in generating or settling a weather-risk product can more effectively be uniquely selected or weighted for the covered area and for the type of weather risk by a user that is knowledgeable of the risk portfolio for the covered area, for example, including weather risk associated with one or more uses of the covered area.

Applicants provide embodiments of the present invention to allow a user, using a user interface display that is displayed, for example, on a computer, to uniquely select or weight a plurality of weather stations for the covered area and for the type of weather risk, and the unique user selections and weightings are used in generating and settling customized weather risk products for the user. Embodiments of the present invention, for example, allow a user to customize a virtual weather-data station so that weather-risk products can be customized and generated responsive thereto.

Applicants further recognize that weather stations relied upon in generating and settling a weather-risk product can more effectively be uniquely selected or weighted for the covered area and for the type of weather risk by a user when, immediately before generating the weather-risk product, the user is able to interactively: (i) graphically select a plurality of weather stations that is unique for the covered area; (ii) simulate the historical performance of a proposed weather-risk product according to the unique selections and weightings, (iii) to confirm the suitability of the proposed weather-risk product with respect to the historical weather events corresponding to a particular risk type at the covered area, and (iv) if need be, revise the unique selections or weightings based on the original simulation for the purposes of generating a new simulation with respect to the revised unique selections or weightings.

Although such embodiments advantageously allow a user to minimize basis risk, embodiments of the present invention are not so limited for such a purpose, and embodiments of the invention can also be utilized by a user who is not primarily intending to minimize basis risk, for example, a user intending to graphically select a plurality of user-selected weather stations. Embodiments of the present invention advantageously allow a user to graphically select a plurality of user-selected weather stations, which can be systematically weighted on an equal basis so as to simplify and minimize the degree of analysis and interaction with the user interface display required of the user.

Applicants further provide an enhanced weather-risk management system incorporating enhanced weather data management algorithms; a simple user interface; enhanced algorithms to generate the weather-risk product; user-controlled, automated multiple-station indices; user-controlled, automated multiple-risk structure; or elements of an enhanced historical weather record reporting. Embodiments of the invention provide, for example, a weather-risk management derivative platform built upon an enhanced temperature and precipitation dataset and a user-friendly, web-based mechanism to customize and market weather derivatives over the Internet. The user-performed customization is supported by enhanced algorithms and software that automate real-time-evaluation of the probability and severity of user-selected weather-risks and by a highly customizable set of basis weather data.

Certain embodiments of the invention provide systematic and web-deployed sales and settlement of weather-risk products. In such embodiments, weather-risk products are generated systematically responsive to a custom risk assessment rating, which can be determined immediately upon receiving a user's (i.e., a potential customer) selections with respect to a user-defined risk-management approach. Further yet, certain embodiments of the invention allow a user to make selections with respect to a user-defined risk-management approach including selections for temperature or precipitation risks and selections of a custom geographic coverage area. Even further yet, certain embodiments of the invention allow users to explore the costs and historical performance for a user-defined risk-management approach, redefine a new user-defined risk management approach if the costs and historical performance are unsatisfactory, and explore the costs and historical performance of the new user-defined risk-management approach, to be repeated as it suits the user. Enhanced systematic risk analysis according to embodiments of the invention advantageously encourages customers to explore the potential costs and simulate historical performance of a variety of risk management approaches. Beneficially, the weather-risk product provider can enhance the potential that a user will perceive one or more of the user-defined approaches to be suitable and commit to purchase a risk-management product for such an approach.

Any of the foregoing user-related functions of the invention can be implemented using one or more enhanced graphical user interfaces, e.g., using a user computer display, to facilitate interaction between the user and the systematic elements of the of the invention, e.g., on a server computer processor. Elements of enhanced graphical user interfaces according to embodiments of the present invention can be provided so as to be familiar to virtually any potential user, for example, by using a readily-recognizable geographic map image and references to simple weather-related concepts, such as temperature (or precipitation) minima and maxima.

In certain embodiments, weather-risk products can be generated responsive to an enhanced weather dataset. The enhanced weather dataset can be created, for example, using National Climate Data Center (NCDC) data having daily weather readings for each of a plurality of weather stations, which can be cleaned, filled, and back-cast as needed using various algorithms. There can be different types of weather stations, for example, including "informational" and "enhanced" weather stations. Informational stations are stations having data that can be utilized in filling missing and backcasting historical data for each of the enhanced weather stations. Enhanced stations are stations to be potentially utilized according to embodiments of the invention. Given that more stations report daily precipitation (PRCP) data than minimum temperature (TMIN), and maximum temperature (TMAX) data, embodiments of the invention are able to systematically "fill" or "backcast" the weather readings of each enhanced weather station, independently, using data from all suitable informational stations reporting a type of weather reading on a given day. Embodiments of the invention contemplate using various algorithms to identify suitable informational and enhanced stations, some of which are described herein and are within the scope of embodiments of the invention.

In embodiments of the invention allowing a user to select a customized geographic scale, the enhanced weather dataset includes customized or "virtual" weather data responsive to the user's selections. Virtual weather data can include, for example, weighted weather data from one or more user-selected weather stations. The virtual weather data can be said to be sourced from a virtual weather-data station, which represents an ideal, hypothetical weather station having virtual weather data that most accurately reflects the weather for the covered area. Accordingly, the enhanced weather dataset can provide, for example, substantially more data-sampling locations than have been available in conventional weather-risk management solutions and thereby minimize the potential for basis error and basis risk.

Basis error can be introduced, for example, by reliance on weather readings from a single weather station that is not within the covered area or when there is a significant variance between the weather at the weather station and the weather on the covered area. For example, a risk product may be based on weather readings from a weather station that is at a higher altitude than the covered area and experiences weather that is inconsistent with that of the covered area. Basis error can be introduced, for example, by reliance on weather readings from more than one weather station not within the covered area or when there is a significant variance among the weather at the different weather stations or there is a significant variance between the weather at one or more of the weather stations and the weather at the covered area. For example, a risk product may be based on weather readings from weather stations, some of which are at the same altitude and others of which are at a different altitude than the covered area and any of which can experience weather that is inconsistent from that of each other and of the covered area.

Basis error can also be introduced, for example, by reliance on an incomplete history of weather readings from one or more weather stations. A history of weather readings can be incomplete, for example, if it is missing data within the reporting timeframe for the weather station (such as due to an outage or an infrequent reporting rate) or if it is missing data outside of the reporting timeframe for the weather station (such as for a newly-installed weather station with respect to weather readings before the installation).

An exemplary embodiment of the invention includes a system to customize a weather-risk product for a tract by a user and to provide a customized weather-risk product for a tract to be purchased by user.

An exemplary system can include, for example, a tract-user computer having a display device to display one or more graphical user interfaces to a user and one or more input devices to receive one or more user selections at the one or more graphical user interfaces. The tract-user computer can be connected to a communications network so that the tract-user computer can receive the one or more graphical user interfaces and transmit the one or more user selections to a remote computer, such as a weather-risk product issuer computer.

An exemplary system can also include, for example, a database to associate the one or more user selections with one or more of weather-risk actuarial data, weather-station location data for each of a plurality of weather stations, and weather-station basis weather data for each of the plurality of weather stations.

An exemplary system can also include, for example, a weather-risk product issuer computer connected to the database and to the communications network. The weather-risk product issuer computer can be owned, operated, or maintained, for example, by a risk-product issuing entity. The weather-risk product issuer computer can transmit the one or more graphical user interfaces to the tract-user computer, receive the one or more user selections, and process the one or more user selections to generate a virtual weather data for a tract and to generate a weather-risk products for the tract.

In an exemplary system, the weather risk product issuer computer can include, for example, a processor, a non-transitory memory positioned in communication with the processor to store computer program product therein, and an input/output unit connected to the processor and the non-transitory memory, the input/output unit adapted to be in communication with one or more tract-user computers through the communications network to transmit one or more graphical user interfaces to the one or more tract-user computers and to receive one or more user selections responsive thereto.

In an exemplary system, the weather risk product issuer computer can include, for example, a computer program product, defining a virtual weather-data-station designer, stored in the non-transitory memory and operable on the processor, the virtual weather-data-station designer having a set of instructions that, when executed by the processor, cause the processor to perform one or more operations as can be shown with reference to FIG. 10.

One operation that can be performed by the processor of the weather-risk product issuer computer in an exemplary system includes, for example, generating 300 a geographic weather-data selection interface to display at the tract-user computer. The geographic weather-data selection interface can include a geographic map image corresponding to a geographic coordinate system, a plurality of weather-station markers being overlaid on the geographic map image, each of the plurality of weather-station markers being positioned thereon responsive to weather-station location data corresponding to the geographic coordinate system. The geographic weather-data selection interface allows a user at the tract-user computer to graphically select a plurality of geographic parameters for the tract by positioning a cursor on the geographic map image at one or more positions corresponding to a tract location in the geographic coordinate system, each of plurality of geographic parameters corresponding to the geographic coordinate system, and to transmit the plurality of geographic parameters to the weather-risk product issuer computer.

Another operation that can be performed by the processor of the weather-risk product issuer computer in an exemplary system includes, for example, determining 305 a plurality of weather-station identifiers responsive to receiving the plurality of geographic parameters from the tract-user computer, each of the plurality of weather-station identifiers corresponding to the weather-station location data for a respective weather station having a weather-station location near the tract location in the geographic coordinate system.

Another operation that can be performed by the processor of the weather-risk product issuer computer in an exemplary system includes, for example, generating 308 a source selection interface to display at the tract-user computer responsive to the plurality of weather-station identifiers, the source selection interface allowing the user to select a plurality of user-selected weather-station identifiers and a plurality of user-selected weather-station weights, each of the plurality of the user-selected weather-station identifiers corresponding to one of the plurality of user-selected weather-station weights, and to transmit to the weather-risk product issuer computer the plurality of user-selected weather-station identifiers and the plurality of user-selected weather-station weights.

Another operation that can be performed by the processor of the weather-risk product issuer computer in an exemplary system includes, for example, storing 30A the plurality of user-selected weather-station identifiers and the plurality of user-selected weather-station weights in the non-transitory memory, responsive to receiving each of the plurality of user-selected weather-station identifiers and the plurality of user-selected weather-station weights from the tract-user computer, so that virtual weather data for the tract may be generated responsive thereto.

In an exemplary system, the weather risk product issuer computer can include, for example, a computer program product, defining a virtual weather-data generator, stored in the non-transitory memory and operable on the processor, the virtual weather data generator having a set of instructions that, when executed by the processor, cause the processor to perform one or more operations as can be shown with reference to FIG. 10.

One operation that can be performed by the processor of the weather-risk product issuer computer in an exemplary system includes, for example, determining 314 a plurality of station-specific weather histories responsive to the plurality of user-selected weather-stations, each of the plurality of station-specific weather histories corresponding to a respective weather station for the each of the plurality of user-selected weather-station identifiers.

Another operation that can be performed by the processor of the weather-risk product issuer computer in an exemplary system includes, for example, generating 316 virtual weather data responsive to the plurality of station-specific weather histories and the plurality of user-selected weather-station weights, each of the plurality of station-specific weather histories being weighted by a one of the plurality of user-selected weather-station weights for the respective weather station, the virtual weather data being a user-weighted composite weather history for the tract.

Another operation that can be performed by the processor of the weather-risk product issuer computer in an exemplary system includes, for example, storing 31A the virtual weather data in the non-transitory memory so that a customized weather-risk product for the tract can be generated responsive thereto.

In an exemplary system, the weather risk product issuer computer can include, for example, a computer program product, defining weather-risk-product generator, stored in the non-transitory memory and operable on the processor, the weather-risk-product generator having a set of instructions that, when executed by the processor, cause the processor to perform one or more operations as can be shown with reference to FIG. 10.

One operation that can be performed by the processor of the weather-risk product issuer computer in an exemplary system includes, for example, generating 318 a weather-risk selection interface to display at the tract-user computer, the weather-risk selection interface allowing the user at the tract-user computer to select a plurality of user-selected weather-risk parameters and to transmit the plurality of user-selected weather-risk parameters to the weather-risk product issuer computer, the plurality of user-selected weather-risk parameters including each of a concern type, a risk type for the concern type, a risk tolerance range for the concern type, and a risk endurance range for the concern type.

Another operation that can be performed by the processor of the weather-risk product issuer computer in an exemplary system includes, for example, determining 323 timeframe-specific virtual weather data responsive to the virtual weather data and to one or more of the plurality of user-selected weather-risk parameters received from the tract-user computer.

Another operation that can be performed by the processor of the weather-risk product issuer computer in an exemplary system includes, for example, determining 325 a plurality of customized contract terms responsive to the timeframe-specific virtual weather data and to one or more of the plurality of user-selected weather risk parameters, the plurality of customized contract terms including each of a contract price, a contract premium, and a payout rate.

Another operation that can be performed by the processor of the weather-risk product issuer computer in an exemplary system includes, for example, generating 327 a weather-risk confirmation interface responsive to the timeframe-specific virtual weather data, the customized contract terms, and the user-selected weather-risk parameters, the weather-risk confirmation interface to display at the tract-user computer, the weather-risk confirmation interface comprising a first time-plot of the timeframe-specific virtual weather data, the risk tolerance range of the user-selected weather-risk parameters being overlaid on the first time-plot, and a second time-plot of the payout scale applied to the timeframe-specific virtual weather data, the weather-risk confirmation interface thereby allowing the user to observe hypothetical historical performance of the plurality of customized contract terms with respect to the timeframe-specific virtual weather data and the plurality of user-selected weather risk parameters, the weather-risk confirmation interface allowing the user to transmit either of a purchase request and a reset request to weather-risk product issuer computer.

Another operation that can be performed by the processor of the weather-risk product issuer computer in an exemplary system includes, for example, regenerating 300, 308 one of the geographic weather-data selection interface and the source selection interface responsive to receiving a reset request so that the user can configure a new virtual weather-data-station and generate new virtual weather data responsive thereto.

Another operation that can be performed by the processor of the weather-risk product issuer computer in an exemplary system includes, for example, generating 332 a customized weather-risk product responsive to receiving a purchase request, the customized weather-risk product corresponding to the plurality of customized contract terms and the user-selected weather risk parameters so that customized weather-risk product can be purchased by the user to allow settlement (i.e., monetizing an outcome) according to customized contract terms for one or more future weather events on the tract that satisfy the user-selected weather risk parameters.

BRIEF DESCRIPTION OF THE DRAWINGS

So that the manner in which the features and benefits of embodiments of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are, therefore, not to be considered limiting of the invention's scope as it may include other effective embodiments as well.

FIGS. 4a-4i are exemplary graphical user interface displays according to one or more embodiments of the invention.

FIGS. 6a-6i are exemplary graphical user interface displays according to one or more embodiments of the invention.

FIGS. 15*a*-15*f* are exemplary graphical user interface displays according to one or more embodiments of the invention.

DETAILED DESCRIPTION

Figure 1:
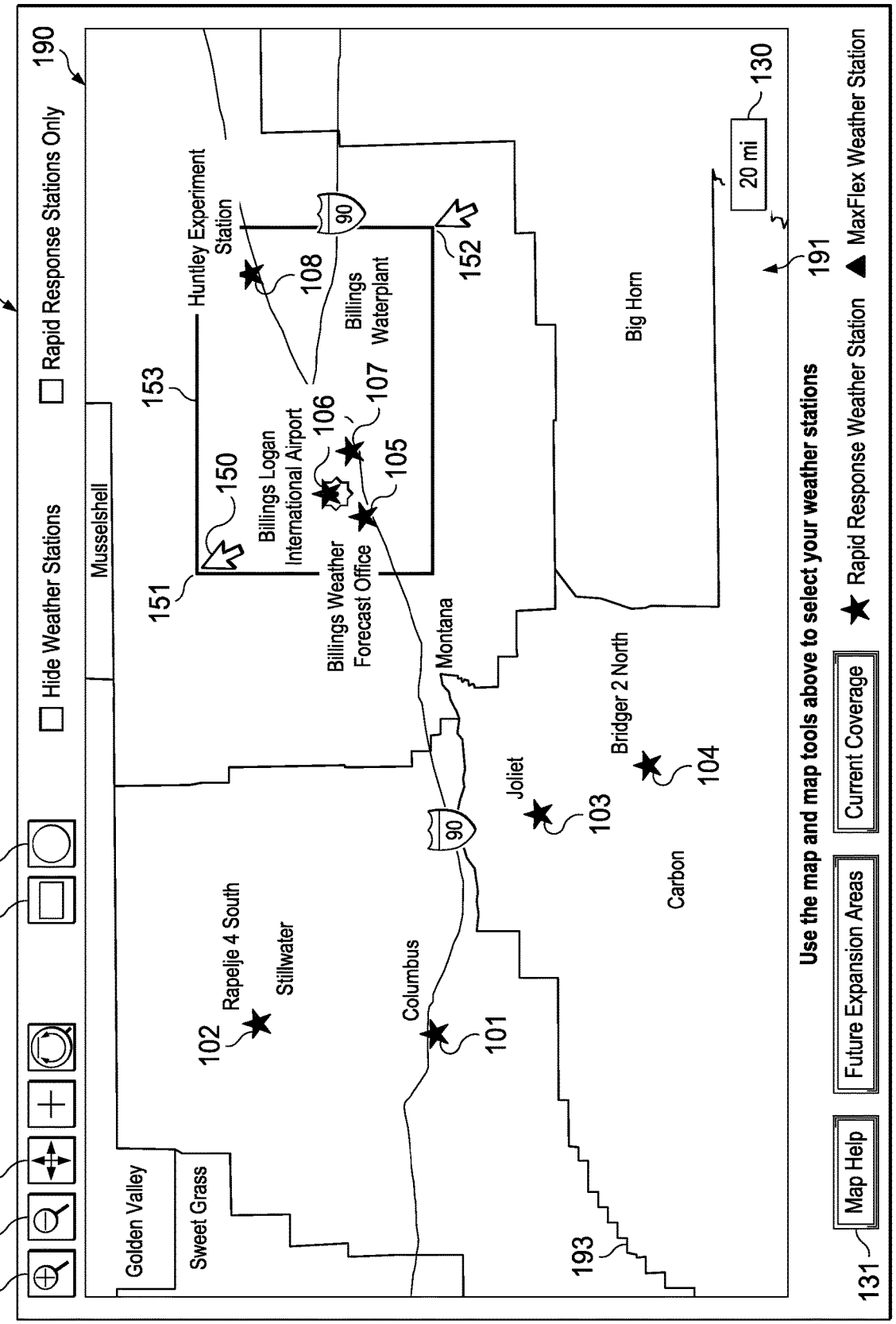
FIG. 1 is an exemplary graphical user interface display according to an embodiment of the invention.

Embodiments of the present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings.

In the drawings and description that follow, like parts are marked throughout the specification and drawings with the same reference numerals, respectively. Prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Figure 8:
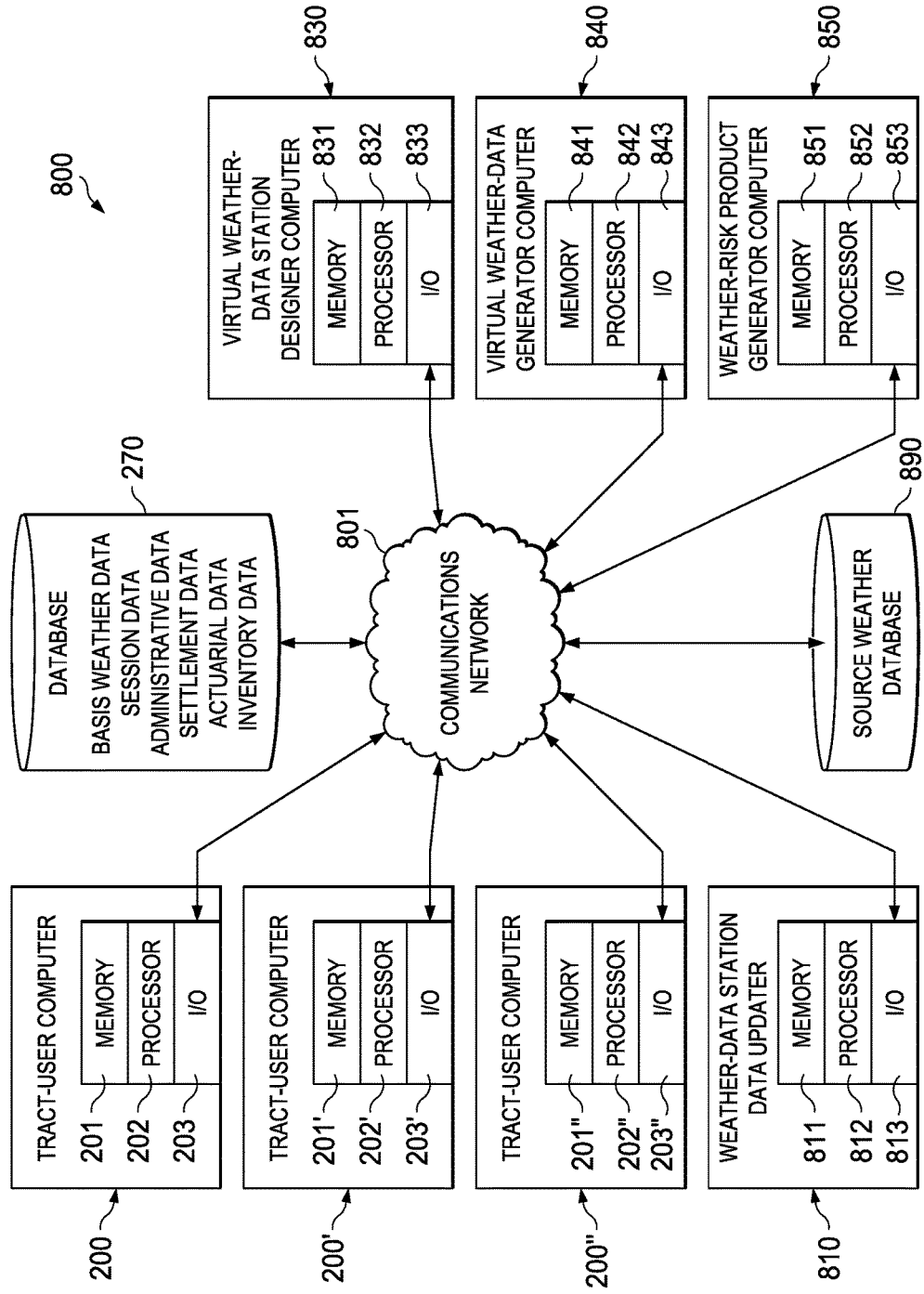
FIG. 8 is a schematic diagram illustrating an exemplary architecture of a system according to one or more embodiments of the invention.
Figure 9:
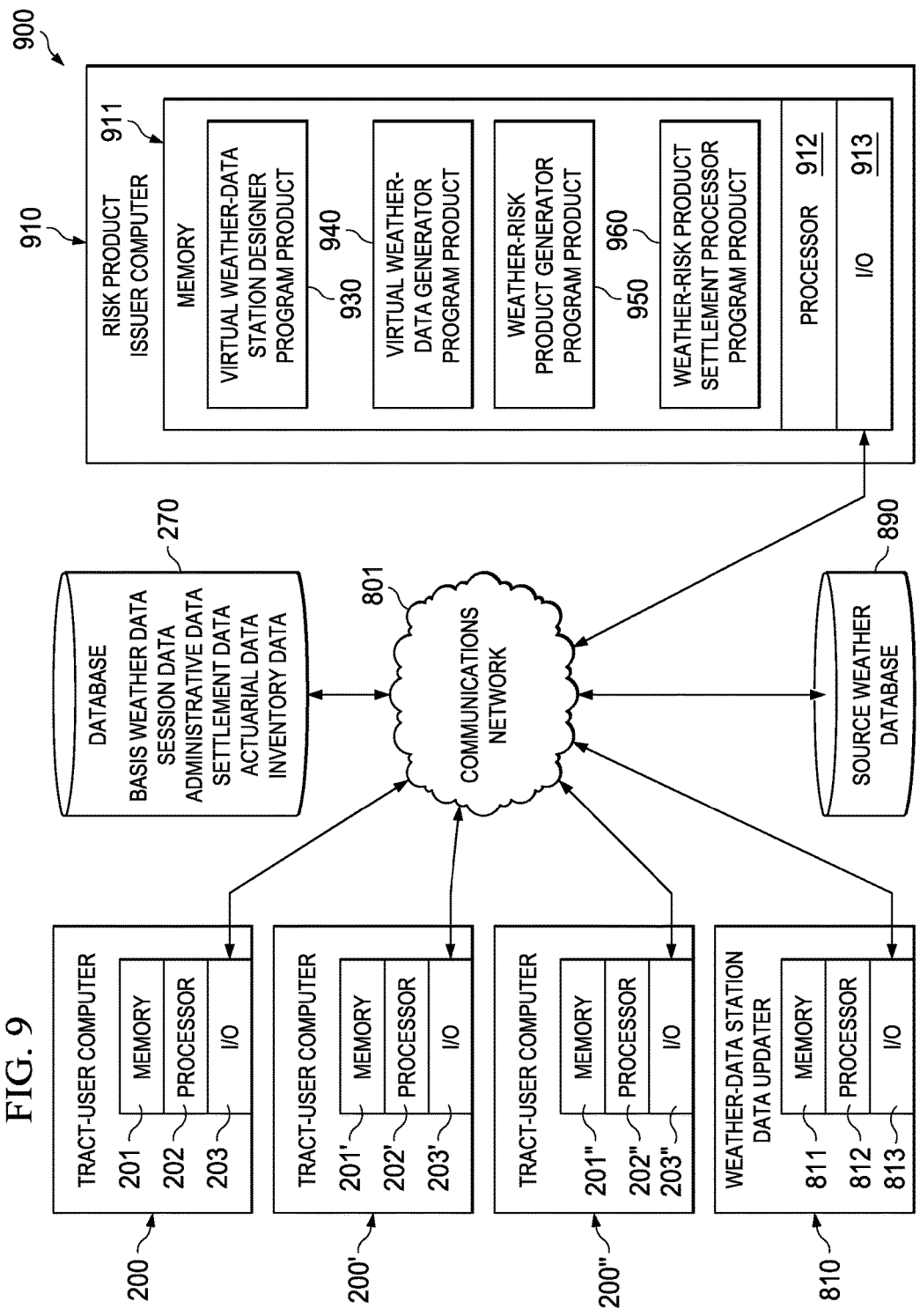
FIG. 9 is a schematic diagram illustrating an exemplary architecture of a system according to one or more embodiments of the invention.
Figure 10:
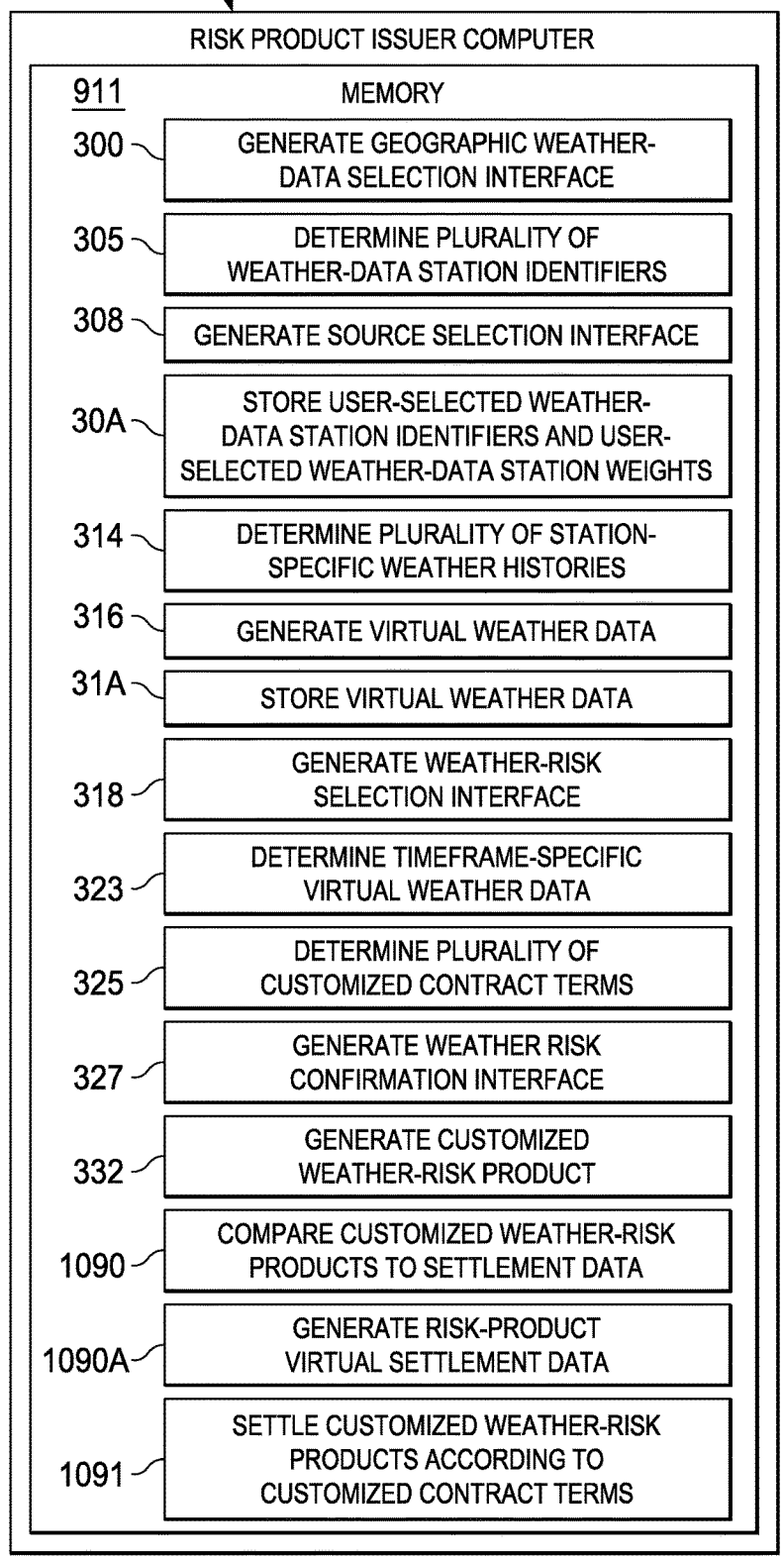
FIG. 10 is a schematic diagram illustrating exemplary instructions of one or more computer program products stored in memory according to one or more embodiments of the invention.

As is perhaps best illustrated by FIGS. 8-10, various exemplary embodiments of the present invention beneficially can include weather-risk-product customization system 800. The weather-risk-product customization system 800 allows potential purchasers of weather-risk products, which are also referred to as "customers" or "users" herein, to select and customize the basis for one or more weather-risk products, to select and customize the weather-risk products themselves, and to interactively generate and purchase a weather-risk product reflecting the user's selections and customizations. A weather-risk product can be used, for example, by organizations or individuals to manage or reduce risk associated with adverse or unexpected weather conditions, such as a weather derivative, an insurance contract, or other type of financial or contractual instrument.

In particular, the weather-risk-product customization system 800 allows a user to customize a so-called "virtual weather-data station" for a tract so that virtual weather data can be generated for the virtual weather-data station for the tract and a customized weather-risk product can be customized and generated responsive to the virtual weather data for the virtual weather-data station for the tract. The customized weather-risk product can be selected, customized, generated, and purchased, for example, by one or more users, also called "tract-users," according to various embodiments of the present invention, such as the exemplary embodiments illustrated in FIGS. 1 and 4-7. Exemplary embodiments of the present invention also advantageously provide, for example, computer readable program products, and computer-implemented methods to customize a virtual weather-data station for a tract so that virtual weather data can be generated for the virtual weather-data station and a weather-risk product can be customized and generated responsive to the virtual weather data.

As can be shown with reference to FIG. 9, a weather-risk product customization system, such as weather-risk product customization system 900, can include, for example, a communications network 801, one or more tract-user computers 200, 200', 200", risk-product issuer computer 910, and a database 270. Also, as can be shown with reference to FIG. 8, the weather-risk-product customization system 800 can include, for example, a virtual weather-data-station designer computer 830, a virtual weather-data generator computer 840, and a weather risk-product generator computer 850, which can also be in communication with one or more tract-user computers 200, 200', 200" and a database 270 via a communications network 801. The risk product customization system 900 also includes, for example, one or more source weather databases 890 which can be connected to the risk-product issuer computer 910 or database 270, for example, over the communications network 801. The communications network 801 can include any one or more telephony network, a wire-line network, a wireless network, a wide area network, a local area network, an infrared network, a radio-frequency network, an optical network, or any other communications network now or hereinafter created as is known and understood by those skilled in the art. In certain embodiments, for example, there may be a direct connection between risk-product issuer computer 910 and any of the one or more source weather databases 890, for example, using a dedicated telecommunications line. Each of the one or more tract-user computers 200, 200', 200" provides the physical interface that allows a corresponding tract-user to interact with the risk-product customization system.

The tract-user can be any human being having an interest—or acting as an agent or on behalf of another human being or on behalf of an organization having an interest—in one or more assets, properties, operations, activities, or other interests occurring at, on, near, or as relates to a tract. As used herein, a tract is an area of earth surface, and can include without limitation any land, water, or land and water on the earth surface. "Use" of a tract includes not only the use of the land or water on the earth surface, but also the of the minerals or reservoirs below the earth surface, resources growing on, in, or from the earth surface and the airspace above the earth surface. Although the invention is not so limited, certain embodiments of the invention are described with respect to a tract-user that is an owner or operator of a farm or a ranch. The embodiments described herein are equally applicable, as will be appreciated by those having skill in the art, to other assets, properties, operations, activities, or other interests that relate to a tract, such as a transit service related to a route or a hydro-electric power generation service related to a watershed, for example.

A virtual weather-data station is a hypothetical or simulated weather station that can be assumed to relate to past, present, or future weather on a particular tract or in the vicinity of particular tract. A virtual weather-data station is not an actual weather station, but a virtual weather-data station may be responsive to a plurality of actual weather stations. Because the virtual weather-data station is not an actual weather station, the properties of the virtual weather-data station depend on the customization or configuration of the virtual weather-data station. A virtual weather-data station includes virtual weather data, which is a weighted aggregation of weather data for two or more actual weather stations. Because virtual weather data is never a precise representation of the actual weather for the tract, customization and configuration of the virtual weather-data station for the tract is critical to ensure the most realistic modeling of the actual weather by the virtual weather data, for example, by minimizing the variance between the virtual weather data and the actual weather for the tract.

Weather data can include, without limitation, actual weather readings as well as back-casted weather readings. Actual weather readings include, for example, readings at an actual weather station for weather parameters such as precipitation, temperature, wind, barometric pressure, and so on. Back-casted weather readings are systematically generated, hypothetical weather readings for a primary actual weather station that are generated based on actual weather readings at one or more secondary actual weather stations near the primary actual weather station. Back-casted weather readings can be used, for example, when the quality, quantity, or quality and quantity of actual weather readings for the primary actual weather station is inferior to the quality or quantity of actual weather readings for one or more secondary weather stations near the primary actual weather station.

As used herein, the term "near," as in whether a location of a weather station is "near" the location of a tract or another weather station, shall not be limited by any fixed or bounded measure of distance. Rather, one location is near another location when the weather at either location is significantly related to the weather at the other location. Weather at one location is significantly related to the weather at another location when the weather at either location can be estimated, approximated, simulated, forecast, or otherwise represented responsive to the weather at the other location, whether in whole or in part.

Embodiments of the invention related to a geographic coordinate system, which will be appreciated by those having skill in the art to include any coordinate system that allows one or more locations within the tract on the earth surface to be specified by one or more numbers. One or more locations within the tract may be collectively referred to herein as the location of the tract and can include, for example, locations of the vertices, center point, or other significant points within the tract. The geographic coordinate system can include a set of coordinates chosen such that one or more of the numbers represents one of a latitude, a longitude and an elevation. The geographic coordinate system may also allow for the definition of one or more scalar or vector values with respect to one or more other coordinates. For example, one set of geographic coordinates may specify the latitude, longitude, and elevation of a single point on the earth surface and a scalar or vector value may be a distance of a second point from that single point. The distance can be, for example, expressed in terms of degrees, minutes, and seconds of latitude and longitude or in terms of scalar or vector distance metrics such as miles, kilometers, or nautical miles, for example. For example, coordinates can define the absolute location, e.g., a latitude, a longitude, and an elevation, of a first point being a northwest vertex of a rectangle and a relative location, e.g., a distance and a direction, of a second point being a southeast vertex of that rectangle; together, the first point and the second point define the area of a rectangular tract. Also, for example, coordinates can define the absolute location, e.g., a latitude, a longitude, and an elevation, of a first point being a center point of a circle and a relative location, e.g., a radial distance, of a second point being a on the circumference of that circle; together, the first point and the second point define the area of a circular tract. Other coordinate-based, scalar-based, or vector-based means of representing points or areas, including irregular polygonal areas, on the earth surface will be apparent to those having skill in the art and are within the scope of this disclosure.

A tract-specific weather-risk-product is an intangible having commercial value that allows party to receive compensation, monetarily or otherwise, contingent upon the occurrence of future weather events as defined by future weather data, including actual or virtual weather data, relating to a tract and that is valued, in part, responsive to past weather data, including actual or virtual weather data, relating to the tract. By way of example, if a tract relates to a farm, a weather-risk-product can allow the farm to protect the value of its farming operation against crop loss due to excessively cold temperatures. By way of further example, if a tract relates to a transit route, weather-risk-products can allow a shipping company to protect the value of its shipping operation against reduced shipping volume due to icing (i.e., excessively cold temperatures and excessive precipitation). By way of further example, if a tract relates to a watershed, weather-risk-products can allow a hydro-electric power generator to protect the value of its generating operation against reduced power output due to insufficient precipitation. Other examples will be apparent from the description herein, and are within the scope of this disclosure.

Figure 2:
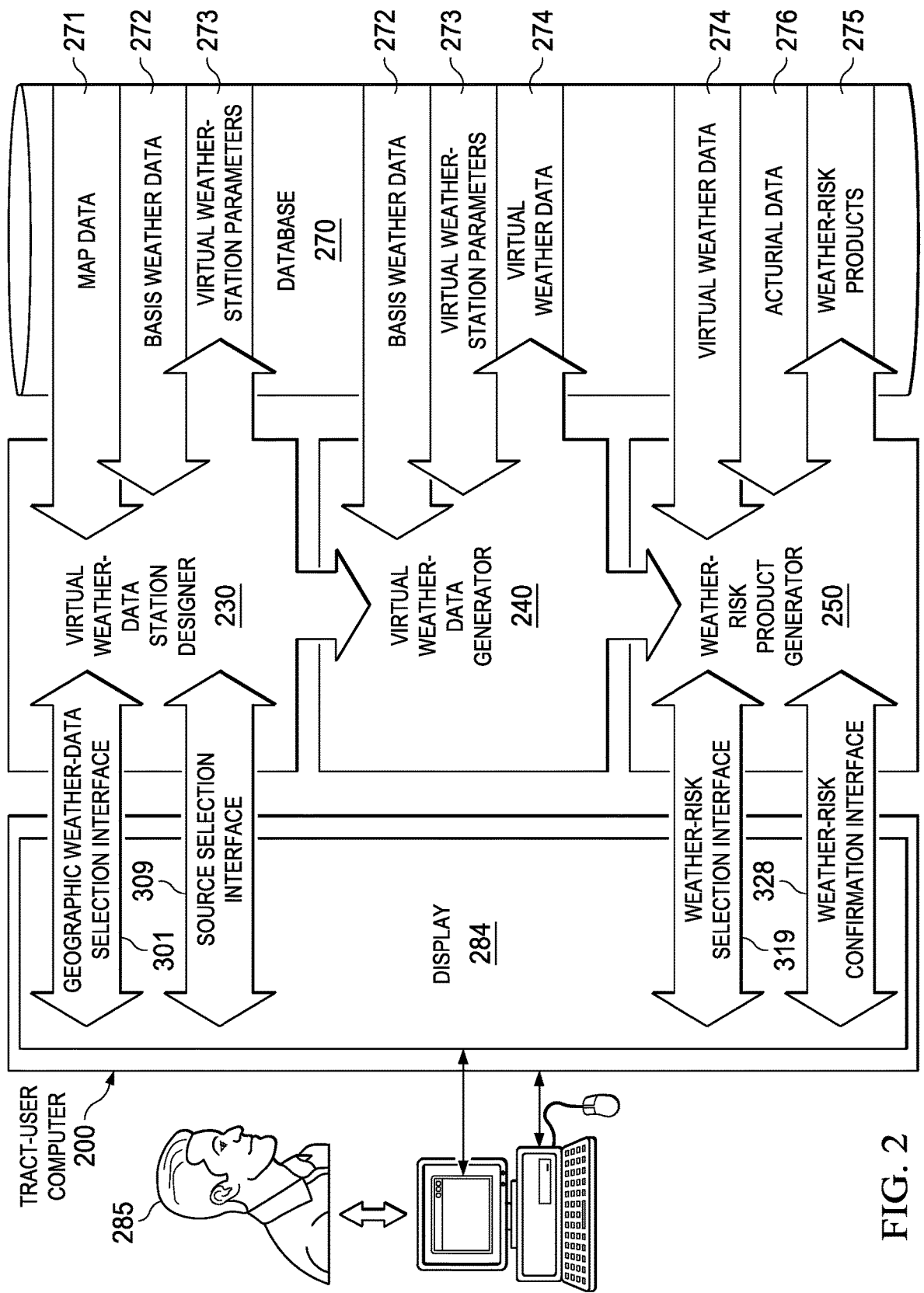
FIG. 2 is a schematic diagram illustrating exemplary process flow, data flow, and display of graphical user interfaces to a user according to an embodiment of the invention.

As can be shown with reference to FIG. 2, embodiments of the invention are accessed by a user 285 at a computer 200. The user 285 is a user of the computer 200 and can also be, for example, a user of the tract, an agent of the user of the tract, a principal of the user of the tract, an employee of the user of the tract, an employer of the user of the tract, or any other person having an interest in or relating to the tract. As referenced herein, a user or a "tract-user" means to any type of user described herein, such as user 285, and a computer or a "tract-user computer" means any type of computer, such as computer 200, described herein.

The user 285 interacts with the computer 200 through various input peripherals and display peripherals, which can be included in the computer 200. The user interacts with display peripherals, for example, to observe user interfaces being displayed thereon and to observe input being entered by the user through an input peripheral. The user interacts with input peripherals, for example, to respond to user interfaces being displayed on the display peripheral, such as to make an input or a selection with respect to the user interface being displayed on the display peripheral.

The user computer 200 can be, for example, any type of stationary or portable personal computing device such as a desktop computer, laptop computer, micro computer, mini computer, notebook computer, ultra-mobile computer, tablet computer, handheld computer, mobile telephone, personal digital assistant (PDA), so-called "Smartphone," or any other computing device intended to be operated directly by an end user with no intervening computer operator as is known and understood by those skilled in the art. The user computer 200 can include, for example, a keyboard, a mouse, a graphical user interface device, a display, a microphone, electronic speakers, a modem, a LAN card, a computer graphics card, a printer, a scanner, a disk drive, a tape drive, a camera, a Wi-Fi card, a PCMCIA card, or any other peripheral device as is known and understood by those skilled in the art. If the user computer 200 is a mobile device, as is known and understood by those skilled in the art, the mobile device can include, but is not limited to, a cell phone device, a handheld device, a handheld computer, a palmtop, a handheld device, or any other mobile computing device. Such a mobile device can also include, for example, a display screen with a touch input user interface or a miniature keyboard, or a touch-screen interface. A PDA can include, for example, a processor, memory, an input device, and an output device. Additionally, a PDA, for instance, can include a palmtop computer, a Smartphone, a palm device, a portable media player, a Wi-Fi enabled device, a global positioning system device, or any other handheld computing device now or hereinafter developed as is known and understood by those skilled in the art. Embodiments having one or more user computers 200 as a laptop computer include, for example, the Apple MacBook, MacBook Air, and MacBook Pro product families; the Dell Inspiron and Latitude product families, the Lenovo ThinkPad and IdeaPad product families, the Panasonic Toughbook product families, and the Toshiba Satellite product families. Examples of embodiments having one or more user computer 200 as a Smartphone include, for example, the iPhone 3GS and the iPhone 4 by Apple Computer, Inc. of Cupertino, Calif. and the Droid by Motorola, Inc. of Schaumburg, Ill.

As can be shown with reference to FIG. 8, computer 200 can include, according to various exemplary embodiments of the present invention, at least a memory 201, a processor 202, and an input/output device 203. As used herein, the processor 202 can include, for example, one or more micro processors, microcontrollers, and other analog or digital circuit components configured to perform the functions described herein. The processor 202 is the "brains" of the computer 200, and as such, can execute computer program product or products.

The processor 202 can be any commercially available terminal processor, or plurality of terminal processors, adapted for use in or with the computer 200. The processor 202 can be, for example, the Intel® Xeon® multicore terminal processors, Intel® micro-architecture Nehalem, and AMD Opteron™ multicore terminal processors, Intel® Core® multicore processors, Intel® Core 2 Duo® multicore processors, and other processors with single or multiple cores as is known and understood by those skilled in the art. The processor 202 can be operated by operating system software installed on memory 201, such as Windows Vista, Windows 7, Windows XP, UNIX or UNIX-like family of systems, including BSD and GNU/Linux, and Mac OS X. The processor 202 can also be, for example the TI OMAP 3430, Arm Cortex A8, Samsung S5PC100, or Apple A4. The operating system for the processor 202 can further be, for example, the Symbian OS, Apple iOS, Blackberry OS, Android, Microsoft Windows CE, Microsoft Phone 7, or PalmOS.

The computer 200 can further include a non-transitory memory or more than one non-transitory memories (referred to as memory 201 herein). Memory 201 can be configured, for example, to store data, including computer program product or products, which include instructions for execution on the processor 202. Memory 201, can include, for example, both non-volatile memory, e.g., hard disks, flash memory, optical disks, and the like, and volatile memory, e.g., SRAM, DRAM, and SDRAM as required to support embodiments of the instant invention. As one skilled in the art will appreciate, though the memory 201 is depicted on, e.g., a motherboard, of the computer 200, the memory 201 can also be a separate component or device, e.g., flash memory, connected to the computer 200 through an input/output unit 203 or a transceiver (not shown). As one skilled in the art will understand, the program product or products, along with one or more databases, data libraries, data tables, data fields, or other data records can be stored either in memory 201 or in separate memory (also non-transitory), for example, associated with a storage medium such as a database 270 locally accessible to the computer 200, positioned in communication with the computer 200 through the I/O 203.

The memory 201 of the tract-user computer 200, for example, can further include applications, drivers, modules, libraries, or engines that allow the tract-user computer 200 to have interactive client-side interface capabilities, including, for example a web browser application, such as Microsoft® Internet Explorer® by Microsoft Corporation of Redmond, Wash., having capabilities for processing interactive content, such as Java, JavaScript, or Flash plug-ins or scripts.

According to various exemplary embodiments of the present invention, the communications network 801 can connect the computer 200 the database 270 and to other computers, devices, modules, or other components of system 800. As one skilled in the art will appreciate, the communications network 801 can connect all of the system components using a local area network ("LAN") or wide area network ("WAN"), or a combination thereof. For example, components of system 800 can be privately networked, or privately tunneled over a public network, to allow for faster, more secure communication and better data synchronization between computing nodes. Also, for example, some of the system components can be networked using a LAN and adapted to be in communication with the computer 200 using a WAN. Accordingly, though not all such configurations are depicted, all are within the scope of various exemplary embodiments of the present invention.

Communications network 801 can include, for example, any public or private network communication paths to support the communications sent and received between system components 800, including the public Internet, a private intranet, a virtual private network (VPN) tunneled across the public Intranet, for example, using a network security protocol, such as Netscape's Secure Socket Layer (SSL) protocol. The communications network 801 can be, for example, a telecommunication network including a wire-based telephone network, pager network, cellular network, or a combination thereof, and a computer network. Accordingly, the communications network 801 can be implemented, in whole or in part, over wireless communications network. In addition, according to various exemplary embodiments of the present invention, the wireless communications network can be implemented over any of various wireless communication technologies, for example: code division multiplexed access ("CDMA"), time division multiplexed access ("TDMA"), frequency division multiplexed access ("FDMA"), orthogonal frequency division multiplexed access ("OFDMA"), global system for mobile communications ("GSM"), Analog Advanced Mobile Phone System ("AMPS"), Universal Mobile Telecommunications System ("UMTS"), 802.11a/b/g/n ("WiFi"), World Interoperability for Microwave Access ("WiMAX"), or Bluetooth.

Figure 11:
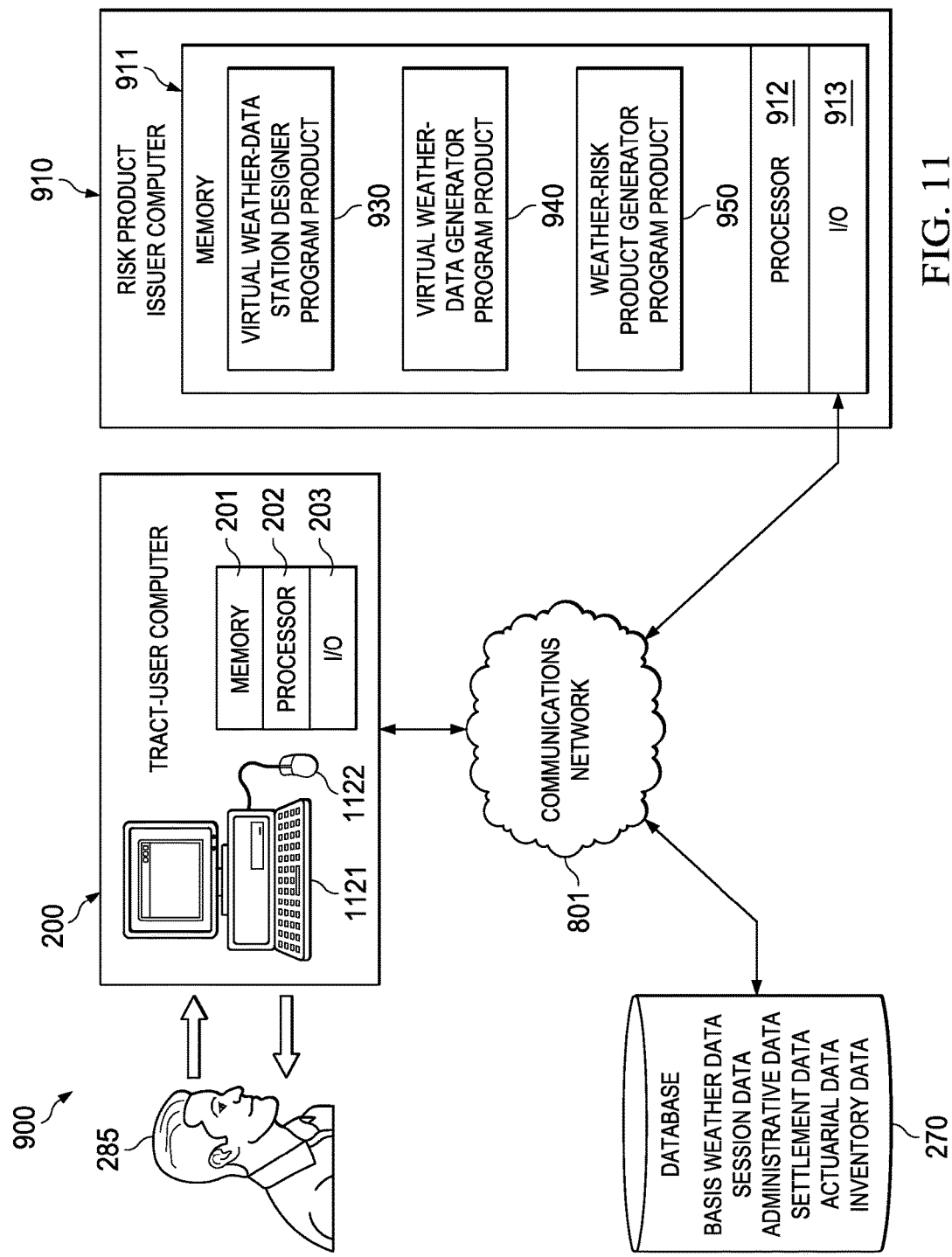
FIG. 11 is a schematic diagram illustrating an exemplary architecture of a system according to one or more embodiments of the invention.

As one skilled in the art will appreciate, and is perhaps best illustrated by FIG. 11, memory 201 and the processor 202, can also include, for example, components (e.g., drivers, libraries, and supporting hardware connections) that allow the tract-user computer 200 to be connected to a display peripheral device 1121 and an input peripheral device 1122 that allow a user direct access to the processor 202 and the memory 201.

The display peripheral device 1121 can be, for example, a computer monitor, which may also be known in the art as a display or a visual display unit. The display peripheral device also can include, for example, a display device, which in modern monitors is typically a thin film transistor liquid crystal display (TFT-LCD) thin panel, while older monitors use a cathode ray tube. The display peripheral device 1121 can include the display device, the circuitry, and the physical enclosure. The display peripheral device 1121 can be used, in connection with interactive client-side interface capabilities residing in memory 201, to display interactive interfaces to a user at the provider computer, such as the geographic weather-data selection interface (301 in FIG. 2), source selection interface (309 in FIG. 2), weather-risk selection interface (319 in FIG. 2), and weather-risk confirmation interface (328 in FIG. 2). As discussed in greater detail above, the display peripheral device can also be a PDA and can function, at the same time, as a display peripheral device, an input peripheral device, and an output peripheral device.

The input peripheral device 1122 can be, for example, a computer keyboard, computer mouse, a touch screen (such as a touch screen device comprising a display peripheral device), a pen device, character recognition device, voice recognition device, or a similar input device that will be known to those having skill in the art that allows the user at the tract-user computer 200, through mechanical, electrical, or mechanical and electrical means to send discrete or continuous signals to the processor 202. A status or other output associated with input peripheral device 1122 can be displayed at the display peripheral device 1121, such as, for example, mouse pointer or a keyboard prompt. The output of input peripheral device 1122 can be received by the processor 202, for example, as a selection or a command associated with an interactive client-side interface, such as the geographic weather-data selection interface (301 in FIG. 2), source selection interface (309 in FIG. 2), weather-risk selection interface (319 in FIG. 2), and weather-risk confirmation interface (328 in FIG. 2). An interactive client-side interface may be configured, for example, to receive a selection or a command from the input peripheral and, responsive thereto, transmit data, including content input by the user at the input peripheral device 1122, as well as other content as directed by the client-side interface, to other servers or systems through the input/output unit 203.

Returning to FIG. 2, embodiments of the present invention can provide, for example, a geographic weather-data selection interface 301, a source selection interface 309, a weather-risk selection interface 319, and a weather-risk confirmation interface 328, all of which are a user interfaces displayed on a display 284 at the computer 200. User interfaces can be, for example, web pages displayable through a web browser or any other interface of graphical user interfaces (GUIs) provided by an application, applet, or other computer program. Each of the foregoing interfaces can include, for example, one or more sub-interfaces, which are also user interfaces, that can be accessed or called up from the main interface, such as, for example, a pop-up window, a browser tab, or a browser window.

Each of the foregoing user interfaces can be generated, in whole or in part, by computer 200 or by any other computer accessible to computer 200 over a network that can transmit the user interface to computer 200. Generating the user interface includes executing instructions stored on a computer-readable medium to define the user interface on a computer readable medium, for example, so that the user interface can be displayed by a computer executing instructions to render the user interface as a user interface display on a display peripheral. Generating the user interface can include, for example, server-side processing to dynamically generate the user-interface responsive to variable inputs, client-side processing to dynamically generate or re-generate the user-interface responsive to variable inputs, and server-side or client-side processing to serve or interpret static or dynamic data corresponding to the user interface.

Those having skill in the art will appreciate that any of the interfaces described herein may be interactive interfaces. Interactive interfaces can be in whole or in part dynamically generated using server-side processing (such as PHP, ASP, ASP.NET) and delivered to the computer 200 in static mark-up language, such as HTML, for display using a web browser and a display peripheral device, as is perhaps best illustrated as 284 in FIG. 2. Those having skill in the art will further appreciate that interactive interfaces, such as the geographic weather-data selection interface (301 in FIG. 2), source selection interface (309 in FIG. 2), weather-risk selection interface (319 in FIG. 2), and weather-risk confirmation interface (328 in FIG. 2) may be in whole or in part statically generated at a server, such as the virtual-weather-risk-product customization computer 910 or one of the one or more web servers 1420, 1430, 1440 adapted to be in communication with the virtual-weather-risk-product customization computer 910 and delivered to the tract-user computer 200 for processing by the tract-user computer 200 using client-side processing (such as Java, JavaScript, or Flash) for display at the tract-user computer 200 using the web browser and the display peripheral device 284.

According to various exemplary embodiments of the present invention, database 270 can be any database structure as is known and understood by those skilled in the art. The databases discussed herein, including database 270, can be, for example, any sort of organized collection of data in digital form. Databases, including database 270, can include the database structure as well as the computer programs that provides database services to other computer programs or computers, as defined by the client-server model, and any computer dedicated to running such computer programs (i.e., a database server). An exemplary database model, for example, is Microsoft SQL Server 2005 or Microsoft SQL Server 2008 R2. Databases can include a database management system ("DBMS") consisting of software that operates the database, provides storage, access, security, backup and other facilities. DBMS can support multiple query languages, including, for example, SQL, XQuery, OQL, LINQ, JDOQL, and JPAQL. Databases can implement any known database model or database models, including, for example, a relational model, a hierarchical model, a network model, or an object-oriented model. The DBMS can include Data Definition Language ("DDL") for defining the structure of the database, Data Control Language ("DCL") for defining security/access controls, and Data Manipulation Language ("DML") for querying and updating data. The DBMS can further include interface drivers, which are code libraries that provide methods to prepare statements, execute statements, fetch results, etc. Examples of interface drivers include ODBC, JDBC, MySQL/PHP, FireBird/Python. DBMS can further include a SQL engine to interpret and execute the DDL, DCL, and DML statements, which includes a compiler, optimizer, and executor. DBMS can further include engine a transaction engine to ensure that multiple SQL statements either succeed or fail as a group, according to application dictates. DBMS can further include a relational engine to implement relational objects such as Table, Index, and Referential integrity constraints. DBMS can further include a storage engine to store and retrieve data from secondary storage, as well as managing transaction commit and rollback, backup and recovery, etc.

Data stored in the databases can be updated as needed, for example, by a user with administrative access to the database to add new data to tables or libraries in the database as they become supported. It will be appreciated by those having skill in the art that data described herein as being stored in the databases can also be stored or maintained in non-transitory memory and accessed among two or more subroutines, functions, modules, objects, program products, or processes for example, according to objects or variables of such subroutines, functions, modules, objects, program products or processes. Any of the fields of the records, tables, libraries, and so on of the database can be multi-dimensional structures resembling an array or matrix and can include values or references to other fields, records, tables, or libraries. Any of the foregoing fields can contain either actual values or a link, a join, a reference, or a pointer to other local or remote sources for such values.

Figure 12:
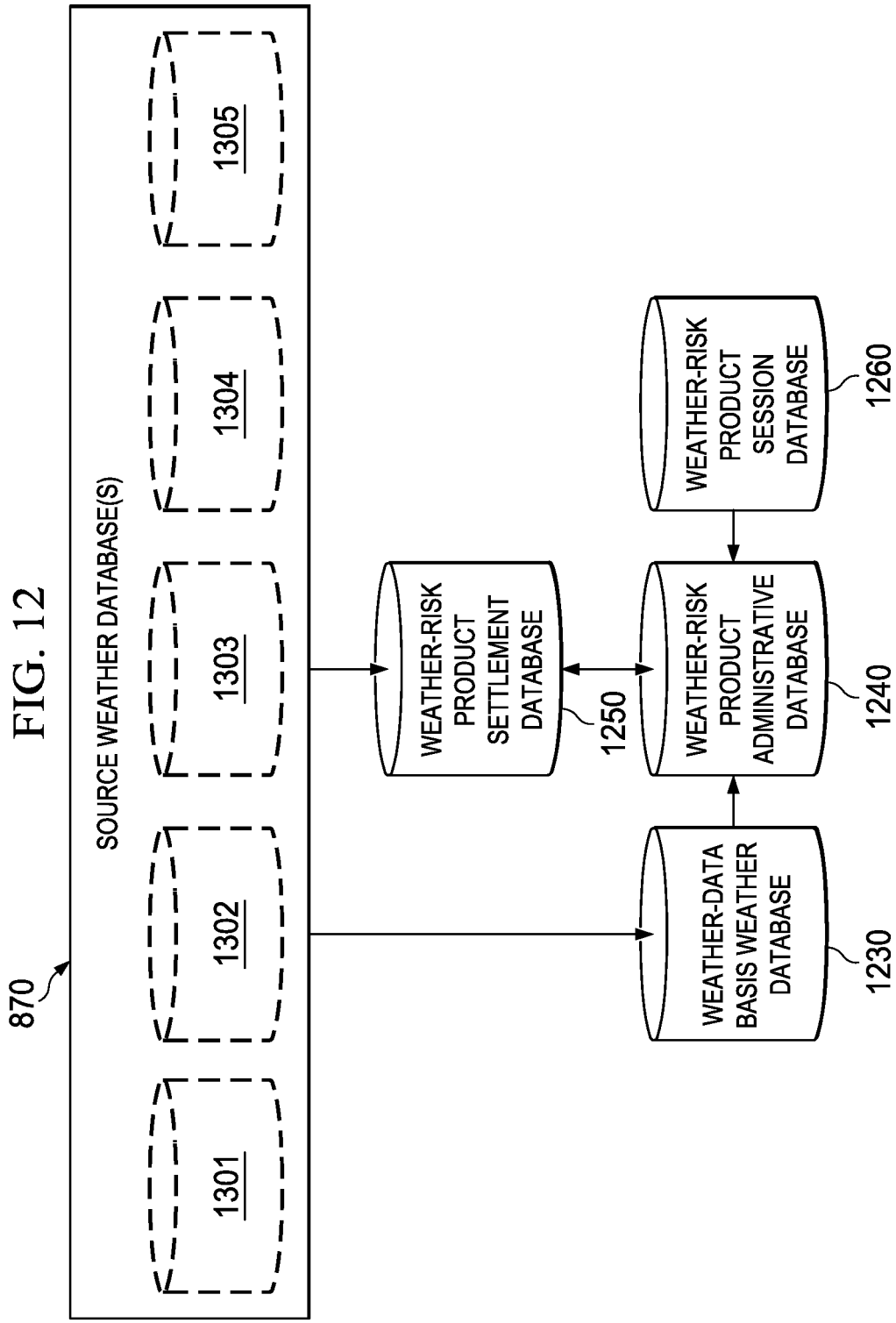
FIG. 12 is a database diagram illustrating exemplary data paths between databases according to one or more embodiments of the invention.

Database 270 can be, for example, a single database, multiple databases, or a virtual database, including data from multiple sources, for example, servers on the World Wide Web. According to various exemplary embodiments of the present invention, for example, and as illustrated by FIG. 12, database 270 can include one or more databases, including a weather-data basis weather database 1230, a weather-risk product session database 1260, a weather-risk product administrative database 1240, and a weather-risk product settlement database 1250, each of which can also be, for example, a single database, multiple databases, or a virtual database, including data from multiple sources. In addition, the database 270 can include other databases, or one or more tables within database 270 to store weather-risk actuarial data 276 to allow determining contract parameters for weather-risk products with respect to weather-risk parameters. In addition, the database 270 can include other databases, or one or more tables within database 270 to store map data 271, including, for example, one or more map images, map feature data, and data relating one or more map images and map feature data to a geographic coordinate system.

The weather-data basis weather database 1230 can be configured, for example, to store any data related to weather stations that can be used as a basis for generating weather-risk products, including weather station identifiers; weather station names, weather station locations (e.g., geographic coordinates), and weather-station basis weather data. Weather-station basis weather data, such as basis weather data 272 as can be shown with reference to FIGS. 2, 13*b*-*c*, can include, for example a plurality of daily weather records ("histories").

Basis weather data 272 can include any historical weather data available or known to those having skill in the art. Basis weather data 272 can be sourced, for example, from governmental agencies that record weather data in real time or store weather data in data centers electronically accessible to the public or to private partners. One such government agency is the National Climactic Data Center ("NCDC"), which is responsible for the compilation and management of weather data from over 75 U.S. departments and agencies. The NCDC maintains several weather databases, one of which is the Quality Controlled Local Climate Data ("QCLCD"), a daily summary of weather data at automated stations, primarily associated with air traffic. NCDC's quality control processes are primarily automated. Another NCDC database is the Global Historical Climatology Network ("GHCN") database, which contains historical temperature, precipitation, and pressure data for thousands of land stations worldwide and is more comprehensive than the QCLCD. United States federal weather data includes weather readings collected at approximately 25,000 weather stations, of which approximately 8,000 can be considered "active", and Canadian weather data includes weather readings collected at approximately 5,000 active weather stations. In addition, there are approximately 4,000 NCDC weather stations with both temperature and precipitation recording and approximately 1,600 airport weather stations, although some of these lack long-term historical records. In addition, weather data is currently available from private sources, which reflects approximately 1,000 to 5,000 weather stations and may or may not be built upon NCDC data. All or most of the publicly or privately available raw weather datasets include errors such as holes (i.e., missing data) or spurious data. Some of the private sources of weather data include "filled" data, although some of the mechanisms employed to fill the holes disadvantageously dampen the variability in the data.

In further detail, basis weather data 272 can include, for each reporting weather station identified by a weather-station identifier "WSID", a precipitation value ("PRCP"), a temperature minimum value ("TMIN"), and a temperature maximum value ("TMAX") for each measurement period "DAY"). As is further shown with reference to FIGS. 13*b* and 13*c*, basis weather data 272 can include weather data from actual weather readings, which can be referred to as "source data," 1390 as well as weather data generated responsive to source data, which can be referred to as "derived data" 1391. Basis weather data 272 including derived data 1391 can be referred to as "enhanced basis weather data," which is included in the definition of basis weather data 272.

Figure 13A:
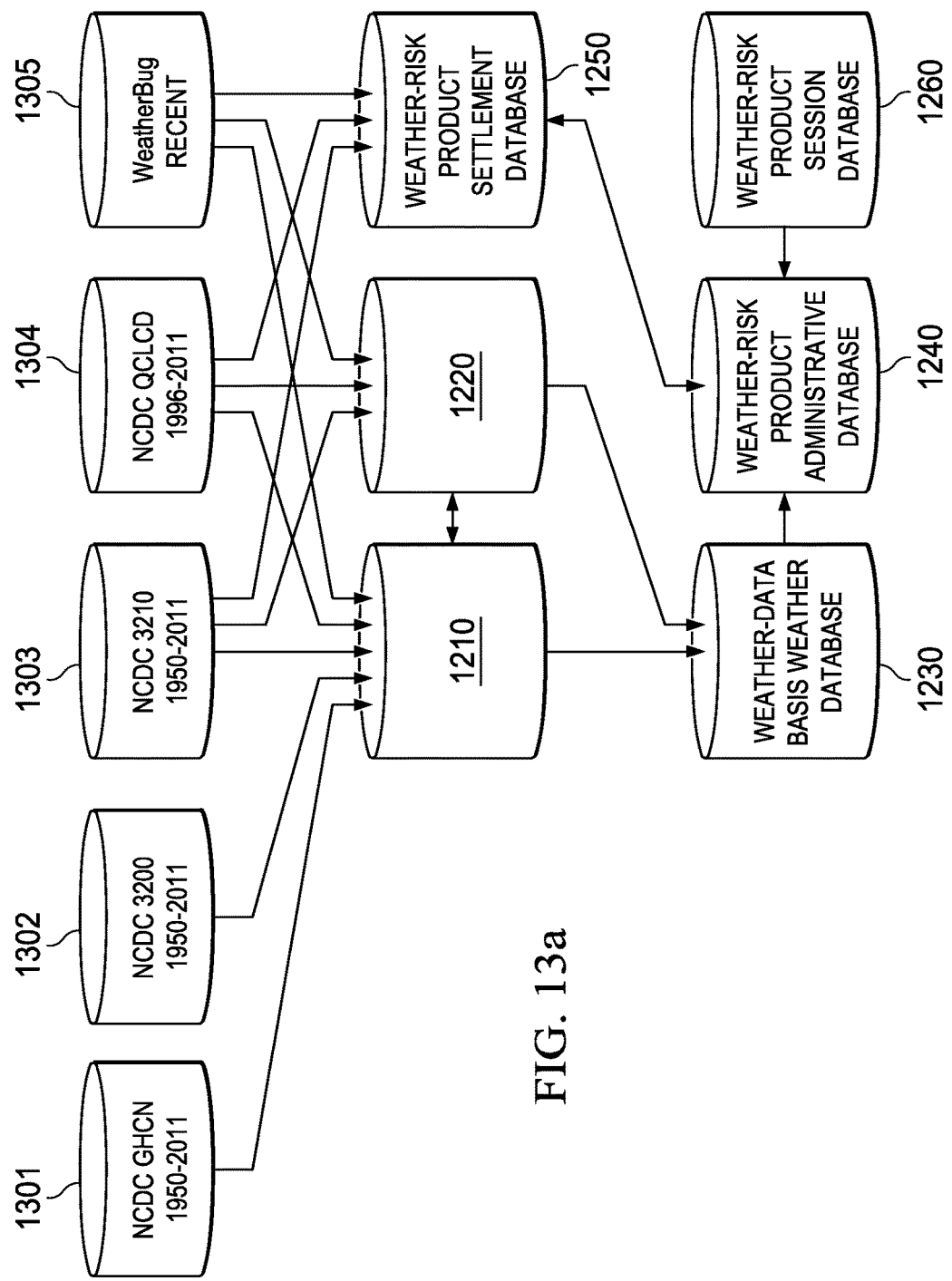
FIG. 13*a* is a database diagram illustrating exemplary connections between databases according to one or more embodiments of the invention.
Figure 13B:
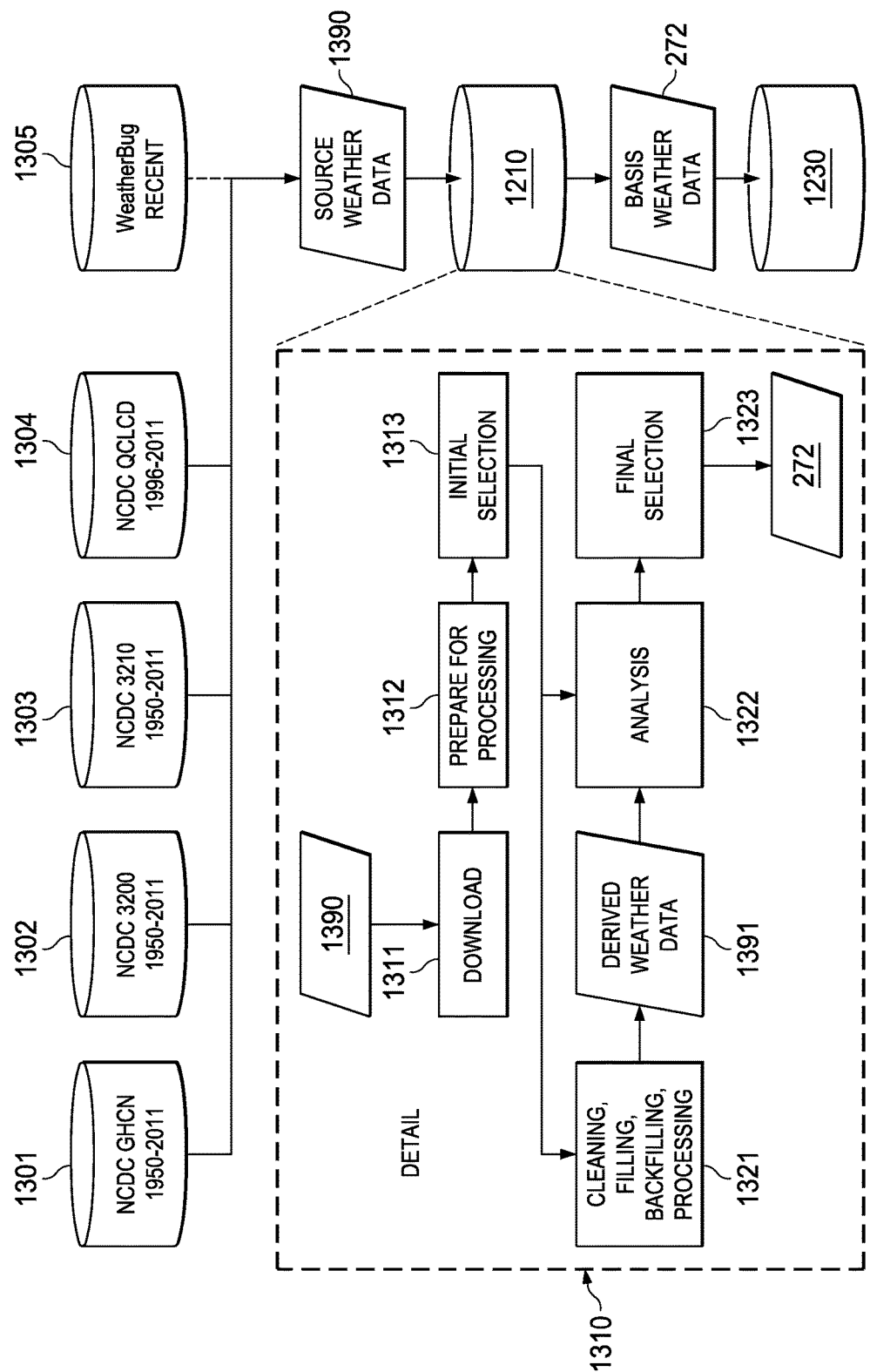
FIGS. 13*b*-13*d* are database diagrams and schematic data flow and data processing diagrams illustrating exemplary connections between databases, exemplary data flows and exemplary data processing steps according to one or more embodiments of the invention.
Figure 13C:
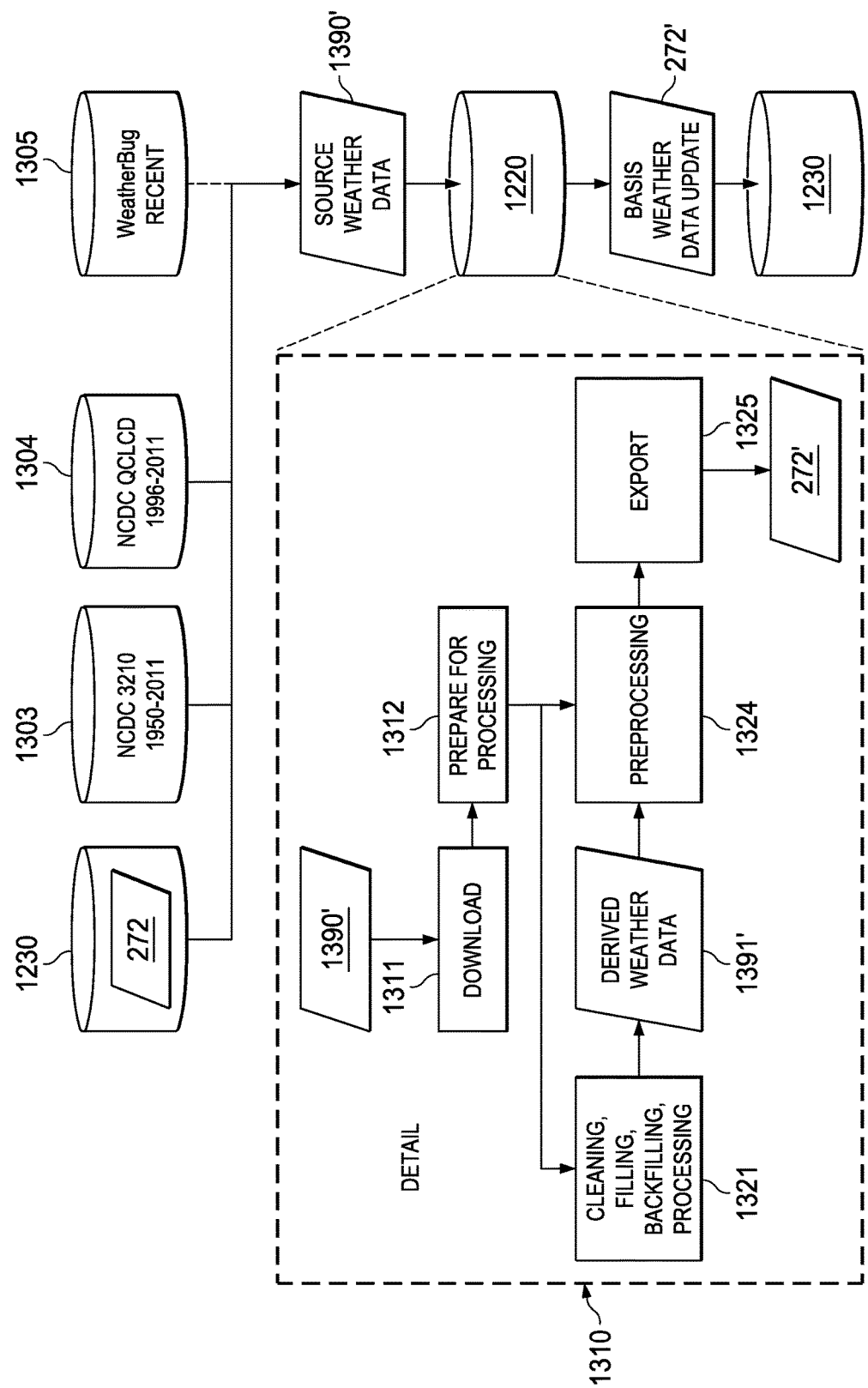

As can be shown by reference to FIGS. 13*b* and 13*c*, derived data 1391 can be generated responsive to data processing operations 1321, for example, to clean, fill, or backcast source data 1390 downloaded 1311 from one or more source weather-data database, e.g., databases 1301-1305. Source weather-data databases can include, for example: (i) NCDC GHCN database 1301, which includes historical weather data from 1950 to present; (ii) NCDC 3200 database 1302, which includes historical weather data from 1950 to 2011 (no longer updated by Government after April 2011); (iii) NCDC 3210 database 1303, which includes historical weather data from 1950 to present; (iv)

NCDC QCLCD database 1304, which includes historical weather data from 1950 to present for many potential agricultural stations; and (v) WeatherBug database 1305, which includes recent potential additional agricultural stations.

The following description of process steps 1311, 1312, 1313, 1321, 1322, 1323, 1324, and 1325 can be performed, for example, by database servers 1210, 1220, or 1250, any of which can have a structure as illustrated with reference to weather station data updater 810 of FIGS. 8-9, for example, having a processor 812, an input/output unit connected to the processor 812 and the communications network 801 (and thereby in communication with database 270), memory 811 with computer program product having instructions for executing steps 1311, 1312, 1313, 1321, 1322, 1323, 1324, or 1325 on the processor 812. Databases 1301-1305 can be shown with reference to weather databases 890 in FIGS. 8-9, which can also be connected to the communications network 801 and thereby in communication with the weather station data updater 810. Memory 811, processor 812, and input/output unit 813 can be implemented in the manner as described with respect to memory 911, processor 912, and input/output unit 913 of the risk-product issuer computer 910.

Source data 1390 can be downloaded 1311, for example, as fixed field text files or comma-delimited text files and imported into imported into SQL tables on a local data server 1210, for example, which may be included in database 270. Raw data can then be prepared for processing 1312 by performing systematic organization and formatting steps to facilitate processing of minimum temperature, maximum temperature, and precipitation relative to station location. Included in the preparation for processing 1312 steps, for example, are the removal of weather readings in the source data 1390 that were flagged by the NCDC as "missing" and the replacement of trace precipitation values ("T") a "0.01" inch value, which is the smallest non-zero precipitation value otherwise recorded in the NCDC dataset. Initial selection 1313 of weather stations for cleaning, filling, and backcasting can be performed, for example, for those weather stations that are likely to be useful for settlement. Initial selection 1313 can be determined, for example, responsive to the presence of both temperature and precipitation data, the number of weather readings (i.e., large history), and the number of missing reports (i.e., low frequency).

Data processing operations 1321 can include, for example, cleaning, filing, or backcasting weather readings in the source data 1390 to produce derived weather data 1391, which can be included in basis weather data 272. Data processing operations 1321 require, for example, a full raw dataset, including those stations with limited data, which can be constructed using local data server 1210 for this purpose. Although source weather data 1390 refers, in the abstract, to weather data downloaded from third party databases, such as databases 1301-1305, source weather data 1390 also includes the full raw dataset comprised of the collective weather data downloads from any or all third party databases.

Cleaning weather readings in the source data 1390 can include, for example, initial quality checks of the source data 1390 downloaded 1311 from third party weather databases, such as databases 1301-1304, to identify potential data reading errors, including the systematic examination of records within the downloaded files with respect to NCDC quality flags associated with each weather reading, and records with missing data can be classified accordingly, rejected, eliminated.

Filling and backcasting weather readings in the source data 1390 can include, for example, a preliminary classification of weather stations. In certain embodiments, there can be different types of weather stations, such as the so-called "informational" and "enhanced" weather stations. Informational stations are stations whose data are utilized in filling missing and backcasting historical data for each of the enhanced weather stations. Enhanced stations are stations to be potentially utilized and "insurable" according to embodiments of the invention. Given that more stations report daily precipitation (PRCP) data than minimum temperature (TMIN), and maximum temperature (TMAX) data, embodiments of the invention are able to systematically "fill" or "backcast" each enhanced weather station weather readings, independently, using data from all suitable informational stations reporting a type of weather reading on a given day.

Preliminary classification of weather stations includes determining for each weather station the number of non-missing data observations by month and year. Weather stations having a first pre-determined number of non-missing data observations over the entire time period can be identified as potential "informational" stations. In certain embodiments, 180 days/year is sufficient as a first pre-determined number of non-missing data observations. Also, weather stations having a second pre-determined number of non-missing data observations over the entire time period can be identified as potential "enhanced" stations. In certain embodiments, 328 days/year is sufficient as a second pre-determined number of non-missing data observations. The potential informational weather stations and the potential enhanced weather stations can then be used, for example, in filling or backcasting missing data for either the informational stations or the enhanced stations. In certain embodiments, the source data 1390 can be further refined, for example, responsive to an analysis of NCDC-assigned quality flags for the weather data. If a weather reading's assigned "data measurement flag" was coded as "A", "B", "E", "M" or "S", or if the "data quality flag" was coded as "2", "3", "5", "A", "D", "F", "G", "H", "I", "J", "L", "M", "N", "T", "U", or "V", the weather data can be treated as missing. Refining the source data 1390 can also include, for example, systematic operations to compare each weather readings for each weather station to the all-time daily record in a given month for the home state of the weather station. Furthermore, source data 1390 for the so-called informative stations (which includes the enhanced stations by definition) can be rescaled, as necessary, particularly in states with heterogeneous topology such as mountains, coasts, and so on. Source data 1390 that was sourced from certain databases, such as the QCLCD database 1304, however, generally requires no quality control corrections are necessary due to NCDC's own quality control process addressing data aberrations that would have been identified by these flags.

Filling operations are intended to fill minor holes in the source data 1390. Filling of the source data 1390 can be performed for the enhanced weather stations, in whole or in part, for example, by retaining valid weather readings from the given weather station (which can be considered or flagged to be actual data) and adding, for any missing weather readings, the weather readings from any one or more "close" weather stations that reported valid data on that day of the missing weather readings. In certain embodiments, close weather stations may be within approximately 0.5 miles from the weather station for which the filling operation is performed (the "filled station"). The added weather readings from the one or more close weather stations can also be considered or flagged as actual data, and is included in the definition of derived weather data. The derived weather data resulting from the filling operation can include, with respect to the filled station, the location of the one or more proximate stations used in the filling operation, as well as all NCDC data flags, for the day, from the weather data for the one or more proximate stations.

Compared to filling operations, backcasting operations are intended to fill longer periods (included open-ended periods) of missing data in the source data 1390, for example, to allow a 30-year old weather station to be used in simulations covering 50 years of data. Weather data from the 20 years prior to the installation of the 30-year old weather station can be generated by the backcasting operations. Backcasting the source data 1390 (or as, the case may be, the derived data resulting from the filling operation) can be performed for the enhanced weather stations, preferably after filling operations have been performed with respect to one or more weather stations, for example, by adding for any missing data the "backcast data" responsive to weather readings from any two or more "area" weather stations that reported valid data on the day of the missing weather readings. In certain embodiments, area weather stations may be within approximately eight (8) miles from the weather station for which the backcasting operation is performed (the "backcast station"). The backcast data can be determined responsive to probability data and distance data for each of the area stations. The probability data can be rescaled to the backcast station's scaled weather units. The rescaled values can then be used in systematic processing of inverse-distance weighting algorithms with respect to the distance data and the weather data for the area stations. The backcast data is included in the definition of derived weather data and can further include, with respect to the filled station, the location of the one or more area stations used in the backcast operation, as well as all NCDC data flags, for the day, from the weather data for the one or more area stations.

Analytic process 1322 can be performed upon the basis weather data 272 (which includes the source weather data 1390 and the derived weather data), such as determining for each weather station a history length; continuing reporting trends; and a statistical character for minimum temperature, maximum temperature, and precipitation. Final selection 1323 of weather stations can be performed, responsive to the analytic processing, to divide stations into two or more categories in exemplary embodiments. In an exemplary embodiment, a first category can include weather stations having a longer-term history (e.g., x>30 years) and exhibiting limited inter-temporal temperature trends (e.g., 0<x<0.09 degrees Fahrenheit). In further exemplary embodiments, a second category can include weather stations having an intermediate term history (e.g., 10<x<30 years) and limited inter-temporal temperature trends (e.g., 0<x<0.09 degrees Fahrenheit). In further exemplary embodiments, a third category can include weather stations having a longer-term history (e.g., x>30 years) and exhibiting an intermediate trend in temperature (e.g., 0.09<x<0.143) degrees Fahrenheit). And in further exemplary embodiments, a fourth category can include weather stations having a shorter term history and greater inter-temporal temperature trends than any of the first, second, or third categories. Such a categorization scheme beneficially accounts for reduced precision in trend and Beta parameter estimates associated with shorter-term data series. Accordingly, it some embodiments, it is advantageous, for example, to use the slope of the largest (in absolute value) of the statistically significant monthly trend parameters to quantify the station's trend. Final station selection is based on an analysis of historical reporting patterns, trend patterns, current reporting, and data consistency, and advantageously allows the formation of a dataset that comprising data used for enhanced basis weather data 272, which can provide the basis for weather-risk products generated according to embodiments of the invention.

Basis weather data 272 can be categorized or flagged accordingly to represent whether the associated weather station is or is not frequently updated, that is, whether the weather station is automated and, on the average, reports weather data more frequently than other weather stations. Categorizing frequently updated weather stations accordingly advantageously allows a weather-risk product to specifically based thereupon so that the weather-risk product results in a faster settlement time. Stations that are not frequently updated may include, for example, other automated stations or stations for which weather data is collected manually from National Weather Service.

The foregoing steps of downloading 1311 source data 1390; preparing source data 1390 for processing 1312; cleaning, filling, or backcasting 1321 the source data 1390 can be performed a first time to build the database, and can be performed at regular intervals (e.g., weekly or quarterly, or as frequently as needed) with respect to the latest weather data to update the basis weather data 272 with weather readings taken since the last performance. As can be shown with reference to FIG. 13c, the same steps of downloading 1311 source data 1390'; preparing source data 1390' for processing 1312; cleaning, filling, or backcasting 1321 the source data 1390' can be re-performed, but downloading 1311 source data 1390' only from those weather databases that provide ongoing updates, such as databases 1303-1305, for example. For the purpose of re-performing the forgoing steps, the source data 1390' can include any or all of the basis weather data 272 existing in the basis weather database 1230 immediately before the re-performance ("pre-existing basis weather data"). After the re-performance, the basis weather data update 272' includes the derived weather data 1391' resulting from the re-performance. In addition, preprocessing 1324 and exporting 1325 of the basis weather data update 272' can be performed so that the basis weather database 1230 can merge the pre-existing basis weather data 272 and the basis weather data update 272' to re-define the most current version of the basis weather data 272. Preprocessing 1324 can include, for example, analysis and recording of changes in any of the trend patterns previously observed in the analysis 1322 operation. Data to be imported into the basis weather database 1230 can be formatted for export to be joined to the pre-existing basis weather data 272.

The weather-risk product session database 1260 can be configured, for example, to store any data related to the operation of the virtual weather-data-station designer 230, the virtual weather-data generator 240, and the weather risk-product generator 250, including a session identifier for each unique set of interactions with a tract-user computer 200, user name or user identifier to identify the tract-user 285, any of the virtual weather-data station parameters 273, any of the virtual weather data 274. The virtual weather data 274 can be stored, organized, or configured in the same manner as is herein with respect to the basis weather data 272.

The weather-risk product administrative database 1240 can be configured, for example, to store any data related to user accounts, including user names, user identifiers, user addresses, user membership information, user payment records, user settlement records, data related to a user's tract, data related to a user's compliance with quality control standards, data related to weather-risk products selected, customized, or purchased by a user, and any other information related to a user, including a tract-user, as is known and understood by those skilled in the art. The weather-risk product administration database 1240 can include another weather-risk products inventory database (not pictured), for example, to store any data related to weather-risk products purchased by one or more users, for example data related to the scope or extent of coverage of various weather-risk products. For example, the weather-risk products inventory database can include data related to the geographic coordinates of the tract covered, the amount of coverage provided, the cost of various types of coverage, the liability of various types of coverage, or any other information related to coverage as is known and understood by those skilled in the art. The weather-risk products inventory database beneficially facilitates tracking, confirmation, and settlement of weather-risk products associated with each of the one or more users or an aggregate weather-risk product relating to two or more users.

Figure 13D:
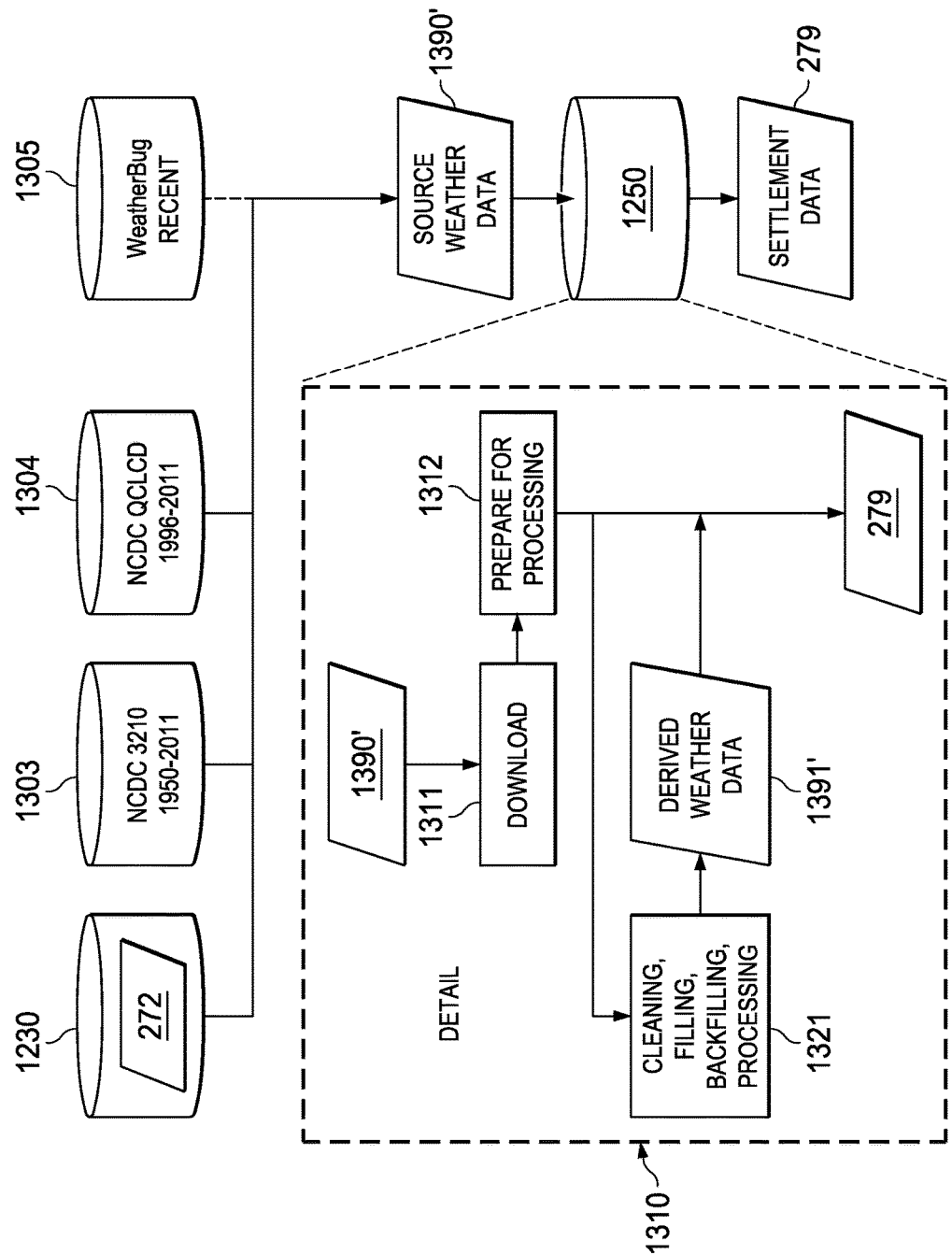

The weather-risk product settlement database 1250 can be configured, for example, to store any data related to the settlement of weather-risk products, including for example, settlement data 279. The settlement data 274 can be stored, organized, or configured in the same manner as is herein described with respect to the basis weather data 272. In addition, the foregoing steps of downloading 1311 source data 1390; preparing source data 1390 for processing 1312; cleaning, filling, or backcasting 1321 the source data 1390 can be performed regular intervals (e.g., weekly or daily) with respect to latest weather data to provide current settlement data 279. Settlement data 279 is a composite dataset maintained to allow settlement of weather-risk products. Weather-risk products can be analyzed with respect to the settlement data 279, also on a regular basis, to determine which weather-risk products, if any, can be processed for settlement. As can be shown with reference to FIG. 13d, the same steps of downloading 1311 source data 1390'; preparing source data 1390' for processing 1312; cleaning, filling, or backcasting 1321 the source data 1390' can be re-performed, but downloading 1311 source data 1390' only from those weather databases that provide ongoing updates, such as databases 1303-1305, for example. For the purpose of re-performing the forgoing steps, the source data 1390' can include any or all of the pre-existing basis weather data. The settlement data 279 can be stored at the settlement database 1250 and includes the derived weather data 1391' resulting from the re-performance as well as any or all of the source weather data 1390'.

Certain exemplary embodiments of the invention include a weather-risk-product customization system having a virtual weather-data-station designer 230, a virtual weather-data generator 240, and a weather risk-product generator 250. The virtual weather-data-station designer 230, virtual weather-data generator 240, and weather risk-product generator 250 can be, for example, computer program products virtual weather-data-station designer program product 930, virtual weather-data generator program product 940, and a weather risk-product customizer program product 950, stored in computer-readable memory of, and executable on processors of, one computer or more than one separate computers. As can be shown with reference to FIG. 8, each of the virtual weather-data-station designer 230, virtual weather-data generator 240, and weather risk-product generator 250 can be stored as program products on virtual weather-data-station designer computer 830, virtual weather-data generator computer 840, and weather risk-product customizer computer 850, respectively, in a respective memory 831, 841, and 851. Each of the computers 830, 840, and 850 can be components of system 800 and can be positioned in communication with other components of system 800, such as one or more tract-user computers 200, through the communications network 801. Also, as can be shown with reference to FIG. 9, virtual weather-data-station designer 230, the virtual weather-data generator 240, and the weather risk-product generator 250 may be implemented as virtual weather-data-station designer program product 930, virtual weather-data generator program product 940, and a weather risk-product customizer program product 950, respectively, and stored in the non-transitory memory 911 of a risk-product issuer computer 910 connected to the communications network 801. Those having skill in the art will understand that other embodiments are within the scope of the disclosure, such as those embodiments in which any one or more of the virtual weather-data-station designer program product 930, virtual weather-data generator program product 940, and a weather risk-product customizer program product 950 are stored in the non-transitory memory of any of the tract-user computer 200, the risk-product issuer computer 910, any of computers 830, 840, 850, 910, or any other one or more computers connected to communications network 801.

As will be appreciated by those having skill in the art, computer program products described herein can be designed, programmed, compiled, optimized, executed, or otherwise implemented according to any of various compatible programming languages, standards, libraries, application programming interfaces, protocols, development environments, or production environments. Exemplary embodiments of the invention described herein, for example, can be provided using ASP.Net 3.5 with Microsoft AJAX 2.0 Support, AJAX Controls, and AJAX Control Toolkit.

As can be shown with reference to FIGS. 8-9, computers 830, 840, 850, 910 can include, according to various exemplary embodiments of the invention, at least a memory 831, 841, 851, 911; a processor 832, 842, 852, 912; and an input/output device 833, 843, 853, 913. The processor 832, 842, 852, 912 can include, for example, one or more micro processors, microcontrollers, and other analog or digital circuit components configured to perform the functions described herein. The processor 832, 842, 852, 912 is the "brains" of the computer 830, 840, 850, 910, and as such, can execute computer program product or products.

The processor 832, 842, 852, 912 can be any commercially available terminal processor, or plurality of terminal processors, adapted for use in or with the computers 830, 840, 850, 910. The processor 832, 842, 852, 912 can be, for example, the Intel® Xeon® multicore terminal processors, Intel® micro-architecture Nehalem, and AMD Opteron™ multicore terminal processors, Intel® Core® multicore processors, Intel® Core 8 Duo® multicore processors, and other processors with single or multiple cores as is known and understood by those skilled in the art. The processor 832, 842, 852, 912 can be operated by operating system software installed on memory 831, 841, 851, 911, such as Windows Vista, Windows 7, Windows XP, UNIX or UNIX-like family of systems, including BSD and GNU/Linux, and Mac OS X. The processor 832, 842, 852, 912 can also be, for example the TI OMAP 3430, Arm Cortex A8, Samsung S5PC100, or Apple A4. The operating system for the processor 832, 842, 852, 912 can further be, for example, the Symbian OS, Apple iOS, Blackberry OS, Android, Microsoft Windows CE, Microsoft Phone 7, or PalmOS.

The computer 830, 840, 850, 910 can further include a non-transitory memory or more than one non-transitory memories (referred to as memory 831, 841, 851, 911 herein). Memory 831, 841, 851, 911 can be configured, for example, to store data, including computer program product or products, which include instructions for execution on the processor 832, 842, 852, 912. Memory 831, 841, 851, 911, can include, for example, both non-volatile memory, e.g., hard disks, flash memory, optical disks, and the like, and volatile memory, e.g., SRAM, DRAM, and SDRAM as required to support embodiments of the instant invention. As one skilled in the art will appreciate, though the memory 831, 841, 851, 911 is depicted on, e.g., a motherboard, of the computers 830, 840, 850, 910, the memory 831, 841, 851, 911 can also be a separate component or device, e.g., flash memory, connected to the computers 830, 840, 850, 910 through an input/output unit 833, 843, 853, 913 or a transceiver (not shown). As one skilled in the art will understand, the program product or products, along with one or more databases, data libraries, data tables, data fields, or other data records can be stored either in memory 831, 841, 851, 911 or in separate memory (also non-transitory), for example, associated with a storage medium such as a database 270 locally accessible to the computers 830, 840, 850, 910, positioned in communication with the computers 830, 840, 850, 910 through the I/O 833, 843, 853, 913.

Figure 14:
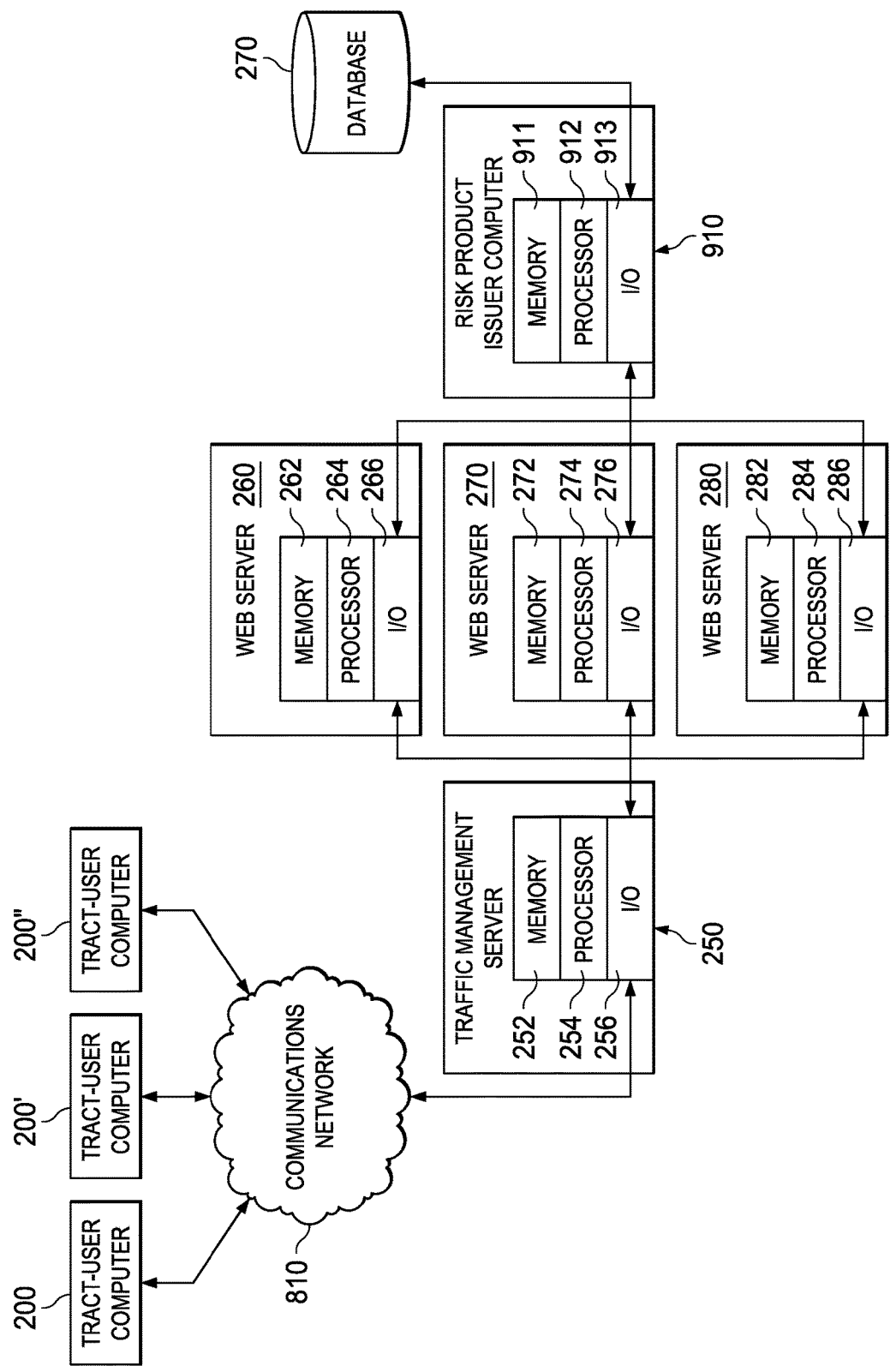
FIG. 14 is a schematic diagram illustrating an exemplary architecture of a system according to one or more embodiments of the invention.

Moreover, as is perhaps best illustrated in FIG. 14, the weather-risk-product customization system can further include, for example, a traffic management server 1410, having at least a memory 1411, a processor 1412, and an input/output device 1413 that is adapted to be in communication with one or more web servers 1420, 1430, 1440, each having at least a memory 1421, 1431, 1441; a processor 1422, 1432, 1442; and an input/output device 1423, 1433, 1443. The one or more web servers can be adapted to be in communication with the risk-product issuer computer 900, which in turn can be adapted to be in communication with the database 270. The traffic management server 1410 can, in turn, be adapted to be in communication with one or more tract-user computers 1450, 1460, 1470 via the communications network 810. According to various exemplary embodiments of the present invention, the traffic management server 1410 can be configured to analyze incoming data from the one or more tract-user computers 200, 200', 200", and route the incoming traffic from the one or more tract-user computers 200, 200', 200", to one of the one or more web servers 1420, 1430, 1440 based on the quantity of incoming data traffic and the quantity of data traffic currently being serviced by each of the one or more web servers 1420, 1430, 1440.

Advantageously, each of the web servers 1420, 1430, 1440 can be configured, for example, to display on one of the one or more tract-user computers 1450, 1460, 1470 via the communications network 810, one or more graphical user interfaces to facilitate selection, customization, confirmation, and purchase of a unique, customized weather-risk product by a tract-user according to an exemplary embodiment of the invention as further described with reference to FIGS. 1, 4-7.

For example, the processor 912 can execute computer program product or products stored in memory 911 of the risk-product issuer computer 910 including, for example, a virtual weather-data-station designer program product 930, to facilitate the selection by a user of virtual weather-data-station parameters for a virtual weather-data station for a tract; a virtual weather-data generator program product 940 to facilitate the generation of virtual weather data for a virtual weather-data station for a tract; and a weather risk-product customizer program product 950 to facilitate the selection by a user of customized contract parameters for a weather-risk product, the confirmation by a user of the hypothetical performance of the customized contract parameters with respect to the virtual weather data, the generation of a customized weather-risk product with respect to the customized contract parameters and the virtual weather data, and the purchase by a user of the customized weather-risk product.

Furthermore, the processor 912, upon executing the weather risk-product customizer program product 950, can be commanded by the user to re-execute any of the virtual weather-data-station designer program product 930 to facilitate the re-selection by a user of revised virtual weather-data-station parameters for a virtual weather-data station for a tract; the virtual weather-data generator program product 940 to facilitate the re-generation of revised virtual weather data for a virtual weather-data station for a tract; or the weather risk-product customizer program product 950 to facilitate the re-selection by a user of revised customized contract parameters for a weather-risk product, the re-confirmation by a user of the hypothetical performance of the revised customized contract parameters with respect to the revised virtual weather data, the generation of a revised customized weather-risk product with respect to the revised customized contract parameters and the revised virtual weather data, and the purchase by a user of the revised customized weather-risk product.

A risk-product customization system according to various exemplary embodiments of the present invention can provide a framework and a construct for users, such as, for example, farm operators, to explore and customize the design and structure of weather-risk products that reflect their risk management needs and to purchase a customized weather-risk product reflecting customized parameters from one or more risk-product issuing entities. The risk-product customization system further allows the one or more risk-product issuing entities to generate a customized virtual weather-data station, having virtual weather data, according to the selections of one or more users. Accordingly, the risk-product customization system according to various exemplary embodiments of the present invention can also provide a framework and construct for users to explore and customize virtual weather-data stations reflecting a unique applicability to the user's risk management needs and to purchase a customized weather-risk product further reflecting the virtual weather data of the virtual weather-data station from one or more risk-product issuing entities.

The tract-user can first select the geographic parameters of a virtual weather-data station for the tract using a graphical user interface display. The geographic parameters can be selected with specific reference to a displayed map image including the tract and also including markers for weather stations on or near the user's tract. The geographic parameters can be graphically selected on the graphical user interface display so that the user appears to be selecting one or more weather-station markers enclosed within a selection box, a selection circle, or other type of "lasso" selection tool that the user can control on the graphical user interface display.

The tract-user can next select one or more individual weather stations (i.e., user-selected weather stations), using a graphical user interface display, that correspond to the weather-station markers that were previously selected by being enclosed by the user within the selection box, selection circle, or other type of lasso selection tool. The user can then weight the user-selected weather stations, using a graphical user interface display to select user-selected weights for the user-selected weather stations, according to the unique risk-management needs of the tract-user, for example, to design a hypothetical weather station that can be presumed to reflect the actual weather experienced on the user's tract (i.e., a custom virtual weather-data station).

The risk-product issuer computer can next generate virtual weather data for the virtual weather-data station by selecting from a national weather database the weather records relating to the user-selected weather stations and applying the user-selected weights to the weather data for the user-selected weather stations. The risk-product issuer computer can store the virtual weather data for the custom virtual weather-data station in a session database so that the virtual weather data can be used to model the hypothetical performance of a weather-risk product based upon the virtual weather data and so that customized contract terms can be determined for a weather-risk product based upon the virtual weather data.

The tract-user can next select one or more weather-risk parameters (i.e., user-selected weather-risk parameters), using a graphical user interface display, to allow a proposed weather-risk product to be presented to the user so that the user can confirm the performance of the weather-risk product.

The risk-product issuer computer can next generate timeframe-specific virtual weather data for the virtual weather-data station responsive to the user-selected weather risk parameters by selecting from the virtual weather data the weather records relating to the user-selected weather-risk parameters. In addition, the risk-product issuer computer can determine customized contract terms for the proposed weather-risk product responsive to the timeframe-specific for the virtual weather-data station responsive to the user-selected weather risk parameters responsive to actuarial tables.

The tract-user can then confirm whether a proposed weather-risk product having the user-selected weather risk parameters and the customized contract terms performs to the user's satisfaction with respect to the timeframe-specific virtual weather data, thereby providing a simulated performance of the proposed weather-risk product. If the user is satisfied with the performance of the proposed weather-risk product and confirms the user-selected weather risk parameters and the customized contract terms, the user can purchase a weather-risk product to be generated, and the risk-product issuer computer can so generate the weather-risk product, responsive to the user-selected weather risk parameters and the customized contract terms. Alternatively, if the user is not satisfied with the performance of the proposed weather-risk product. The user-selected weather risk parameters, or the customized contract terms, the user can return to re-select the geographic parameters of a virtual weather-data station for the tract, re-select one or more user-selected weather stations, re-select the user-selected weights, or re-select one or more weather-risk parameters. In response to any of the foregoing re-selections, the risk-product risk issuer computer can perform any of the foregoing steps described with respect to the original selection.

Figure 3A:
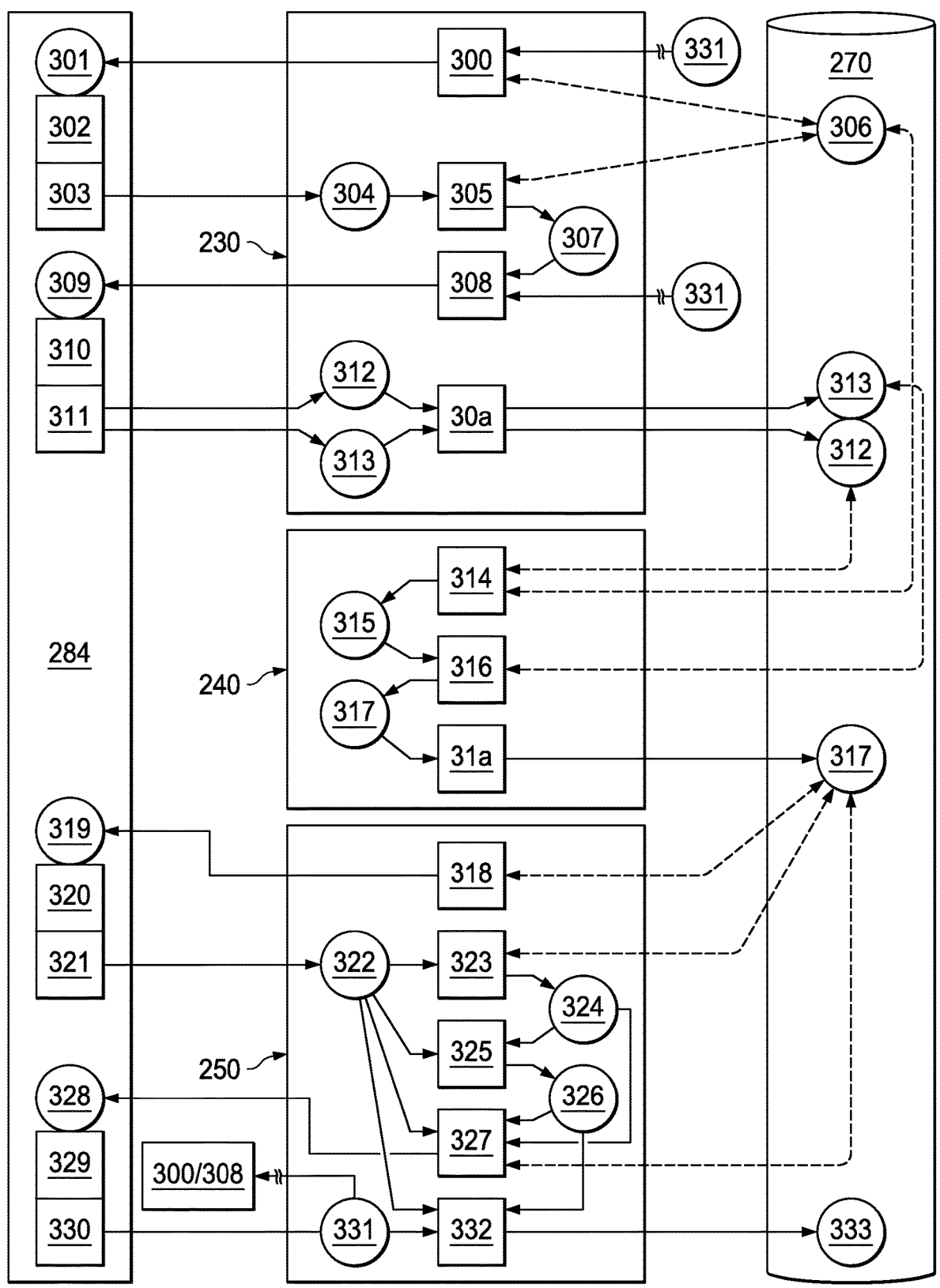
FIG. 3a is a schematic diagram and flow chart illustrating exemplary process flow and data flow according to one or more embodiments of the invention.

With reference to FIGS. 2 and 3*a*, certain functional aspects of the virtual weather-data-station designer 230, the virtual weather-data generator 240, and the weather risk-product generator 250 can be shown. FIG. 2 contains a schematic which shows the interface-enabled interaction and data transfer between the user 285, the display 284 at the tract-user computer 200, and each of the virtual weather-data-station designer 230, the virtual weather-data generator 240, and the weather risk-product generator 250. The schematic of FIG. 2 further shows the data transfer between the database 270 and each of the virtual weather-data-station designer 230, the virtual weather-data generator 240, and the weather risk-product generator 250. FIG. 3*a* contains a flow chart that mirrors the schematic blocks that appear in FIG. 2 and incorporates a process flow chart, wherein the square elements represent programmatic steps and circle elements represent data. The positions of the circle elements and the arrows in FIG. 3*a* represent the receipt and transfer of the data according to exemplary embodiments, and the position of square elements represents the execution of the programmatic step according to the exemplary embodiments.

According to certain exemplary embodiments of the invention, as can be shown with reference to FIG. 2, the virtual weather-data-station designer 230 allows a user to configure a virtual weather-data station for a tract. The virtual weather-data-station designer 230 provides a geographic weather-data selection interface 301 and a source selection interface 309 to be displayed to a user 285 at a display 284 of the tract-user computer 200. The geographic weather-data selection interface 301 and the source selection interface 309 incorporate map data 271 representing geographic and political properties of the earth surface as well as basis weather data 272 representing the properties of a plurality of weather stations positioned at different locations on the earth surface. The plurality of weather stations represent, for example, weather stations reporting source weather data 1390 as is described herein with reference to FIG. 13*b*.

The series of operations performed by the virtual weather-data-station designer 230 can be shown by reference to the flow chart in FIG. 3*a*. In exemplary embodiments of the invention, the virtual weather-data-station designer 230 can perform a step of generating 300 the geographic weather-data selection interface 301 to display to the user 285 at a display 284 at the tract-user computer 200, and the virtual weather-data-station designer 230 can also perform a step of generating 308 the source selection interface 309 to display to the user 285 at a display 284 at the tract-user computer 200.

According to exemplary embodiments of the invention, as can be shown by reference to FIG. 1, interface display 100 is displayed to the user 285 at the display 284 by the geographic weather-data selection interface 301. The geographic weather-data selection interface 301, and interface display 100 in particular, allow the user 285 at the tract-user computer 200 to select the geographic parameters of a virtual weather-data station for the tract using a graphical user interface display. The geographic parameters can be selected with specific reference to a displayed map image including the tract and also including markers for weather stations on or near the user's tract. The geographic parameters can be graphically selected on the graphical user interface display so that the user appears to be selecting one or more weather-station markers enclosed within a selection box, a selection circle, or other type of "lasso" selection tool that the user can control on the graphical user interface display.

Interface display 100 includes a geographic map image 191, which corresponds to a geographic coordinate system. Although geographic map image 191 appears as a drawing or a schematic rendition of the earth surface, geographic map image may also be, for example, a satellite image or any other representation of the earth surface. The correspondence between map image 191 and the geographic coordinate system allows each point in the map image 191 to correspond to a respective location on the earth surface, both of which can be identified by one or more coordinates in the geographic coordinate system. Likewise, the features appearing on the map image 191, such as color, terrain styling, labels, and so on can correspond to the features of the earth surface at the corresponding location on the earth surface. Map image 191 can include, for example, a raster image or a vector image stored as map data 271 at the database 270. Map image 191 includes all icons, dots, keys, geographic or political markers, boundaries, features, labels, roads, boundaries, borders, etc. ("map features") that appear overlaid or incorporated therein with reference to interface display 100. As will be appreciated by those having skill in the art, any of such map features can also correspond to a respective location on the earth surface, for example, county line 193. As those having skill in the art will appreciate, the map features can also be sourced from the same, or from a different, raster image or vector image stored as map data 271 at the database 270.

As can be further shown in FIG. 1, the map image 191 can also have overlaid or incorporated therein a plurality of weather-station markers, such as weather-station markers 101, 102, 103, 104, 105, 106, 107. Each of the weather-station markers 101, 102, 103, 104, 105, 106, 107 can be overlaid on the map image 191, for the purpose of display at the display 284, at a position thereon based on the location of an existing actual weather station on the earth surface. The location of the existing actual weather stations can be defined in the basis weather data 272 at the database 270 according to the common geographic coordinate system. Accordingly, each of the weather-station markers appears on the geographic map image 191 at a position corresponding to the location of the actual weather station on the earth surface. Each of the weather-station markers, for example, weather-station marker 103, is anchored to a specific position on the geographic map image so that the weather-station marker appear to be at the same location on the earth surface in the map image 191 regardless of changes in scale (e.g., zoom) and focus (e.g., pan) of the map image 191.

As can be further shown in FIG. 1, each of the weather-station markers, for example weather-station marker 101, includes a weather-station marker name, such as weather-station marker name 192, displayed adjacent to the weather-station marker so that a user is able to readily identify a particular weather-station marker not only with reference to the position of the weather-station marker on the geographic map image 191, but also based on the user's knowledge of the weather-station marker name. As will be understood by those having skill in the art, the weather-station marker names, as well as other properties of the weather stations that can be displayed in the map image 191, can also be defined in the basis weather data 272 at the database 270.

The geographic map image 191 and the weather-station markers 101-108 overlaid thereon or incorporated therein are referred to herein as a composite weather-station map. As will be understood by those having skill in the art, the composite weather-station map, depending on a scale factor, may be larger than can be viewed by the user 285 and displayed in the map window 190 of the interface display 100. As those having skill in the art will appreciate, more or less of the map image 191 may be visible in map window 190 at any given image resolution based on the physical dimensions of the display 284. Accordingly, the portion of the composite weather-station map displayed in the map window 190 can be adjusted by the user 285 using well-known map control functions such as the so-called "pan" and "zoom" functions. As can be shown with reference to FIG. 1, zoom control buttons (zoom in and zoom out) 161 can control the scale of the composite weather-station map and pan control button 162 can control the scope of the composite weather-station map displayable on the display 284. The zoom control buttons 161 and the pan control buttons 162 allow the user 285 to configure the composite weather-station map so that the location of the relevant tract on the earth's surface can be represented by the composite weather-station map appearing at the display 284. In addition, pan and zoom functions may be implemented according to other techniques known to those having skill in the art, such as click-and-drag to pan or a zooming selection box, where the zoomed map image corresponds to the area selected via the selection box. To allow the user to observe the scale of the map image, a scale value can be displayed to the user 285, for example, by a scale reference area 130.

An exemplary embodiment in which the map image 191 is zoomed out can be shown with reference to FIG. 4b. As can be shown with reference to the scale reference 130, the resolution of the map image 191 is such that the length dimension of the scale reference 130 corresponds to 1500 miles on the surface of the earth. As can be shown with reference to FIG. 4c, a zooming selection box 404 can be created by the user with a cursor in the manner described herein with respect to a user-selected map area 153. The geographic coordinates corresponding to the vertices of the zooming selection box 404 can be used to re-frame the map image 190 upon zooming in on the map image 190 responsive to the selection of the zooming selection box 404.

Figure 4A:
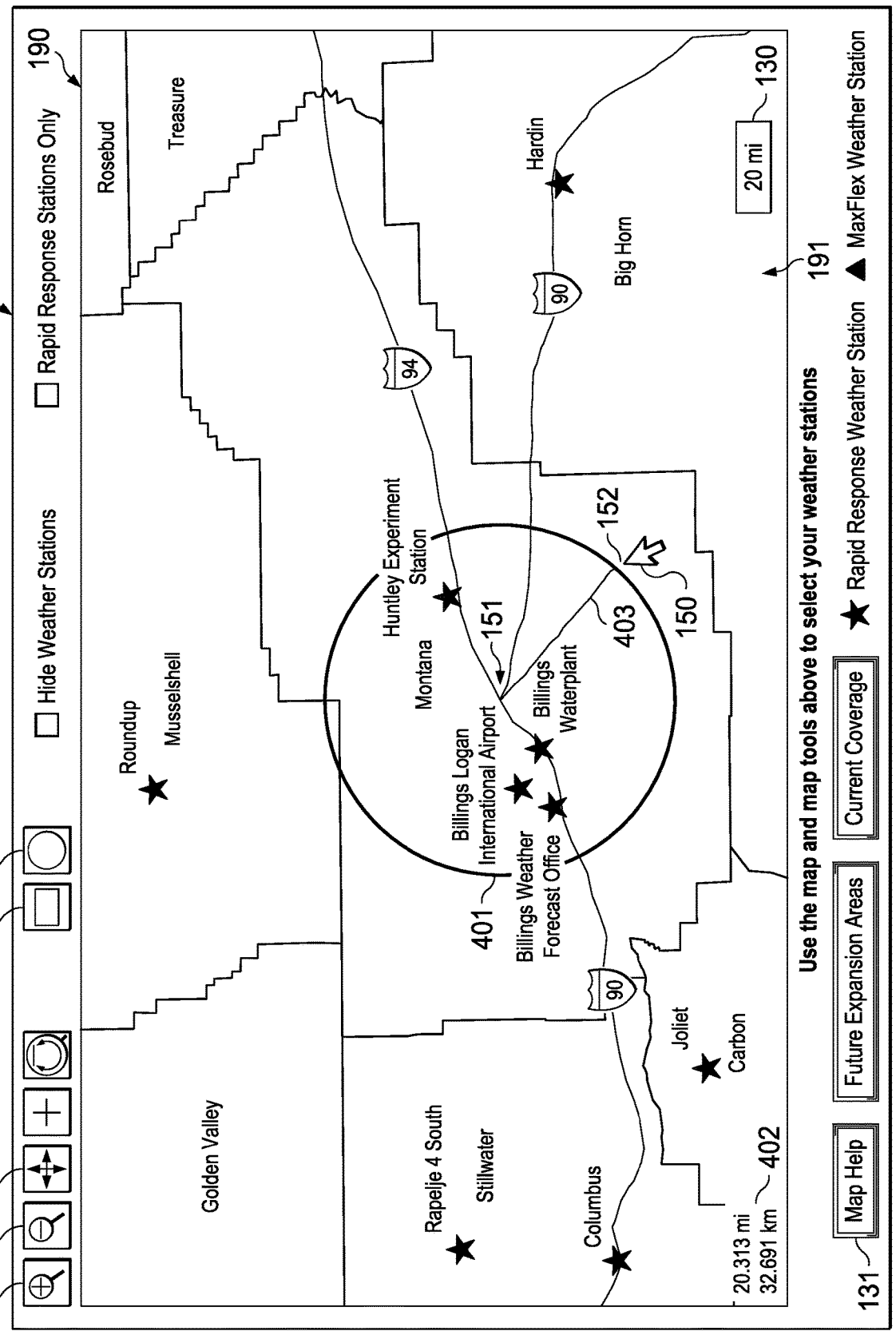
Figure 4D:
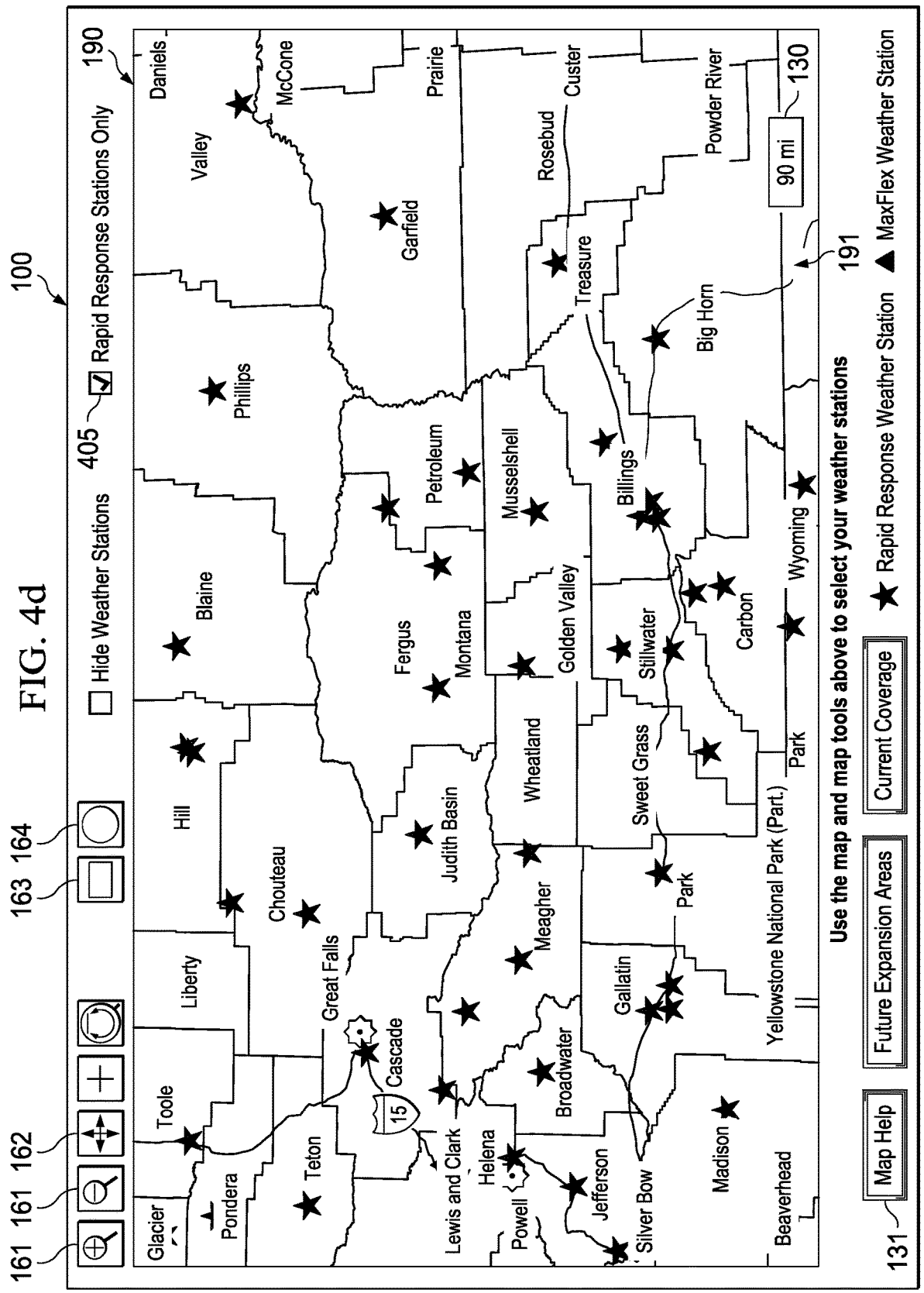

An exemplary embodiment in which the map image 191 is zoomed in can be shown with reference to FIG. 4d. For example, the map image 190 is shown being re-framed responsive to the selection of zooming box 404 from FIG. 4c, and it should be noted that the length dimension of the scale reference 130 in the re-framed (i.e., zoomed-in) map image 190 corresponds to 90 miles on the surface of the earth. At this resolution level for example, the user can observe landmarks such as county lines 493 and city makers 490 that are not displayed at more distant zoom levels. In addition, at such a zoom level it is practical to show weather-station markers, such as weather-station marker 492, which can be toggled on or off using the weather station toggle selector 491.

Figure 4E:
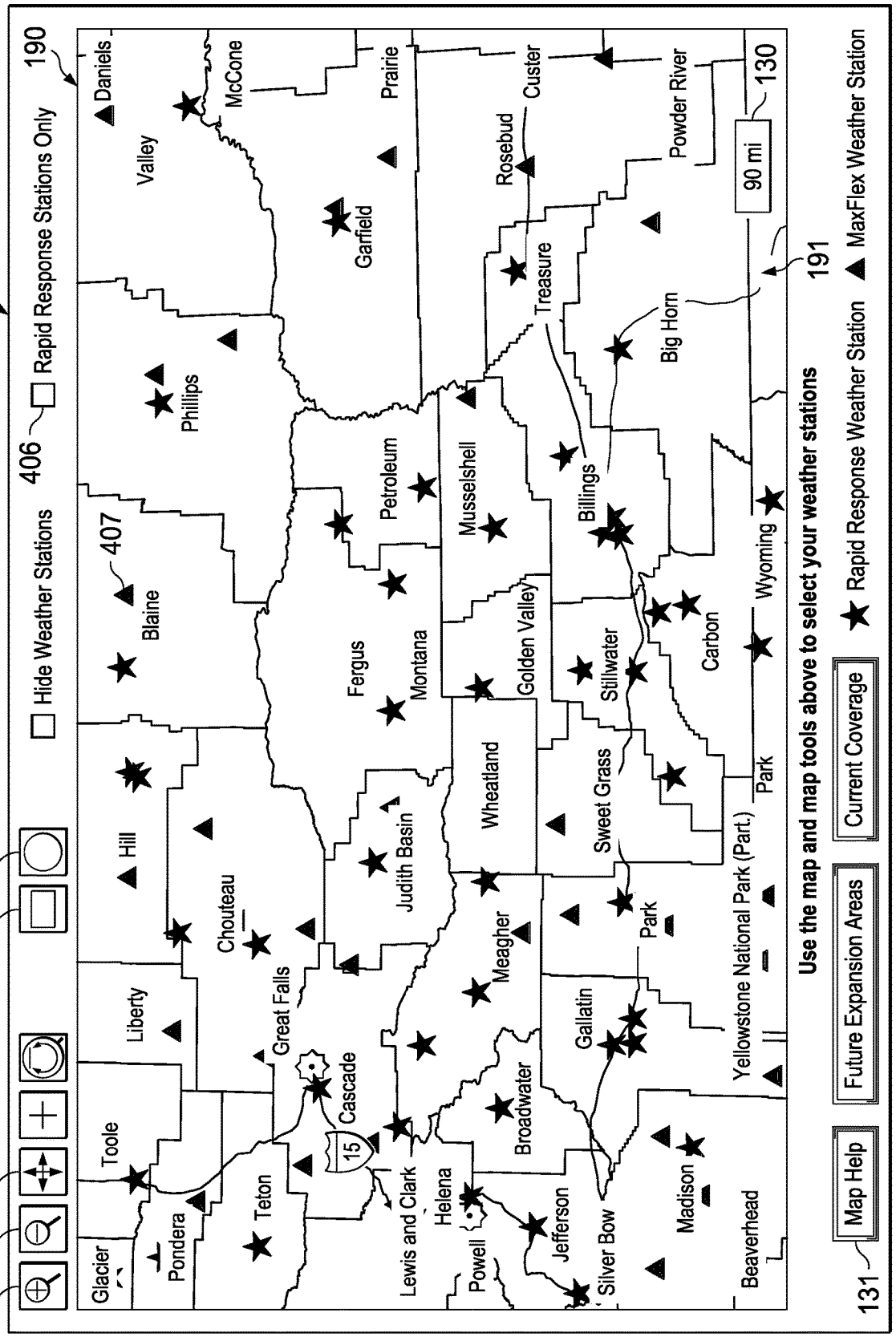
Figure 4F:
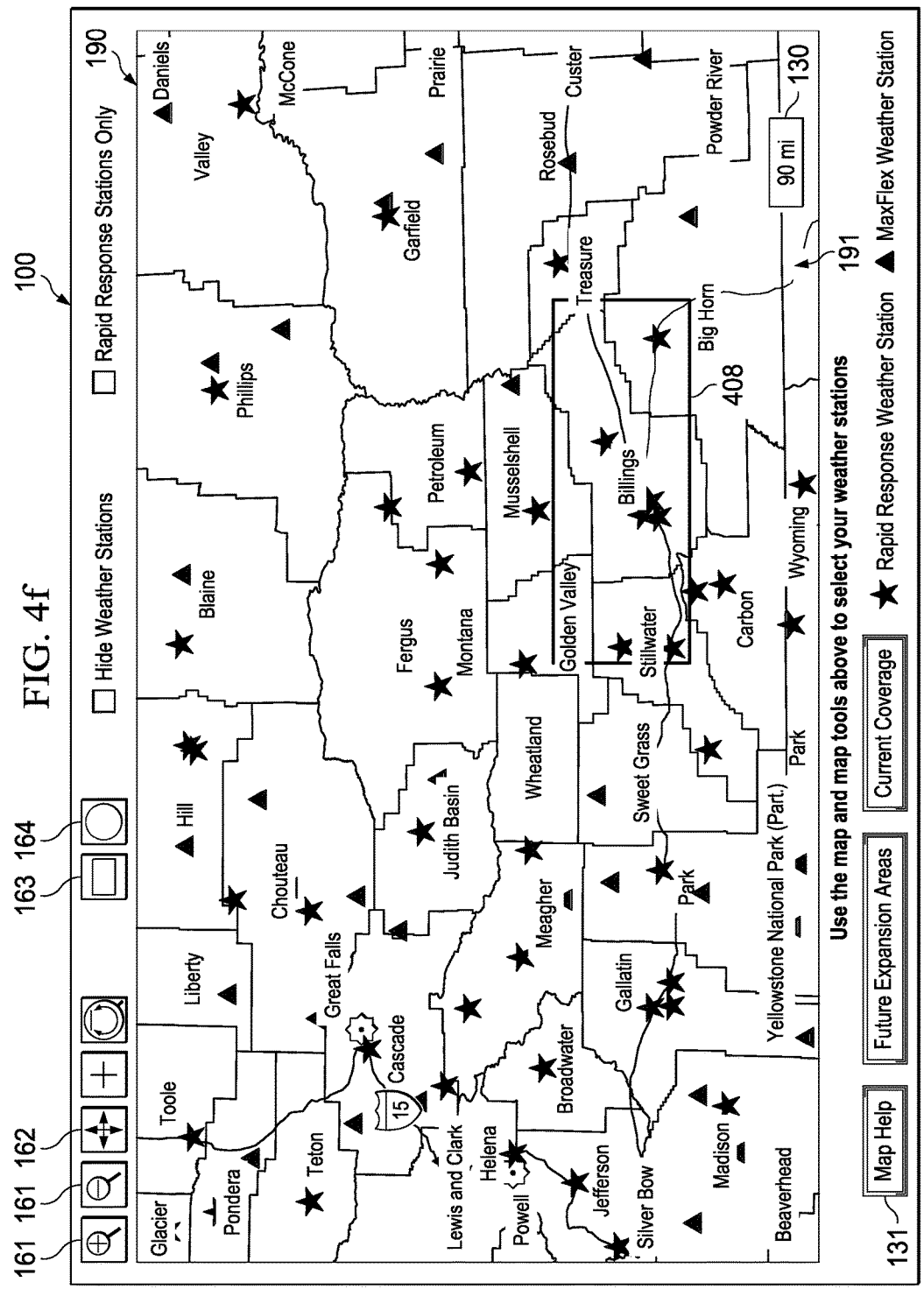

An exemplary embodiment in which the map image 191 can variably display all weather-station markers or weather-station markers only for stations that are frequently updated can be shown with reference to FIGS. 4d-4e. In FIG. 4d, for example, the rapid response toggle control 405 is selected, resulting the map image 191 displaying weather-station markers for only those stations that are frequently updated. In contrast, FIG. 4e shows that rapid response toggle control 406 is de-selected, resulting in the map image 191 displaying weather-station markers for all weather stations located in the area represented by the map image 191.

Figure 4G:
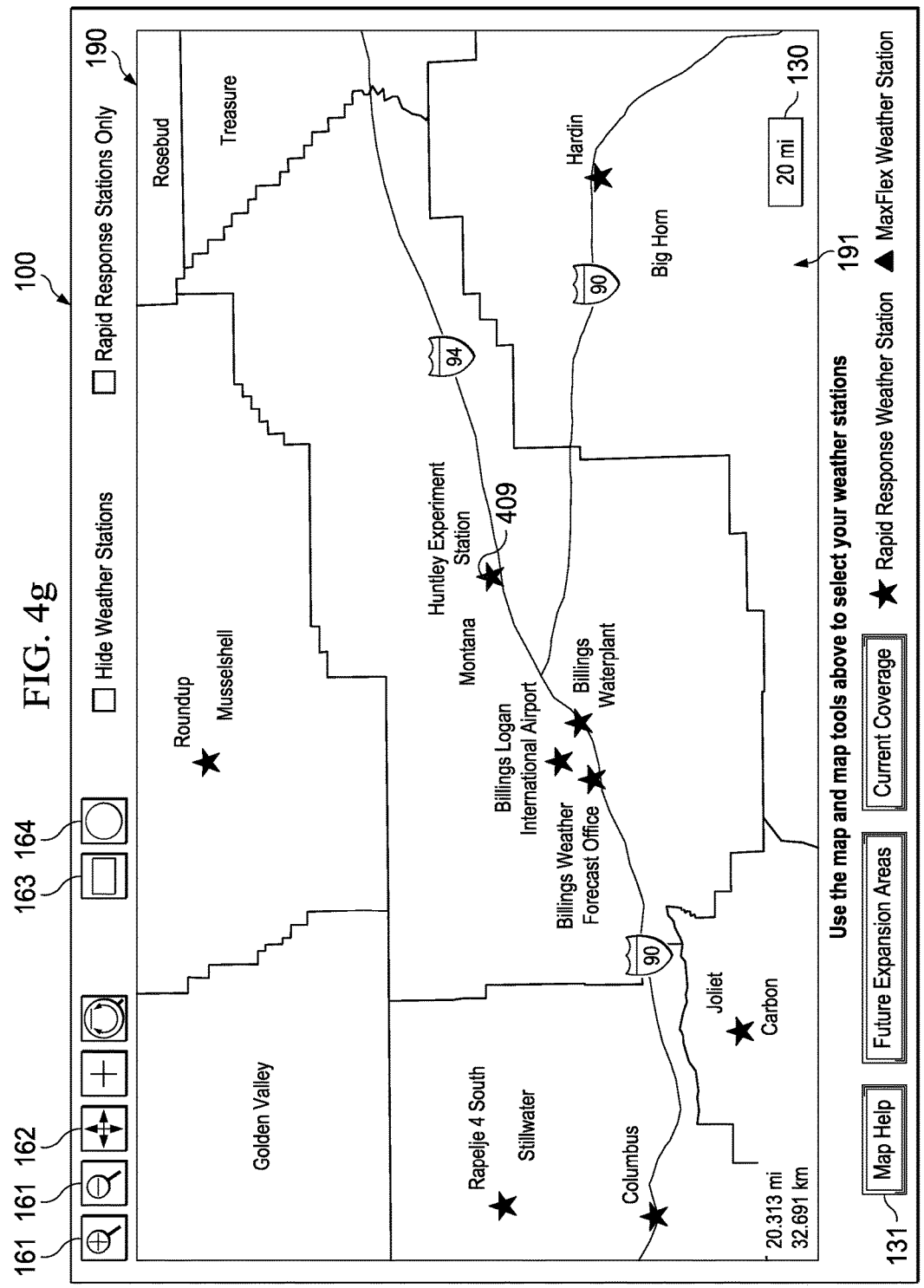
Figure 4I:
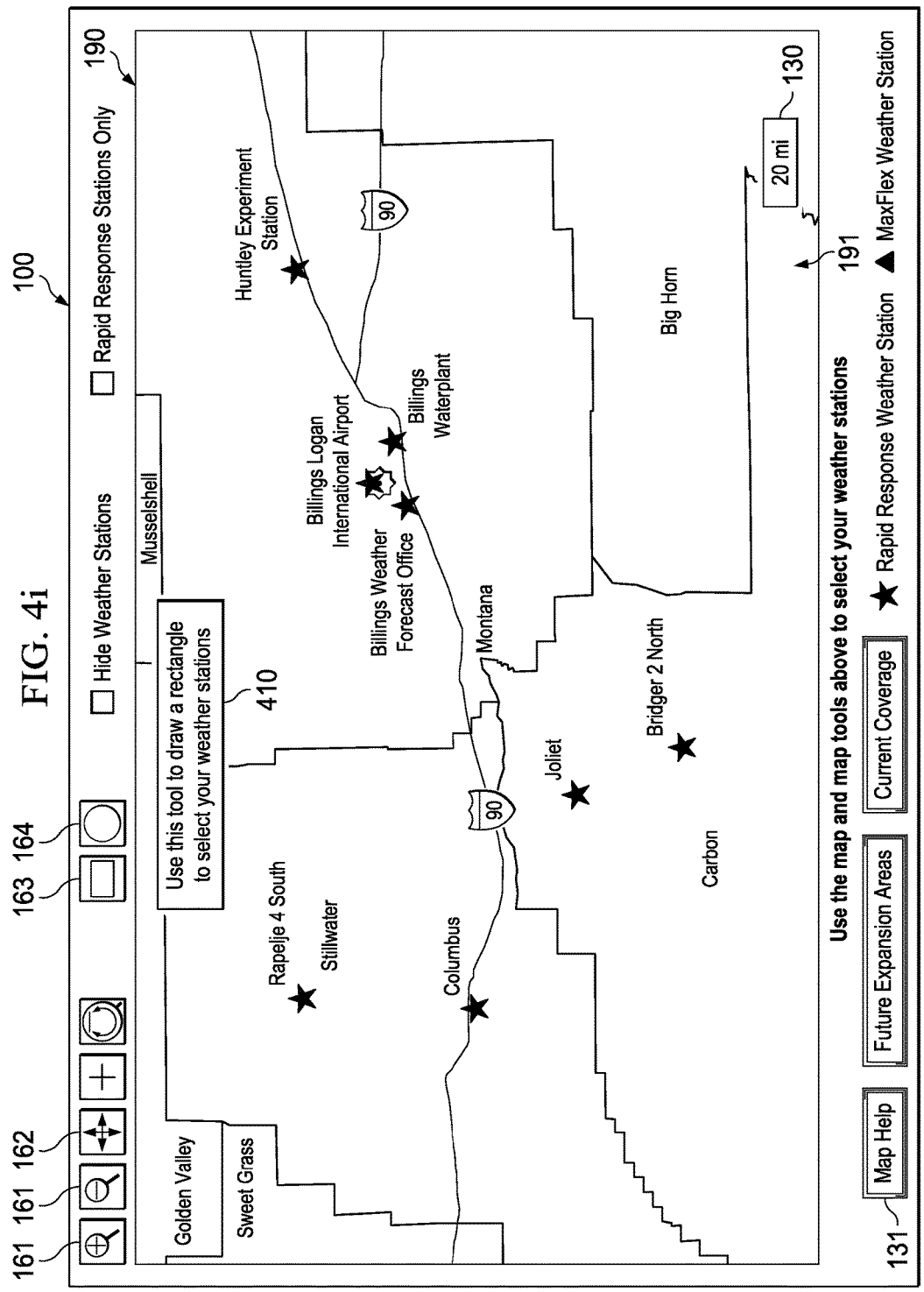

Another exemplary embodiment in which the map image 191 is zoomed in can be shown with reference to FIG. 4g. For example, the map image 190 is shown being re-framed responsive to the selection of zooming box 408 from FIG. 4f, and it should be noted that the length dimension of the scale reference 130 in the re-framed (i.e., zoomed-in) map image 190 corresponds to 20 miles on the surface of the earth. At this resolution level for example, the user can even more clearly ascertain or discern landmarks such as county lines, city markers, and weather-station markers, such as weather-station marker 409.

An exemplary embodiment in which the map image 191 is panned can be shown with reference to FIG. 4h. For example, the map image 190 is shown being re-framed responsive to a click-and-drag style pan to left, and it should be noted that the area represented in FIG. 4g has shifted to the right in FIG. 4h, for example, by noting and comparing the positions of weather-station marker 409 in FIGS. 4g-4h in the map image 191.

As can be further shown with reference to FIG. 1, the weather-station markers 101-108 can serve as landmarks, along with other map features, which allow the user 285 to recognize whether the relevant tract is currently being represented by the composite weather-station map displayed at the display 284 or to determine whether the use of pan or zoom functions are required to bring the relevant tract into the composite weather-station map to be displayed at the display 284. As will be known to those having skill in the art, the geographic map image includes other landmarks such as bodies of water, land masses, county names, county lines, city markers, roads, all of which may be sourced from the same, or from a different, raster image or vector image stored as map data 271 at the database 270.

Those having skill in the art will appreciate various techniques for sourcing, generating, or displaying the geographic map image 191 being associated with a geographic coordinate system, including any features or other images overlaid thereon or incorporated therein, and facilitating the display and user-control of panning, zooming, selection, and so on with respect to the geographic map image 191. For example third-party software tools available to implement the functionality described herein include "ASP Map" by VDS Technologies of Dover Delaware and "Bing Maps" by Microsoft Corporation of Redmond, Wash.

With further reference to the flow chart in FIG. 3a, the geographic weather-data selection interface 301 allows the user 285, who is observing the interface display 100 on the display 284 of the tract-user computer 200, to graphically select 302 a plurality of geographic parameters 304 for the relevant tract. The plurality of geographic parameters 304 for the relevant tract define an area of the composite weather-station map that corresponds to the tract on the earth surface. The plurality of geographic parameters 304 are used in customizing the virtual weather-data station for the tract. Certain embodiments allow the selection of the plurality of geographic parameters 304 through a graphical selection feature allowing the selection of a user-selected map area as can be shown by user-selected map area box 153. The user-selected map area box 153 provides a graphical representation of the user-selected map area viewable by the user. Although the boundaries of the user-selected map area may mirror the tract exactly, the user-selected map area may also be an approximation of the tract or a superset or a subset of the tract. The user-selected map area may be larger than the tract, for example, if the user wishes to define the user-selected map area so as to include certain weather-station markers within the user-selected map area, thereby selecting such weather-station markers for inclusion into the virtual weather-data station. Accordingly, the user-selected map area can represent any area of interest to the user with respect to the tract. For example, the user may select the user-selected map area specifically to incorporate certain weather stations, thus using the user-selected map area selection box 153 as a "lasso" to select certain weather-stations. A user may also select the user-selected map area so that the user-selected map area selection box represents the boundaries of the tract. In all cases, however, the user-selected map area is selected by the user 285 with specific reference to the map features appearing on the composite weather-station map at the display 284, including any of the weather stations markers 105-108, or other geographic or political features, landmarks, or labels, e.g., label 192 appearing overlaid on or incorporated in the geographic map image 191.

As can be shown with reference to FIG. 4a, the user-selected map area selection box is not limited to being rectangular in shape but may also be, for example, a circle 401. In other embodiments, for example, the user-selected map area selection box 153 may be any n-sided concave or convex polygon (not pictured). In embodiments where the user-selected map area selection box 401 is a circle, there can be overlaid on the map image 191 in the map window 190 certain information 402 concerning the radius of the user-selected map area selection box 401. In addition, the user-selected map area selection box 401 can include a radial indicator 403 to allow the user to visually represent the linear distance between the first selection point 151, at the center of the selection box 401 and the location of the cursor 150 at the second selection point 152 at the circumference of the selection box 401.

Each position of the map image 191 correlates to a unique set of geographic coordinates in the geographic coordinate system, and the user-selected map area 153 also correlates to one or more unique sets of geographic coordinates in the geographic coordinate system. The plurality of geographic parameters 304 are any one or more values that can define the user-selected map area 153, which can be the tract, for example, in the geographic coordinate system. Accordingly, in certain embodiments, the geographic parameters 304 may be one or more coordinate sets defining, for example, the coordinates of the rectangular vertices, i.e., points 151 and 152, of the user-selected map area 153. The geographic parameters 304 may also include the coordinates of one rectangular vertex, e.g., point 151, of the user-selected map area 153 and any number of values representing the x-dimension, and y-dimension of the user-selected map area 153 with respect to the one rectangular vertex 151. Those having skill in the art will recognize any other set of values that can be used to define an area of the tract, such as a center point and a radius of a circular user-selected map area or any values representing the vertices of any n-sided polygonal shape.

As can be shown with reference to FIG. 1, user 285 at the tract-user computer 200 can control the position of cursor 150. Cursor 150 is a reference to a variable position on the display 284 or in the interface display 100 corresponding to an input device adapted to receive input from the user 285 with respect to the position on the display 284 or the interface display 100. The cursor 150 may include a movable visual indicator, such as a mouse arrow as shown in FIG. 1. In certain circumstances, however, no visual indicator is required, for example, if the input device is a touch screen, and the user's finger serves as a visual indicator of the cursor 150 position. In all cases, the cursor 150 corresponds to a position on the display screen referred to herein as a cursor position, such as cursor position 151 or 152. Cursor positions 151, 152 each correspond to a unique position on the composite weather-station map, and thus, to a set of geographic coordinates in the geographic coordinate system.

The plurality of geographic parameters 304 can be selected by the user 285 having positioned the cursor 150 at more than one position on the geographic map image, such as at cursor position 151 or 152 and making an affirmative selection at such positions. As can be shown with reference to FIG. 1, for example, the user can position the cursor 150 at cursor position 151, and make an affirmative selection of cursor position 151 by making a first mouse click. The user can then position the cursor 150 at cursor position 152 and make another affirmative selection of cursor position 152 by making a second mouse click. Those having skill in the art will appreciate that the affirmative selections may be accomplished by other types of user action, such as by a double-click, a click-hold, a click-release, a finger-tap, a keyboard key press, and so on. In all cases, the cursor position selected shall be the cursor position at the moment that the corresponding affirmative selection is made. The plurality of geographic parameters 304 defines one or more vertices (or center or edge, as the case may be) of the user-selected map area and can include, for example, the geographic coordinates corresponding to one or more of the cursor positions selected. By way of further example, the plurality of geographic parameters 304 can relate to any of the vertices of the user-selected map area box 153 or any point within the user-selected map area box 153 that can be referenced in defining the boundaries of the user-selected map area.

Returning to FIG. 3a, it can be shown that the virtual weather-data-station designer 230 further performs a step of determining 305 a plurality of weather-station identifiers 307 responsive to the plurality of geographic parameters 304 selected by the user 285 at the tract-user computer 200. The plurality of geographic parameters 304 may be received from the geographic weather-data selection interface 301, for example, responsive to the user 285 making an affirmative selection using an input device at the tract-user computer 200 with respect to the geographic parameters selected in step 302. Such an affirmative selection can include the second mouse click at cursor position 152, for example, thus defining the user-selected map area and thereafter transmitting the geographic parameters corresponding to the user-selected map area box 153 to the virtual weather-data-station designer 230. Those having skill in the art will appreciate that a separate submit button (not shown) may be incorporated for the purpose of making the affirmative selection, thereby allowing the user an opportunity to confirm or change the user-selected map area before transmitting the geographic parameters 304 to the virtual weather-data-station designer 230.

Once the geographic parameters 304 have been transmitted from the geographic weather-data selection interface 301 to the virtual weather-data-station designer 230, the virtual weather-data-station designer can determine 305 the plurality of weather-station identifiers 307 responsive thereto. The weather-station identifiers 307 determined thereby define a plurality of graphically-selected weather stations. Weather-station identifiers can be, for example, any string or one or more characters that serves to distinguish one weather station from any other weather station. Accordingly, each weather-station identifier is unique and corresponds to a single weather-station. The weather-station identifier can be used as a key in a relational database to relate a weather-station identifier to one or more data records for the weather station corresponding to the weather-station identifier, such as that referenced as basis weather data 272. For example, each weather-station identifier can relate to weather-station location data within the basis weather data 272. The weather-station location data can include any data that identifies the location of the weather station on the earth surface, for example, geographic coordinates for the weather station according to the geographic coordinate system.

The operation of determining 305 the plurality of weather station identifiers 307 responsive to the plurality of geographic parameters 304 can include, for example, database operations to select one or more weather station identifiers for one or more data records for which the weather-station location data matches the area defined by the geographic parameters 304. The match can be either literal or approximate. In a literal match, only weather-stations having weather-station location data within the user-selected map area will match to the geographic parameters 304. With reference to FIG. 1, by way of example, the geographic parameters 304 for the user-selected map area will result in a literal match only to those weather stations appearing within the user-selected map area box 153, such as weather stations 105, 106, 107, and 108. In an approximate match, weather-station location data that is within a certain pre-selected zone of distance from the user-selected map area will match to the geographic parameters 304. For example, an approximate match may depend on one or more proximity parameters to define an enlarged zone corresponding to geographic parameters enlarged by a pre-selected distance. Those having skill in the art will appreciate various techniques to allow approximate matching of weather-station location data, including, for example, radial or rectilinear enlargement of the user-selected map area defined by the geographic parameters 304.

Figure 5A:
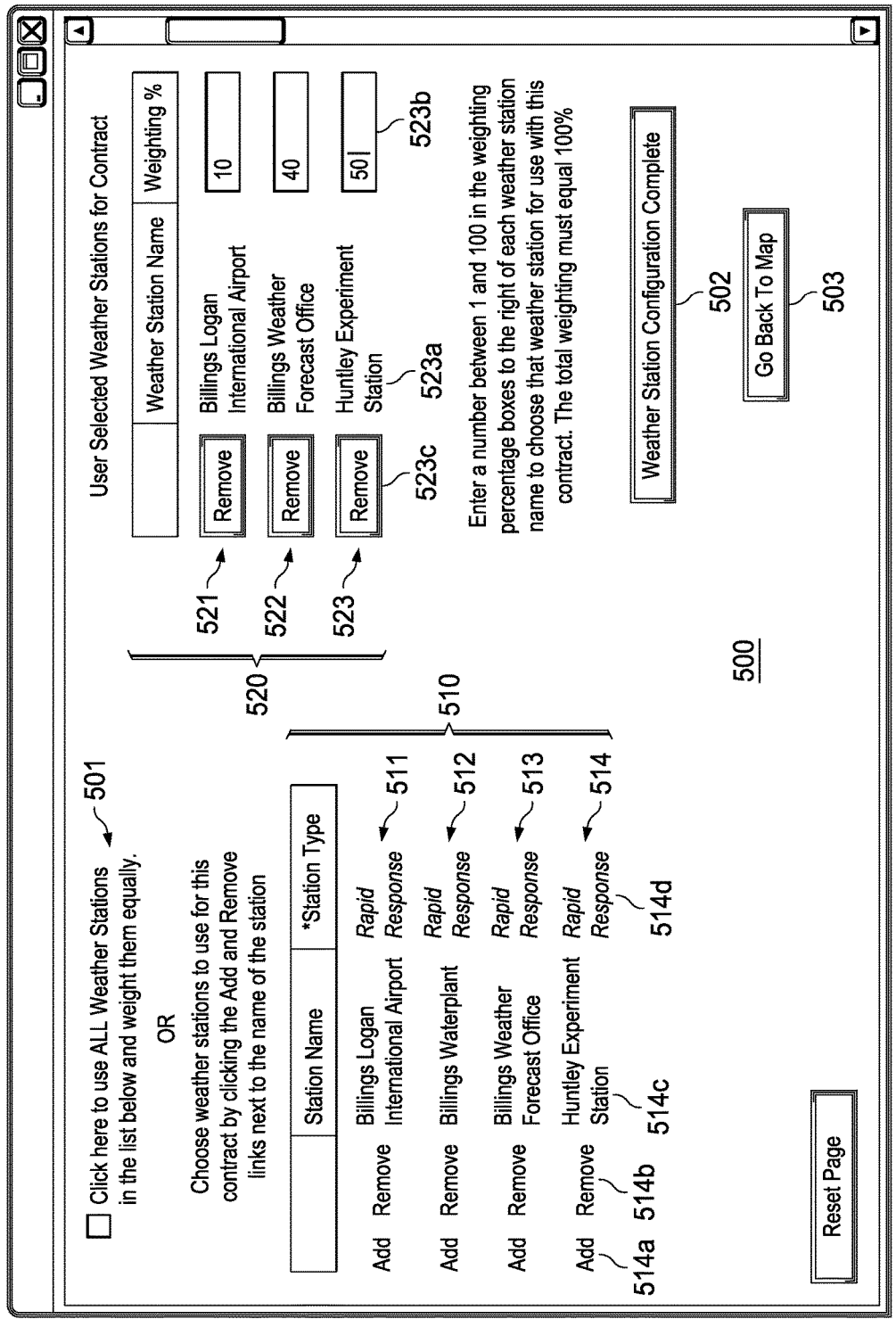
FIGS. 5a-5d are exemplary graphical user interface displays according to one or more embodiments of the invention.

According to exemplary embodiments of the invention, as can be further shown by reference to FIG. 5a, the source selection interface 309 is displayed as interface display 500. The source selection interface 309, through the interface display 500 in the exemplary embodiment, allows the user 285 at the tract-user computer 200 to fine-tune the virtual weather-data station with respect to the plurality of graphically-selected weather stations. Such fine-tuning includes the ability to selectively incorporate any of the graphically-selected weather stations into the virtual weather-data station. The selectively incorporated weather stations thereby define a plurality of user-selected weather stations. By way of example, the graphically-selected weather stations may include one or more weather stations that the user does not wish to include for the purposes of building the virtual weather-data station. The user, for example might not have been able to exclude such stations when graphically selecting the geographic parameters 304. By way of further example, with reference to FIG. 1, the user may wish to ignore weather station 107 in building the virtual weather-data station. Such fine-tuning also includes the ability to selectively weight each of the plurality of user-selected weather stations if, for example, two or more user-selected weather stations do not equally relate to the weather for the tract. By way of example, the user may be aware that certain user-selected weather stations do not reflect the weather at the tract as closely as other user-selected weather stations, and the user may wish to reduce or increase the effect of certain weather stations on the virtual weather-data station. The user-selected weather stations and can be identified, named, selected, or referred to using corresponding user-selected weather-station identifiers. The weather stations weights selected at the source selection interface display 500 are referred to herein as user-selected weather-station weights.

Returning to FIG. 5a, the source selection interface display 500 can include a weather-station confirmation field 510. The weather-station confirmation field 510 allows the user 285 at the tract-user computer 200 to confirm which of the graphically-selected weather stations are to be included in the user-selected weather stations, and thereby, incorporated in the virtual weather-data station.

At the weather-station confirmation field 510, weather-station confirmation controls 511, 512, 513, 514 are displayed for each weather station of the graphically-selected weather stations. With reference to weather-station confirmation controls 514 for an exemplary weather station, it can be shown that weather-station confirmation controls can include, for example, buttons 514*a-b* to add or to remove, respectively, the weather station having weather station name 514*c* from the user-selected weather stations to be included in the virtual weather-data station. Weather-station confirmation controls can also include, for example, the weather station name 514*c*, which can also be the weather-station identifier, and the weather station type 514*d*.

The source selection interface 309 can be configured to allow dynamic updating of the source selection interface display 500 when the user selects the add button, e.g., button 514*a*, for a particular weather station. For example, upon clicking the add button 514*a*, the weather station having the name 514*c* can be added to the list of user-selected weather stations in weighting field 520. Likewise, the source selection interface 309 can be configured to allow dynamic updating of the source selection interface display 500 when the user selects the remove button, e.g., button 514*b*, for a particular weather station. For example, upon clicking the remove button 514*b*, the weather station having the name 514*c* can be removed from the list of user-selected weather stations in weighting field 520.

As can be further shown in FIG. 5*a*, the source selection interface display 500 can include a weather-station weighting field 520. The weather-station weighting field 520 allows the user 285 at the tract-user computer 200 to select a weighting factor for each of the user-selected weather stations according to the desired relative effect of each of the weather stations to the virtual weather-data station. The desired relative effect of each of the user-selected weather stations to the virtual weather-data station may be based on, for example, the subjective knowledge and preferences of the user 285 concerning each of the user-selected weather stations. The desired relative effect of each of the user-selected weather stations to the virtual weather-data station may also be based on, for example, objective importance criteria such as distance, altitude difference, historical weather patterns, geographic features, and so on.

At the weather station weighting field 520, weather-station weighting controls 521, 522, 523 are displayed for each of the user-selected weather stations added at the weather-station confirmation field 510. With reference to weather-station weighting controls 523 for an exemplary weather station, it can be shown that weather-station weighting controls can include, for example, buttons such as button 523*c* to remove the weather station from the user-selected weather stations to be included in the virtual weather-data station. The weather-station weighting controls can also include, for example, the weather station name 523*a* and a weather-station weight selection box 523*b*. The weather-station weight selection box, e.g., selection box 523*b*, allows the user to input a numerical weight value corresponding to the desired relative effect of the weather station with respect to the virtual weather-data station. The numerical weight value corresponds to the relative degree to which weather data from the corresponding weather station will effect the virtual weather data for the virtual weather-data station. The weights for each of the user-selected weather stations expressed as ratios or percentages, and as such, are required to add to 1 or 100 (percent).

Figure 5B:
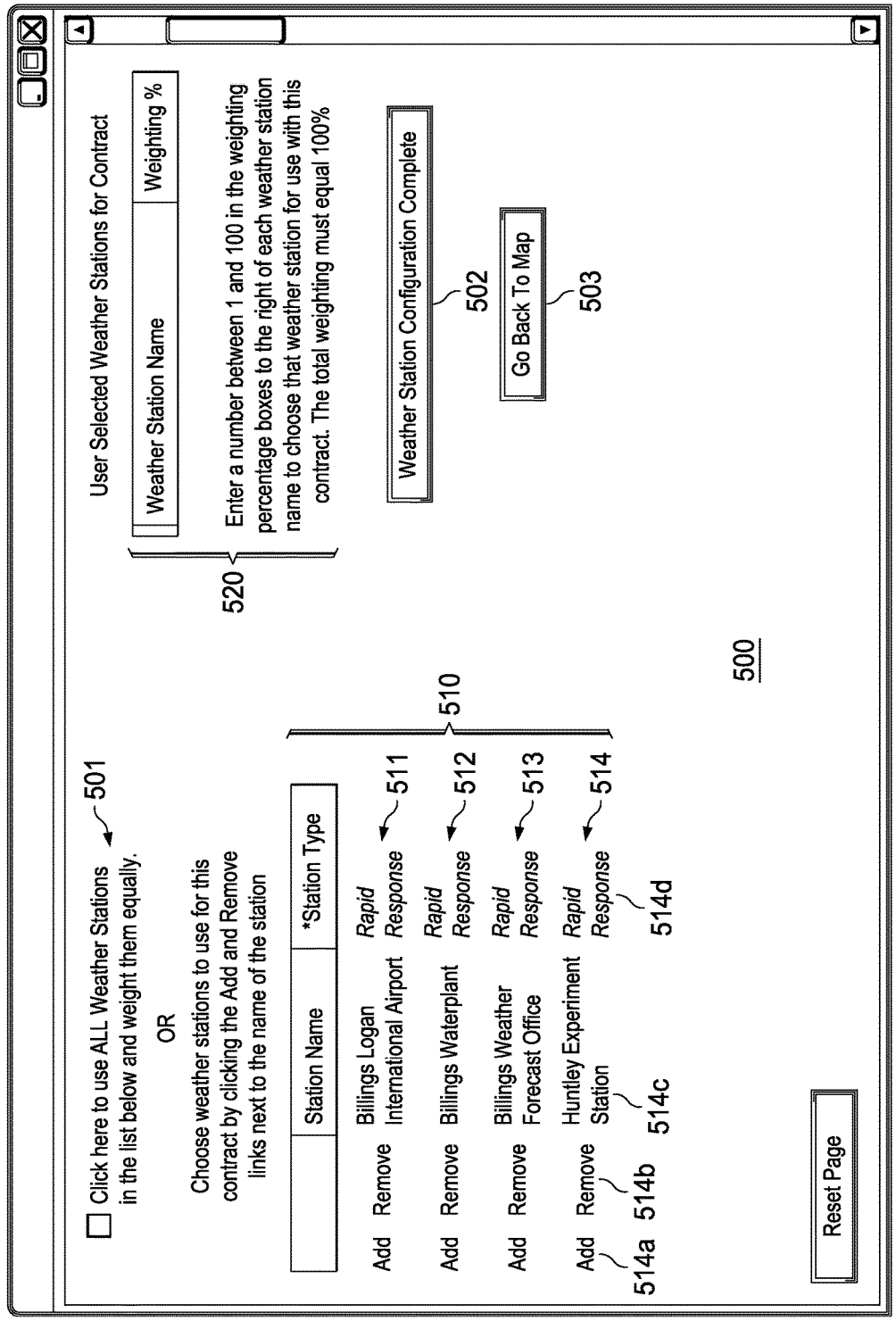
Figure 5C:
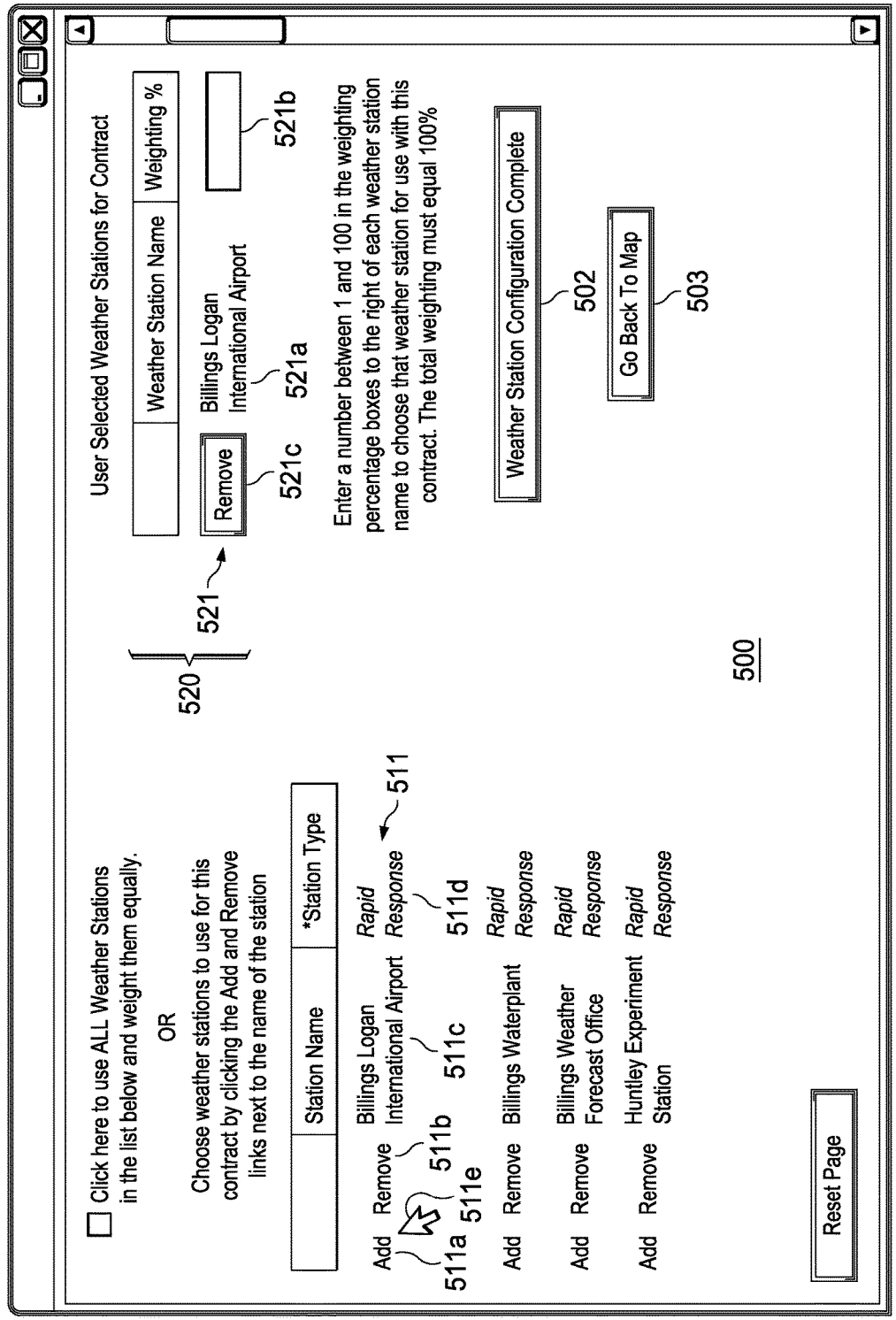
Figure 5D:
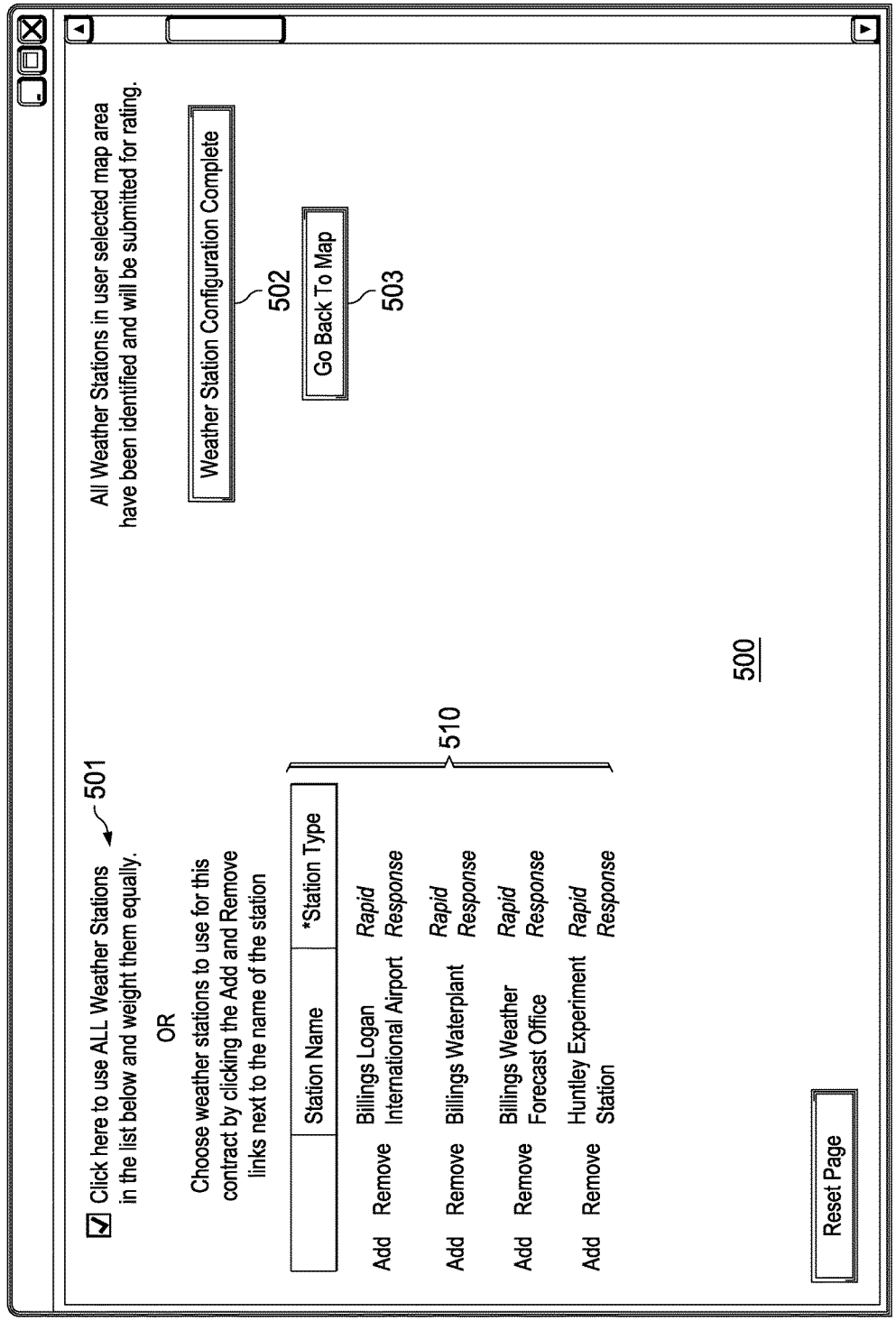

Reference to FIGS. 5*b*-5*d* provides a walkthrough of the interaction of user 285 with the source selection interface 309 through the source selection interface display 500. As can be illustrated with reference to FIG. 5*b*, the source selection interface display 500, particularly the weather-station confirmation field 510, can be initially populated as shown at weather-station confirmation controls 511, 512, 513, 514 for each of the graphically-selected weather stations, for example, weather stations 105-108 in the selection box 523 as can be shown in FIG. 1. At this point, before any of the graphically-selected weather stations have been added at the weather-station confirmation field 510, there are no user-selected weather stations to be shown at the weather-station weighting field 520.

Continuing in the walkthrough of user interaction with the source selection interface display 500, as can be illustrated with reference to FIG. 5*c*, the source selection interface display 500, and more particularly the weather-station confirmation controls 511 for the weather station named "Billings Logan International Airport" 511*c*, when the user 285 selects the corresponding add button 511 using the cursor 511*e*, the weather-station weighting controls 521 are added at the weather-station weighting field 520 for the same weather station, thus indicating to the user that the weather station is a user-selected weather station. To remove the same weather station from the weather-station weighting field 520, the user 285 can click the remove button 521*c* corresponding to the weather station named "Billings Logan International Airport" 521*a*. To select a weighting value for the same weather station, the user can enter a weighting value in weight selection box 521*b*, which corresponds to the same weather station. Alternatively, as can be illustrated with reference to FIG. 5*d*, the user can click on full-confirmation box 501, and the individual user selections for adding and weighting the weather stations can be skipped. Clicking on full-confirmation box 501 selects all of the graphically-selected weather stations, which appear in the weather-station confirmation field 510, as user-selected weather stations and selects equal weights (i.e., summing to 1 or 100%) for each of the user-selected weather stations.

Returning to FIG. 5*a*, once the user-selected weather stations have been selected and the corresponding user-selected weights have been selected as is shown in the weighting field 520, the user 285 at the tract-user computer 200 can initiate the transmission 311 of these selections, namely the plurality of user-selected weather station identifiers 312 and the plurality of user-selected weather-station weights 313, to the virtual weather-data-station designer 230 so that a virtual weather-data station can be constructed responsive thereto. The plurality of user-selected weather station identifiers 312 and the plurality of user-selected weather-station weights 313, collectively, define a plurality of user-selected virtual weather-data-station parameters.

The user 285 can initiate the transmission 311 of the user-selected virtual weather-data-station parameters, for example, by selecting submit button 502. Alternatively, the user can return to the geographic weather-data selection interface display 100 to select different geographic coordinate parameters then return to the source selection interface display 500 to select new or updated user-selected virtual weather-data-station parameters. In certain embodiments, once the user-selected virtual weather-data-station parameters are transmitted 311 to and received by the virtual weather-data-station designer 230, the virtual weather-datastation designer can store the plurality of user-selected weather station identifiers 312 and the plurality of user-selected weather-station weights 313 at the database 270, for example, in a session database, in a table for the user-selected virtual weather-data-station parameters 273, as can be shown with reference to FIG. 2. Storing the user-selected virtual weather-data-station parameters at the database 270 allows a virtual weather-data station to be defined responsive to the user's selections. In other embodiments, the user-selected virtual weather-data-station parameters may be submitted directly to a computer, computer program product, or other module to generate virtual weather-data, such as virtual weather-data generator 240.

According to certain exemplary embodiments of the invention, as can be shown with reference to FIG. 2, the virtual weather-data generator 240 generates virtual weather data for a tract corresponding to the user-selected virtual weather-data-station parameters. The series of operations performed by the virtual weather-data generator 240 can be best shown by reference to the flow chart in FIG. 3*a*. In exemplary embodiments of the invention, the virtual weather-data generator 240 can perform an operation of determining 314 a plurality of station-specific weather histories 315 and an operation of generating the virtual weather data 317 responsive to the plurality of user-selected weather station identifiers 312 and the plurality of user-selected weather-station weights 313, thereby defining a virtual weather-data station with respect to the user-selected virtual weather-data-station parameters. The virtual weather-data generator 240 relies on basis weather data 272, particularly with respect to those weather stations corresponding to the plurality of user-selected weather station identifiers 312.

In an exemplary embodiment of the invention as can be shown with reference to FIG. 3*a*, the WSG 240 performs an operation of determining 314 a plurality of station-specific weather histories 315. The station-specific weather histories are determined responsive to the user-selected weather-station identifiers 312, each of which can be used as a key in the database 270 relating to individual weather histories for each of the weather stations corresponding to each of the plurality of user-selected weather-station identifiers 312. The weather history for a weather station can include, for example, a plurality of weather readings collected at the weather station. Each of the plurality of weather readings corresponds to a unique weather parameter observed and recorded at a particular weather station in or at a particular timeframe (such as on a particular day or at a particular time of day). The weather parameters can include, for example, precipitation, temperature, wind, barometric pressure, and so on. The weather history for a weather station can also include, for example, derivations of the weather readings including averages, maximums, minimums, and so on. Such derivations can also correspond to unique weather parameters observed at a particular weather station at a particular timeframe.

The operation of determining 314 a plurality of station-specific weather histories 315 can include, for example, a database query to select any or all of the weather readings in the basis weather data 272 corresponding to the user-selected weather stations according to the plurality of user-selected weather-station identifiers 312. The plurality of user-selected weather-station identifiers 312, for example, can be stored in the user-selected weather-station parameters table 273 at the database 270. As a result of the query, for example, the selected weather readings can be loaded into memory locally accessible by the virtual weather-data generator 240 so that they may be readily accessed by the virtual weather-data generator 240. Alternatively, the result of the query can also be, for example, to load these selected records into memory at the database 270 so that the records may be accessed directly by the database management software in database 270, for example, when requested by other computer programs or software modules. The plurality of station-specific weather histories 315 can be identified in memory locally accessible to the virtual weather-data generator 240 or in the database 270 using the corresponding weather-station identifier of the plurality of weather-station identifiers 312.

In an exemplary embodiment of the invention as can also be shown with reference to FIG. 3*a*, the WSG 240 performs an operation of generating 316 virtual weather data 317 responsive to the plurality of station-specific weather histories 315. The operation of generating 316 the virtual weather data 317 includes processing the plurality of station-specific weather histories 315 using a computer algorithm that, for each weather history of the plurality of station-specific weather histories, multiplies one or more of the weather readings in that weather history by the user-selected weather-station weight 313 for the corresponding weather station, thereby defining a plurality of weighted weather readings. Each of the plurality of weighted weather readings corresponds to a unique weather station, weather parameter, and observation timeframe (such as a particular day). For each weather parameter and each observation timeframe, all of the weighted weather readings for all weather stations are thereafter summed to provide a composite weather reading for the weather parameter for the observation timeframe.

Figure 3B:
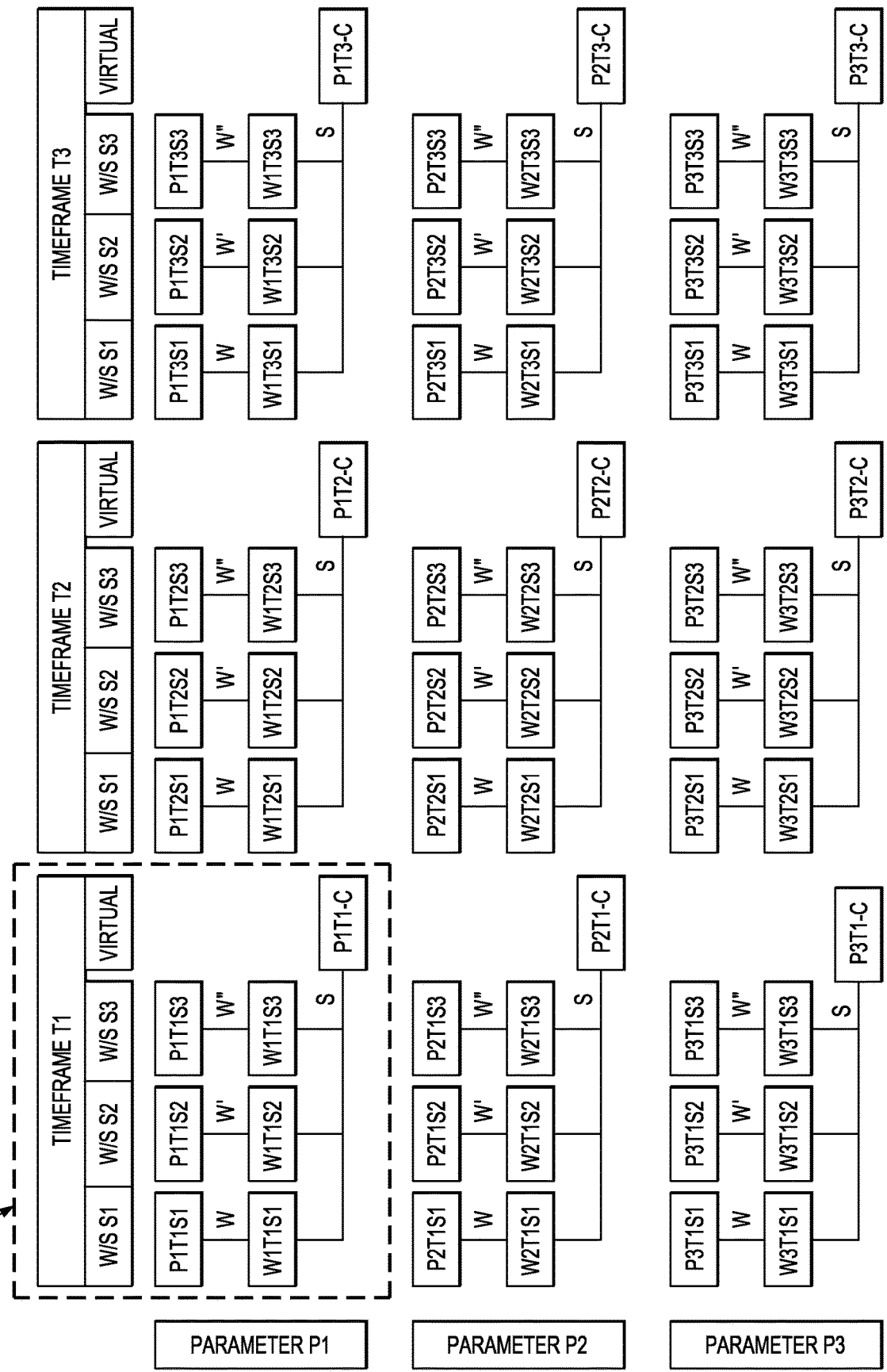
FIG. 3b is a schematic diagram illustrating exemplary data processing steps according to one or more embodiments of the invention.

The foregoing exemplary operation can be shown in further detail with reference to FIG. 3*b*. In FIG. 3*b*, each of the major columns represents a different timeframe T1, T2, and T3, each of the minor columns represents a different weather station S1, S2, and S3. Each of the rows represents a different weather parameter. With reference to the data represented by blocks in the top-left quadrant 390, all of the data corresponds to timeframe T1 and parameter P1. Each of the readings for parameter P1 at timeframe T1, for each station S1, S2, S3, are represented by blocks P1T1S1, P1T1S2, and P1T1S3, respectively. Each weather reading represented by these blocks is multiplied by the weighting factor for the individual weather station as represented by operations W, W', and W", respectively, which can output weighted weather readings W1T1S1, W1T1S2, and W1T1S3, respectively. Weighted weather readings W1T1S1, W1T1S2, and W1T1S3 are then summed, as is represented by operation S, and the result is the composite weather reading P1T1-C, which represents a virtual or composite weather reading for parameter P1 at timeframe T1 for the virtual weather-data station. Likewise, the remainder of FIG. 3*b* illustrates how composite weather readings P2T1-C, P3T1-C, P1T2-C, P1T2-C, P3T2-C, P1T3-C, P2T3-C, and P3T3-C are generated. Accordingly, the generated composite weather readings define the virtual weather data, and each composite reading in the virtual weather data thereby corresponds to a weather parameter and an observation timeframe. As is apparent from the foregoing description, the degree to which the weather readings at the component weather stations S1, S2, and S3 affect the weather readings of the virtual weather-data station depend on the weightings W, W', and W" that correspond, respectively, to each component weather station. As will be appreciated by those having skill in the art, the foregoing algorithm is applicable to any number of weather stations, for any number of weather parameters, and for any number of observations. Also, as will be appreciated by those having skill in the art, different weightings can be used for different parameters or for different timeframes, as long as the corresponding weightings for any N number of weather stations sums to 1 or 100 percent. Accordingly, the virtual weather data 317 provides hypothetical historical weather data for a virtual weather-data station presumed to be on the tract, based on the specific customization by the user's selections 312 and weightings 313.

Once the virtual weather data 317 has been generated 316, weather-risk-products can be generated responsive thereto. In certain embodiments, as can be shown with reference to FIG. 3a, the virtual weather-data generator can store 31a the virtual weather data 317 at the database 270, for example, in a session database, in a virtual weather data table 274 as can be shown with reference to FIG. 2. Storing the virtual weather data 317 at the database 270 allows weather-risk-products to be generated responsive thereto. In other embodiments, the virtual weather data 317 may be submitted directly to a computer, computer program product, or other module to generate weather-risk-products, such as weather risk-product generator 250.

According to certain exemplary embodiments of the invention, as can be shown with reference to FIG. 2, the weather risk-product generator 250 generates weather-risk products 275 for the user-selected tract responsive to the virtual weather data 274 and a plurality of user-selected weather-risk parameters, thereby allowing a user to purchase a customized weather-risk product based on customized virtual weather-data stations and customized contract terms. The weather risk-product generator 250 provides a weather-risk selection interface 319 and a weather-risk confirmation interface 328 to be displayed to a user 285 at a display 284 of the tract-user computer 200. The weather-risk selection interface 319 and the weather-risk confirmation interface 328 incorporate the virtual weather data, for example, from table 274, which represents hypothetical user-customized weather data for the tract.

The series of operations performed by the weather risk-product generator 250 can be best shown by reference to the flow chart in FIG. 3a. The user 285 interacts with the weather-risk selection interface 319 and the weather-risk confirmation interface 328 to select weather-risk parameters 322 and then to confirm the performance of a proposed weather-risk-product based on the user-selected weather-risk parameters 322. Weather-risk parameters 322 can include, but are not limited to, a contract amount, a contract name, a concern type, a risk type, a risk endurance range, and a risk tolerance range. Because weather-risk-products relate to a user-selected timeframe (i.e., the risk endurance range) and, the weather-risk selection interface 319 and weather-risk confirmation interface 328 allow the user 285 to confirm the simulated or hypothetical past performance of a proposed weather-risk product with respect to the user-selected timeframe in past years, more particularly, with respect to historical virtual weather data for the user-selected timeframe in past years. In the event that the simulated or hypothetical past performance of the proposed weather-risk product is unsatisfactory to user, for example, the weather-risk confirmation interface 328 also allows the user to interactively recall other interfaces, e.g., the geographic weather-data selection interface 301 and the source selection interface 309, in order to generate new virtual weather data and to select new user-selected weather-risk parameters 322 with respect to the new virtual weather data.

In exemplary embodiments of the invention, the weather risk-product generator 250 can perform the operation of generating 318 the weather-risk selection interface 319 to display to the user 285 at a display 284 at the tract-user computer 200, and the weather risk-product generator 250 can also perform the operation of generating 327 the weather-risk confirmation interface 328 to display to the user 285 at a display 284 at the tract-user computer 200.

Figure 6A:
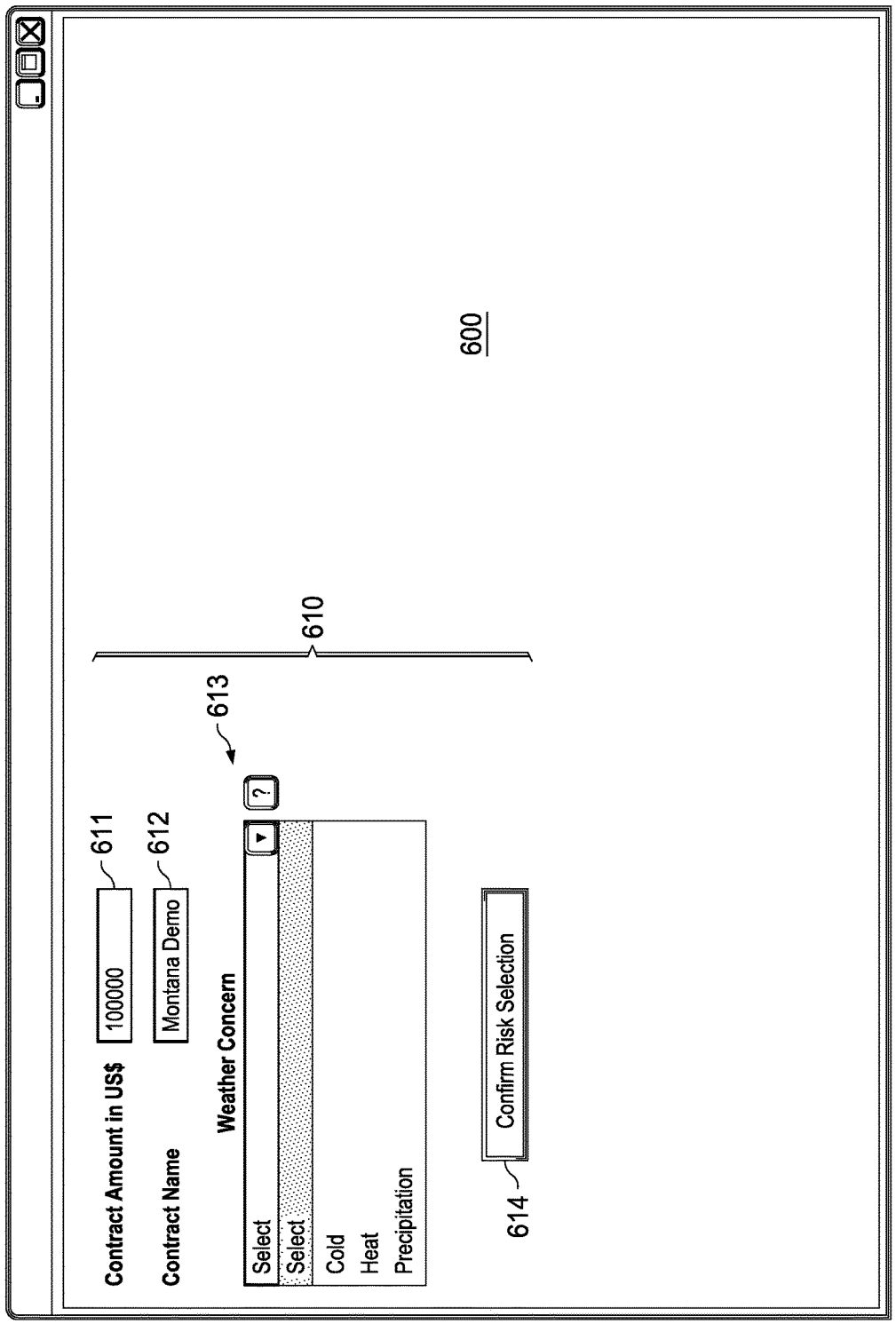

According to exemplary embodiments of the invention, as can be shown by reference to FIG. 6a, the weather-risk selection interface 319 is displayed as interface display 600. The weather-risk selection interface 319, and interface display 600 in particular, allow the user 285 at the tract-user computer 200 to initiate the selection of the weather-risk parameters that will be used to model a proposed weather-risk product or generate a weather-risk product.

In an exemplary embodiment, the weather-risk selection interface display 600 includes weather-risk parameter selection area 610 (weather-risk parameter selection area) 610, which includes, for example, a contract amount field 611 to allow the user 285 to select a user-selected contract amount, contract name field 612 to allow the user 285 to select a user-selected contract name, and a concern-type field 613 to allow the user 285 to select a user-selected concern type. Contract amount field 611 and contract name field 612 are shown as text input boxes, but those having skill in the art will appreciate that any other type of input or selection means can be implemented. Concern-type field 613 is shown as being a drop-down selection box pre-populated with standardized concern types, but those having skill in the art will appreciate that any other type of input or selection means can be implemented. Standardized concern-types pre-populated in concern-type field 613 can include, for example, "Cold", "Heat", "Precipitation." Those having skill in the art will appreciate the ability to pre-populate the concern-type field 613 with other types of weather concerns, such as those relating to precipitation, temperature, wind, barometric pressure, and so on.

Figure 6B:
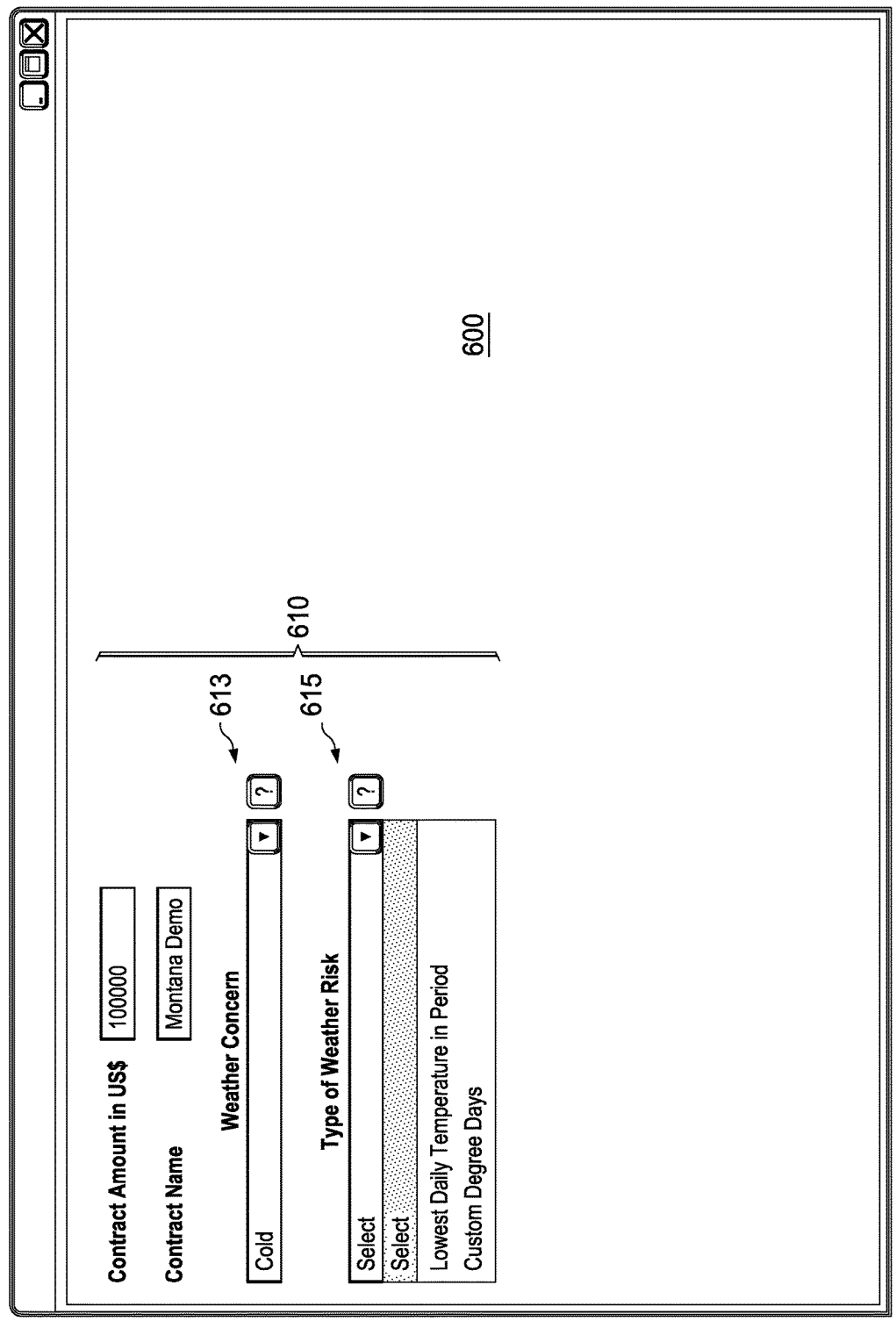

Once a user-selected weather concern-type has been selected by the user 285 at the weather-risk selection interface display 600, the weather-risk selection interface 319 can dynamically update the weather-risk parameter selection area 610 to include weather-risk-type field 615, as can be shown in FIG. 6b, to allow the user to select a user-selected weather-risk-type. In one embodiment, updating the weather-risk parameter selection area 610 is performed using client-side scripting techniques. Such client-side scripting techniques may include, for example, a trigger to update the weather-risk parameter selection area 610 responsive to the user 285 selecting confirmation button 614 as can be shown in FIG. 6a, or responsive to the user 285 selecting a user-selected weather concern-type at the weather concern-type field 613. Returning to FIG. 6b, weather-risk-type field 615 is shown as being a drop-down selection box pre-populated with standardized risk types, but those having skill in the art will appreciate that any other type of input or selection means can be implemented. Different standardized risk-types can be dynamically pre-populated in weather-risk-type field 615 responsive to different user-selected weather concern-types at concern type field 613. In one embodiment, the relation between certain concern-types and certain risk-types is implemented using client-side scripting techniques. Risk types for concern type "Cold" can include, for example "Lowest Daily Temperature in Period" and "Custom Degree-days" as can be shown with reference to weather-risk-type field 615 in FIG. 6b. Risk types for concern type "Heat" can include, for example "Highest Daily Temperature in Period" and "Custom Degree-days" as can be shown with reference to weather-risk-type field 615' in FIG. 6f. Risk types for concern type "Precipitation" can include, for example "Highest Daily Precipitation in Period", "Excessive Cumulative Precipitation", and "Insufficient Cumulative Precipitation" as can be shown with reference to weather-risk-type field 615" in FIG. 6g. Those having skill in the art will appreciate the ability to dynamically pre-populate the risk-type field 615 with other types of weather-risks, such as those relating to precipitation, temperature, wind, barometric pressure, and so on.

Figure 6C:
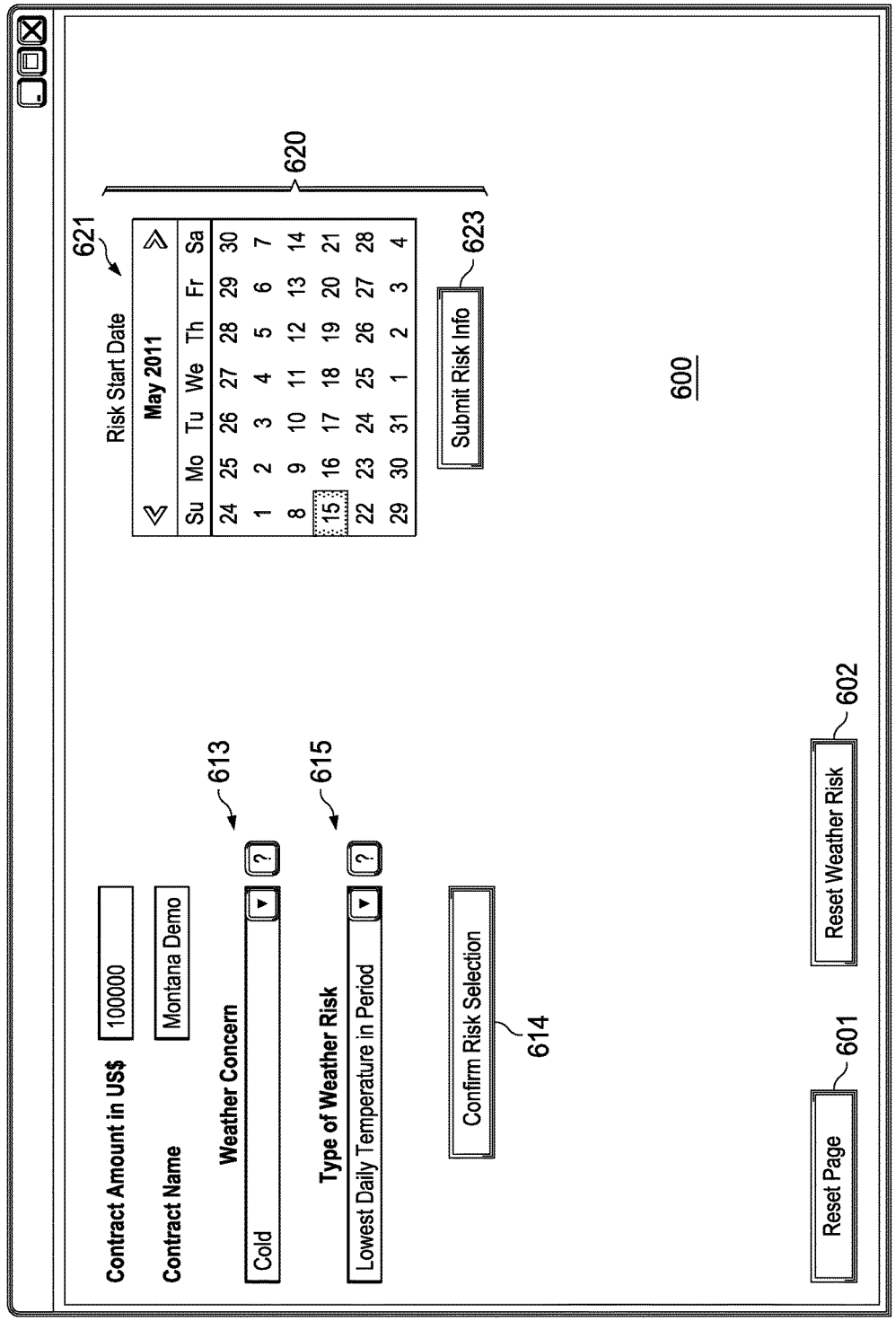
Figure 6F:
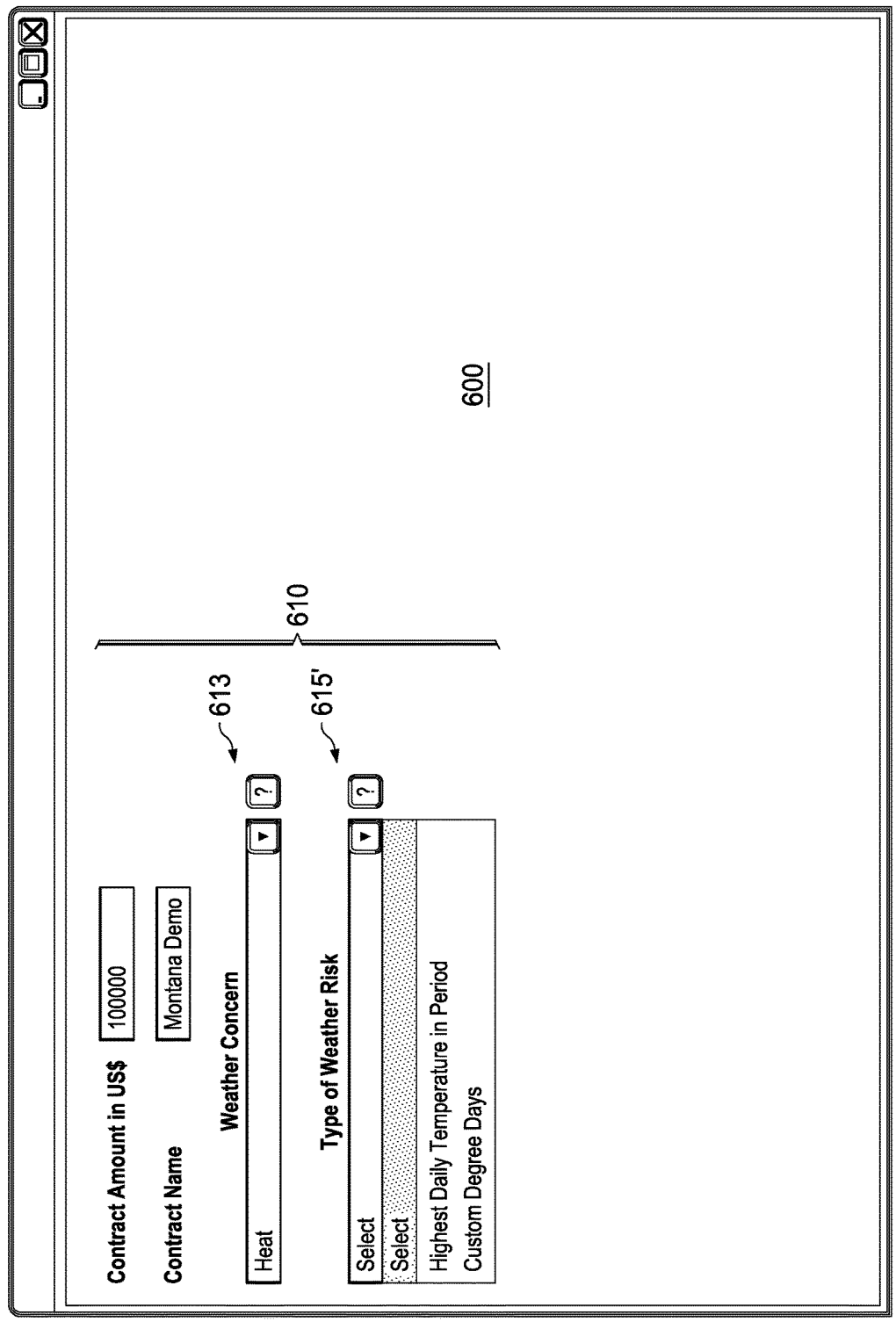
Figure 6G:
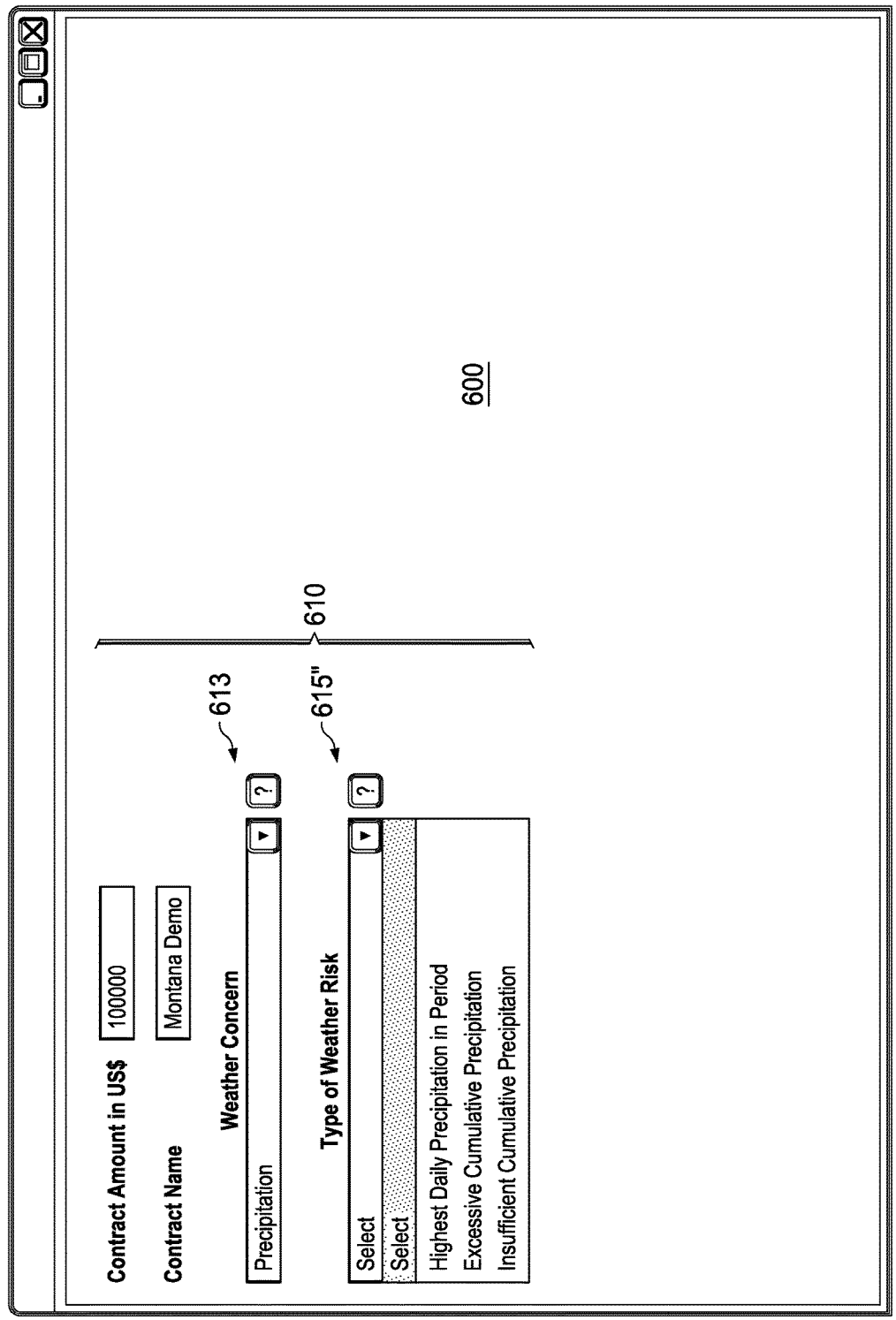

Once a user-selected weather-risk-type has been selected by a user 285 at the weather-risk selection interface display 600, the weather-risk selection interface 319 can dynamically update the weather-risk parameter selection area 610 to include timeframe field 620, as can be shown in FIGS. 6c and 6d, to allow the user to select a user-selected risk endurance range including a user-selected start date and a user-selected end date. In one embodiment, updating the weather-risk parameter selection area 610 is performed using client-side scripting techniques. Such client-side scripting techniques may include, for example, a trigger to update the weather-risk parameter selection area 610 responsive to a user selecting a user-selected weather-risk-type at the weather-risk-type field 615. As can be shown by comparing FIGS. 6c and 6d, weather-risk parameter selection area 610 can be updated in one or more steps, such as a first step to include start calendar field 621 and a second step to include end calendar field 622. Client-side scripting techniques may include, for example, a trigger to update the weather-risk parameter selection area 610 responsive to a user selecting a user-selected start date at start calendar field 621. With reference to FIG. 6d, timeframe area 620 is shown to include two calendar fields allowing a user to select a user-selected start date from start calendar 621 and a user-selected end date from end calendar 622, from any date appearing on the respective calendars. The respective calendars, for example, can be adjustable for month and year. Those having skill in the art, however, will appreciate that any other type of input or selection means can be implemented, such as a text input box for each of a start date and an end date. The time period between and including the user-selected start date and the user-selected end date defines the user-selected risk endurance range. The risk endurance range thereby defines the time period in which the proposed risk product is effective.

Once a user-selected risk-endurance range has been selected by a user 285 at the weather-risk selection interface display 600, the weather-risk selection interface 319 can dynamically update the weather-risk parameter selection area 610 to include risk tolerance fields 624 and 625, as can be shown in FIG. 6e, to allow the user to select a user-selected risk tolerance range including a user-selected damage onset and a user-selected damage completion. In one embodiment, updating the weather-risk parameter selection area 610 is performed using client-side scripting techniques. Such client-side scripting techniques may include, for example, a trigger responsive to a user selecting a submit button 623 as can be shown with reference to FIG. 6d, or responsive to a user selecting a user-selected start date and a user-selected end date at start calendar field 621 and end calendar field 622, respectively, as can be shown with reference to FIG. 6d. Returning to FIG. 6e, risk tolerance fields 624 and 625 allow a user to select a user-selected damage onset and a user-selected damage completion, respectively. The range between and including the user-selected damage onset and the user-selected damage completion defines a user-selected risk tolerance range. The risk tolerance range thereby defines how the compensation under the proposed risk product relates to weather-risk-related damage. Although the tolerance fields 624 and 625 are shown to be implemented as text input boxes, those having skill in the art will appreciate that any other type of input or selection means can be implemented, including, for example, a slider control or other graphical range selection tools.

Once a user-selected risk endurance range has been selected by a user 285 at the weather-risk selection interface display 600, the weather-risk selection interface 319 can dynamically update the weather-risk selection interface display 600 to include a customized historical summary 630, as can be shown in FIG. 6e, for the virtual weather data 317 responsive to the user-selected weather-risk parameters 322. In one embodiment, updating the weather-risk selection interface display 600 is performed using client-side scripting techniques. Such client-side scripting techniques may include, for example, a trigger responsive to a user selecting a submit button 623 as can be shown with reference to FIG. 6d, or responsive to a user selecting a user-selected start date and a user-selected end date at start calendar field 621 and end calendar field 622, respectively, as can also be shown with reference to FIG. 6d. Returning to FIG. 6e, the customized historical summary 630 allows the user 285 viewing the weather-risk selection interface display 600 to view relevant excerpts from or summaries of the virtual weather data 317 to inform the user's selection of a user-selected damage onset and a user-selected damage completion. The customized historical summary 630 includes, for example, a minimum value 631, an average value 632, and a maximum value 633 with respect to the user-selected weather-risk-type. The values included in the customized historical summary 630 can be determined responsive to virtual weather data during the user-selected risk endurance range in prior years, as is described herein with respect to the step of determining 323 timeframe-specific virtual weather data. The values in the customized historical summary 630 can be determined, for example, using well-known mathematical or statistical operations over the timeframe-specific virtual weather data, including, for example, minimizing, averaging, or maximizing values from a plurality of weather readings in the timeframe-specific virtual weather data. By viewing relevant excerpts from or summaries of the virtual weather data 317 in the customized historical summary 630 before selecting a user-selected damage onset and a user-selected damage completion, the user 285 is better able to ascertain the accuracy of the virtual weather data with respect to the user's own knowledge of the actual weather history for the tract. If the user lacks an understanding of the actual weather history for the tract, the customized historical summary 630 beneficially provides the user with a preliminary understanding of the virtual weather data for the tract. In both cases, the customized historical summary 630 allows the user to better select a user-selected damage onset and a user-selected damage completion with respect to the virtual weather data 317 and thereby tailor the user-selected damage onset and the user-selected damage completion to best fit the virtual weather data 317. For example, if the customized historical summary 630 shows a maximum value 623 below the user's expected value for the damage onset 624, the user will know that the virtual weather data 317, as then provided, does not accord with the user's understanding of the weather for the tract. Accordingly, the user could revisit either the geographic weather-data selection interface display 100 or the source selection interface 500 to allow new virtual weather data 317 to be generated with respect to different user-selections (e.g., different geographic coordinate parameters, different user-selected weather-station identifiers, or different user-selected weather-station weights).

Figure 6I:
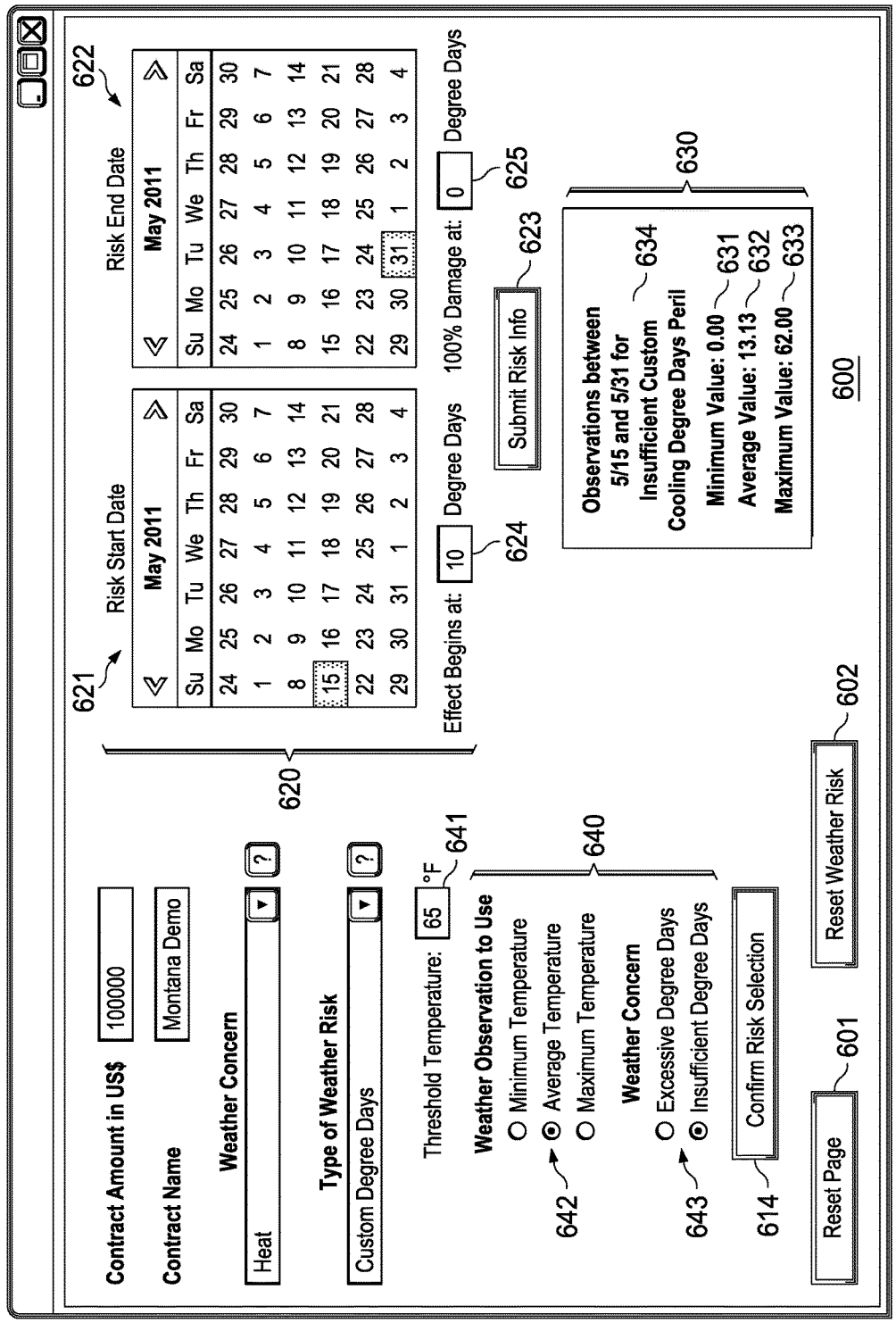

As can be shown with reference to FIGS. 6h and 6i, each of the foregoing features of the timeframe field 620 and the customized historical summary 630 can also be provided, for example, for a user-selected weather risk that is "custom degree-days", respectively, for a user-selected weather concern of "cold" or for a user-selected weather concern of "heat." For a user-selected weather risk that is "custom degree-days," the user-selected damage onset 624 and the user-selected risk completion 625 are expressed in numbers of days, which is understood to be the number of days in the user-selected risk endurance range during which the weather readings for the virtual weather-data station satisfies a user-selected temperature criteria. The user-selected temperature criteria includes, for example, a user-selected threshold temperature 641, a user-selected weather observation 642 (e.g., minimum temperature, average temperature, or maximum temperature), and a user-selected risk concern 643 (e.g., excessive degree-days or insufficient degree-days). Those having skill in the art will appreciate that the present invention—despite being described herein with respect to embodiments reflecting specific weather concerns, specific weather risk types, or specific weather risk criteria—is equally applicable to other types of weather concerns, weather risk types, or weather risk criteria, including any combination of one or more weather concerns, risk types, or risk criteria. For example, there may be a plurality of user-selected weather concerns, a plurality of user-selected weather risks for one or more of user-selected weather concerns, and a plurality of user-selected weather risk criteria for one or more user-selected weather risks.

Once the user 285 has selected the plurality of user-selected weather-risk parameters 322, or as the case may be, at least a user-selected weather concern type, a user-selected weather-risk type, a user-selected weather-risk endurance range, and optionally a user-selected weather-risk tolerance range, such parameters can be transmitted to, and received by, the weather risk-product generator 250. One or more of the plurality of weather-risk parameters 322 can be received from the weather-risk selection interface 319, for example, responsive to the user 285 making an affirmative selection using an input device at the tract-user computer 200. Such an affirmative selection can include, for example, the user 285 making a mouse click, for example, on submit button 623 as can be shown with reference to FIG. 6d, or by selecting a user-selected start date and a user-selected end date at start calendar field 621 and end calendar field 622, respectively, as can also be shown with reference to FIG. 6d. When the weather-risk parameters 322 are received by the weather risk-product generator 250, the weather risk-product generator 250 can perform the operation of determining 323 timeframe-specific virtual weather data 324 responsive to one or more of the user-selected weather-risk parameters 323 received from the weather-risk selection interface 319.

In an exemplary embodiment of the invention as can be shown with reference to FIG. 3a, the weather risk-product generator 250 performs an operation of determining 323 a timeframe-specific virtual weather data 324, which represents the weather readings within the virtual weather data 317 occurring within the dates of the user-selected risk endurance range for all available prior years (i.e., prior years having records in the virtual weather data 274). The timeframe-specific virtual weather data 324 is determined responsive to the user selected weather-risk parameters 323 and the virtual weather data 317. The step of determining 323 the timeframe-specific virtual weather data 324 can include, for example, a database query to select any or all of the virtual weather data 317 that corresponds to the user selected weather-risk parameters 323. In an exemplary embodiment, any of the weather readings in the virtual weather data 317 that match the user-selected risk type and the user-selected risk endurance range are selected and define the timeframe-specific virtual weather data 324. In such an embodiment, only the months and dates of the user-selected risk endurance range are used, thereby allowing the selection of virtual weather data 317 from all years of record prior to the year of the risk endurance range. The selected weather readings that comprise the timeframe-specific virtual weather data 324 can be loaded into memory locally accessible by the weather risk-product generator 250 so that they may be readily accessed by the weather risk-product generator 250. Alternatively, for example, the selected weather readings can be loaded into memory at the database 270 so that the selected weather readings may be accessed directly by the database management software in database 270, for example, when requested by other computer programs or software modules. Any of the timeframe-specific virtual weather data 324 can be identified in the memory locally accessible to the weather risk-product generator 250 or in the database 270 using corresponding the user-selected risk type and any date within the user-selected risk endurance range.

Further, in an exemplary embodiment of the invention as can also be shown with reference to FIG. 3a, the weather risk-product generator 250 performs an operation of determining 325 a plurality of customized contract terms 326, which represents the terms of a proposed risk product to be generated. Customized contract terms can include, for example, at least a contract price, a contract premium, and a payout scale. The plurality of customized contract terms 326 is determined responsive to the user selected weather-risk parameters 323 and the timeframe-specific virtual weather data 324. The step of determining 325 the plurality of customized contract terms 326 can include, for example, referencing weather-risk actuarial data 276 with respect to the user-selected contract amount, the user-selected weather-risk-type, the user-selected risk endurance range, the user-selected risk tolerance range, and each of the corresponding weather readings within the timeframe-specific virtual weather data 324. In certain embodiments, however, referencing weather-risk actuarial data 276 may include other weather readings not included in the timeframe-specific virtual weather data 324, but included in the virtual weather data 317 (for example, weather readings observed in the same season as the user-selected risk endurance range, but outside the dates of the user-selected risk endurance range. The customized contract terms 326 can be loaded into memory locally accessible by the weather risk-product generator 250 so that they may be readily accessed by the weather risk-product generator. Alternatively, for example, the customized contract terms 326 can be loaded into memory at the database 270 so that the customized contract terms 326 may be accessed directly by the database management software in database 270, for example, when requested by other computer programs or software modules. Any of the customized contract terms 326 can be identified in the memory locally accessible to the weather risk-product generator 250 or in the database 270 using a corresponding identifier for the individual customized contract term, such as the contract price, the contract premium, and the payout scale.

Figure 7A:
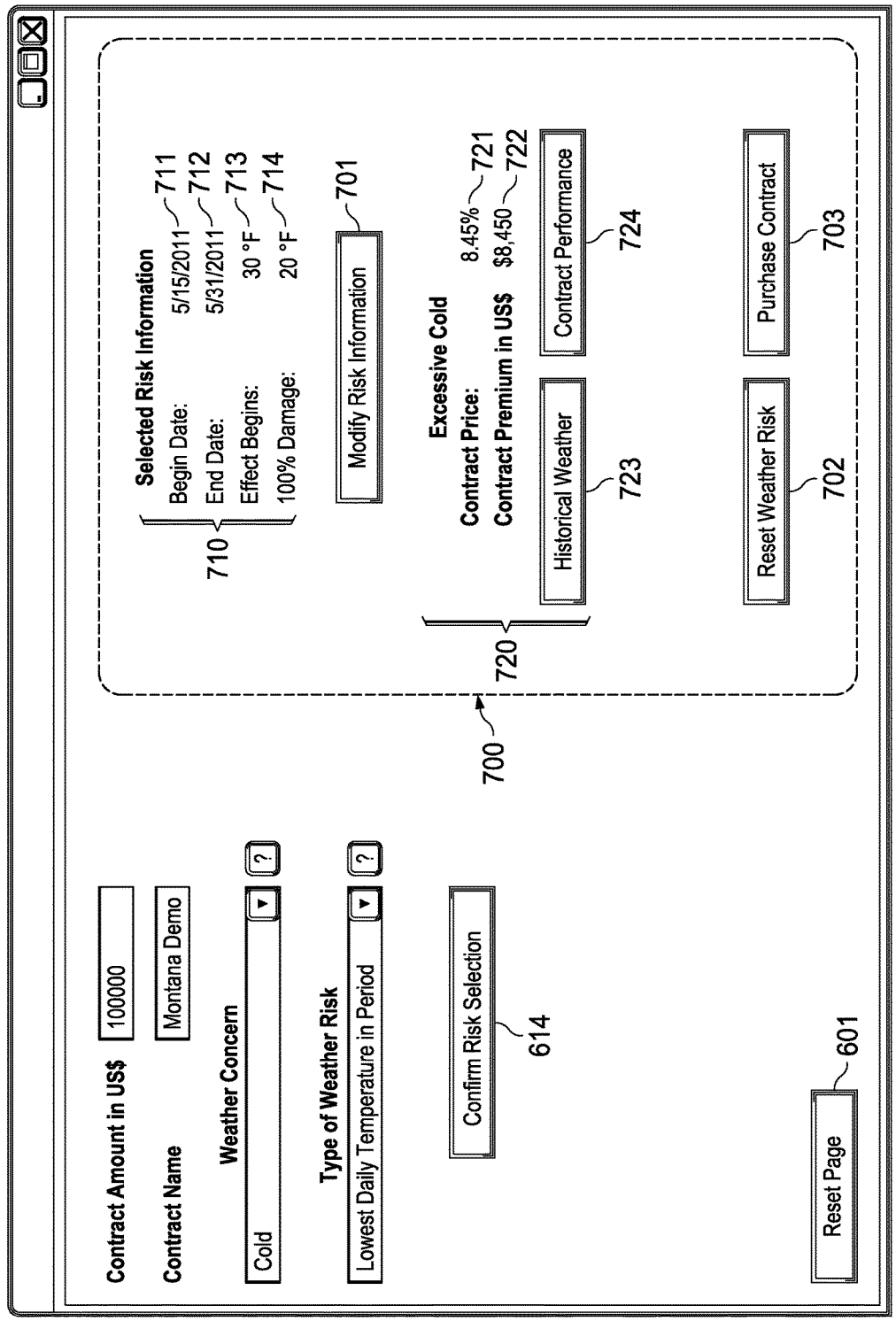
FIGS. 7a-7c are exemplary graphical user interface displays according to one or more embodiments of the invention.

According to exemplary embodiments of the invention, as can be shown by reference to FIG. 7a, the weather-risk confirmation interface 328 is displayed as interface display 700. The weather-risk confirmation interface 328, and interface display 700 in particular, allow the user 285 at the tract-user computer 200 to initiate the selection of the weather-risk parameters that will be used to model a proposed weather-risk product or generate a weather-risk product, for example, if purchased by the user 285.

In an exemplary embodiment, the weather-risk confirmation interface display 700 includes weather-risk parameter confirmation area 710 to allow a user 285 at the tract-user computer 200 to confirm the user-selected weather-risk parameters 322, which will define the performance characteristics of the weather-risk-product. The weather-risk parameter confirmation area 710 can include, for example, a display of the user-selected weather parameters 323 such as the start date 711, the end date 712, the damage onset 713, and the damage completion 714, all of which were previously selected by the user 285 through the weather-risk selection interface 319. If, for example, the user cannot confirm the user-selected weather-risk parameters and the weather-risk parameters in the weather-risk parameter confirmation area 710 were entered incorrectly, the user can dynamically recall the weather-risk selection interface display 600 using modify button 701 or reset button 702.

In certain embodiments, the weather-risk confirmation interface display 700 also includes contract term confirmation area 720 to allow the user 285 at the tract-user computer 200 to confirm the customized contract terms 326, which will further define the performance characteristics of the weather-risk-product. The contract term confirmation area 720 can include, for example, a display of any of the customized contract terms 326 such as the contract price 721 and the contract premium 722.

Figure 7B:
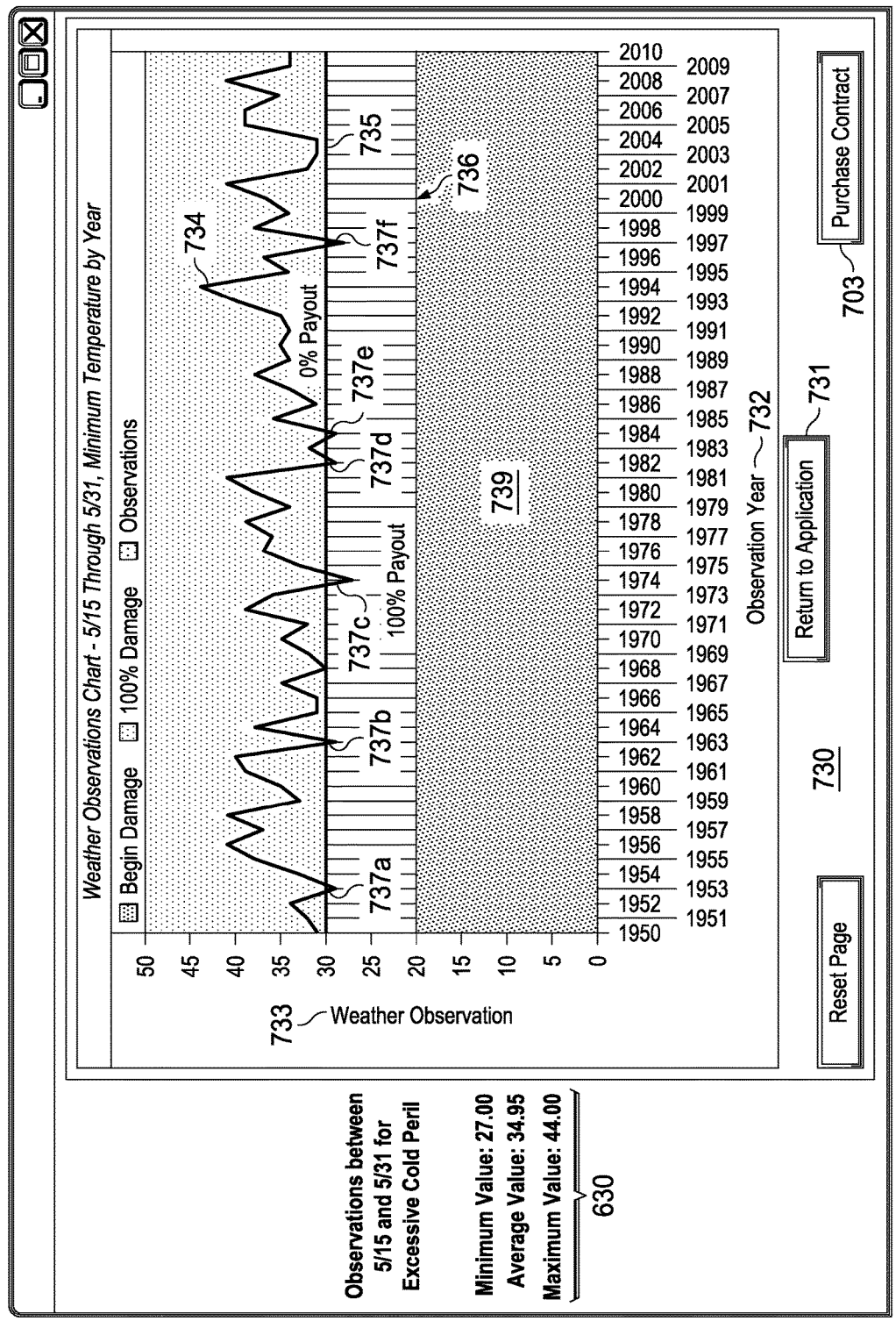
Figure 7C:
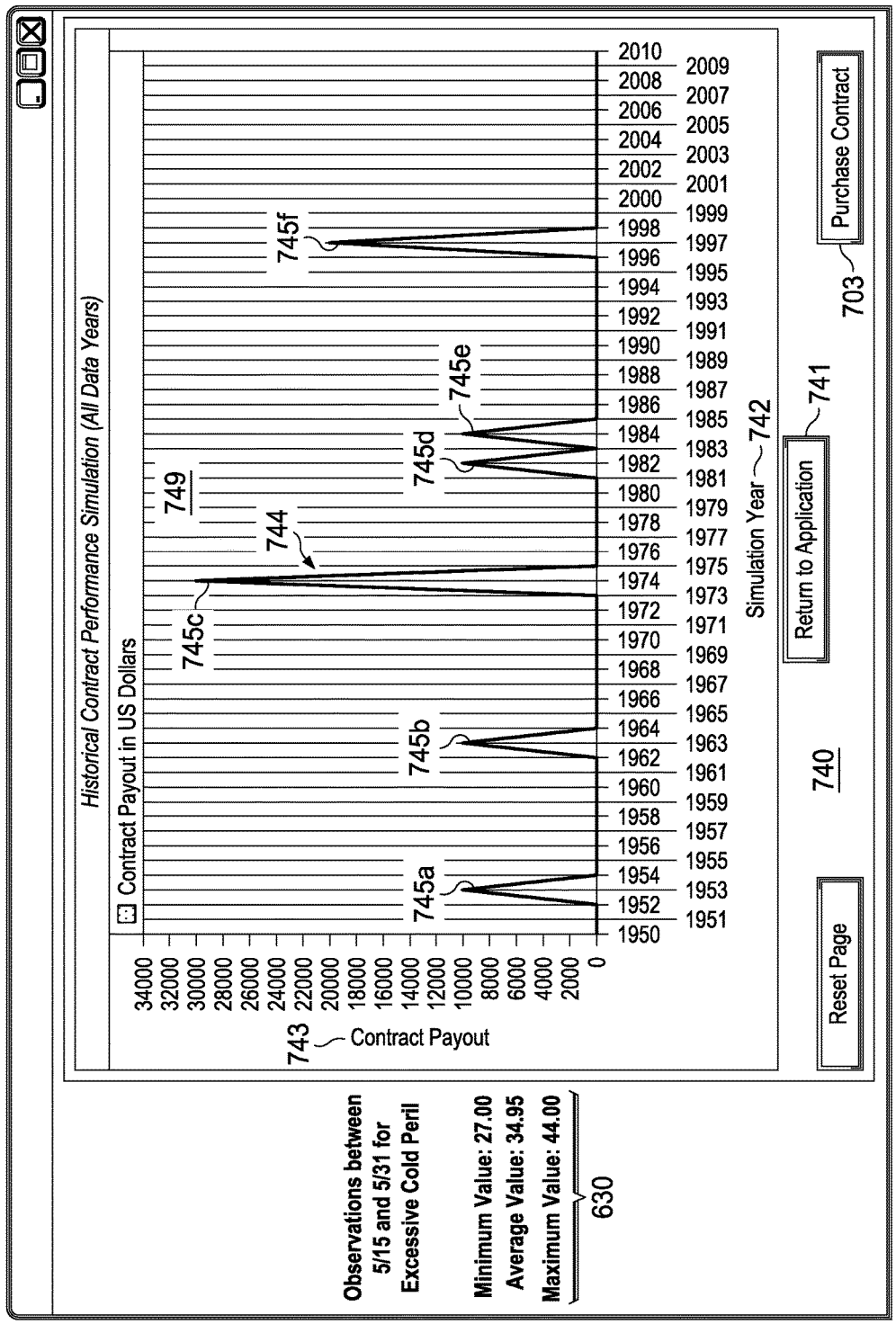

Also, according to exemplary embodiments of the invention, as can be shown by reference to FIGS. 7b and 7c, the weather-risk confirmation interface 328 can further display pop-up displays 730 and 740, which include a historical weather chart 739 and a contract performance chart 749, respectively. Pop-up displays 730 and 740 can be dynamically displayed and the user 285 is able to interactively alternate between each of the historical weather chart 739, the contract performance chart 749, and the weather-risk confirmation interface display 700, for example, using client-side scripting techniques. Such client-side scripting techniques may include, for example, a trigger to display the pop-up displays 730 or 740 responsive to the user 285 selecting historical weather chart button 723 or a contract performance button 724 at the contract term confirmation area 720 as can be shown in FIG. 7a. Those having skill in the art will appreciate that the historical weather chart 739 and the contract performance chart 749 can also be included in the weather-risk confirmation interface display 700, whereas the weather-risk parameter confirmation area 710, the contract term confirmation area 720, and the historical weather chart 739 or contract performance chart 749 can be displayed on a single screen; and such an embodiment is within the scope of this disclosure. In addition, both modify button 701 and reset button 702 are provided to dynamically recall the weather-risk selection interface display 600 so that new customized contract terms 326 or new timeframe-specific virtual weather data 324 to can be defined, for example, if the user is dissatisfied with any of the customized contract terms 326 or the timeframe-specific virtual weather data 324 reflected in the contract term confirmation area 720, historical weather chart 730, or contract performance chart 740. As will be appreciated by those having skill in the art, various commercial software modules and application programming interfaces are available to enable the generation of charts, such as the historical weather chart 739 and the contract performance chart 749 with respect to the timeframe-specific virtual weather data 324, the customized contract terms 326, and the user-selected weather-risk parameters 322. For example, certain embodiments of the invention can be provided using Chartdirector.net by Advanced Software Engineering of Hong Kong or ASP.NET reporting tools by Telerik of Sofia, Bulgaria.

With reference to FIGS. 7b and 7c, the historical weather chart 739 is shown included in pop-up display 730 and the contract performance chart 749 is shown included in pop-up display 740, according to certain embodiments of the invention. Both the historical weather chart 739 and the contract performance chart 749 allow the user 285 to visualize, through the display 284, the hypothetical past performance of a proposed weather-risk product, in prior years, with respect to the user-selected weather-risk parameters 322. In further detail, both of the historical weather chart 739 and the contract performance chart 749 beneficially allow the user 285 to confirm the consistency between hypothetical past compensation from the proposed weather-risk-product and any actual weather-related damage or economic harm experienced at the tract in prior years, thereby enhancing the information available to the user with respect to the suitability of the proposed risk product. For example, the user 285 can visualize, through the historical weather chart 739 at the display 284, how the timeframe-specific weather data 324 intersects with the user-selected risk tolerance range. Also, for example, the user 285 can visualize, through the contract performance chart 749 at the display 284, the compensation value for the timeframe-specific weather data 324 within the user-selected risk tolerance range.

As can be shown with reference to FIG. 7b, historical weather chart 739 can be a line plot chart having an x-axis representing an independent variable and a y-axis representing a dependent variable. In the historical weather chart 739, as is shown in FIG. 7b, the user-selected concern-type is the dependent variable and the observation year (for all prior available years) is the independent variable. The historical weather chart 730 includes a line plot 734 representing weather readings in the timeframe-specific virtual weather data 324, which correspond to the user-selected concern-type as it varies for each observation. Also included the historical weather chart 739, as can further be shown with reference to FIG. 7b, are a 0% payout line 735, which represents the user-selected damage onset parameter corresponding to the user-selected concern type, and a 100% payout line 736, which represents the user-selected damage completion parameter corresponding to the user-selected concern type.

The interaction between the line plot 734, 0% payout line, and 100% payout line on the historical weather chart 739 allows the user 285 to visualize how the timeframe-specific weather data 324 intersects with the user-selected risk tolerance range, and thereby better understand the hypothetical effectiveness of the proposed weather-risk product with respect to prior years. For example, the user 285 is able to readily determine from the historical weather chart 739, that a proposed weather-risk product (assuming its hypothetical applicability to prior years) would have covered weather-related damage occurring at time points 737a-f. To determine whether hypothetical performance of the weather-risk product would have been favorable in prior years, the user 285 could research and compare to his own accounting records for the tract at times 737a-f to determine whether the tract suffered economic harm at those times. The user 285 could also examine the position of points 737a-f along the y-axis—specifically with respect to the relative distance between the 0% line 735 and the 100% line 736 to ascertain the relative magnitude of hypothetical compensation and determine whether such is consistent with the degree of economic harm suffered at times 737a-f. Accordingly, the user can be better is informed in making a purchasing decision with respect to the proposed risk product, or alternatively the user 285 can forego the purchasing decision in the event that sufficient consistency is lacking. In the latter circumstance, the user can return to the weather-risk confirmation interface display 700 using the return button 731 or recall the weather-risk selection interface display 600 using the modify button 701 or the reset button 702.

As can be shown with reference to FIG. 7c, contract performance chart 749 is a line plot chart having an x-axis representing an independent variable and a y-axis representing a dependent variable. In the contract performance chart 749, as is shown in FIG. 7c, the contract payout value 743 is the dependent variable and the observation year 742 (for all prior available years) is the independent variable. The contract performance chart 749 includes a line plot 744 representing the payout value 743 for the weather readings of the user-selected concern-type as it varies for each observation. The line plot 744 allows the user 285 to visualize the compensation value, on an absolute basis, for the timeframe-specific weather data 324 and thereby better understand the hypothetical effectiveness of the proposed weather-risk-product with respect to prior years. For example, the user 285 is able to readily determine from the contract performance chart 749 that, according to the customized contract terms and the user-selected weather-risk parameters, the weather-risk product would have payout values corresponding to points 745a-f during the prior years. To determine whether hypothetical performance of the weather-risk product would have been favorable in prior years, the user 285 could research and compare accounting records for the tract at times 745a-f to determine the absolute amount of economic harm suffered at the tract at those times and whether such is consistent with the amount of hypothetical compensation. Accordingly, the user 285 can be better informed in making a purchasing decision with respect to the proposed risk product, or alternatively the user 285 can forego the purchasing decision in the event that sufficient consistency is lacking. In the latter circumstance, the user can return to the weather-risk confirmation interface display 700 using the return button 741 or recall the weather-risk selection interface display 600 using the modify button 701 or the reset button 702.

Returning to the flowchart in FIG. 3a, it can be shown that once the user has confirmed the user-selected weather-risk parameters 322, the timeframe specific virtual weather data 324, and the customized contract parameters 326 at the weather-risk confirmation interface display 700, and in certain embodiments, the hypothetical performance of a proposed weather-risk-product with respect thereto at the pop-up displays 730 and 740, a weather-risk product 333 can be generated 332 responsive to the user-selected weather-risk parameters 322 and the customized contract parameters 326. In further detail, the user can command the weather-risk confirmation interface 328 to transmit 330 a user confirmation message 331 to the weather risk-product generator 250, which is then received by the weather risk-product generator 250. As is described above, the user confirmation message 331 may include a command to return to the weather-risk selection interface display 600 for an opportunity to re-select any of the user-selected weather-risk parameters 322 and the customized contract parameters 326. Also, the user confirmation message 331 may include a command to re-generate 300 the geographic weather-data selection interface 301 or re-generate 308 the source selection interface 309, at which point the user would be returned to the geographic weather-data selection interface display 100 or the source selection interface display 500, respectively, and re-perform the steps as is shown in FIG. 3a and as is described herein. Further, as can be seen with reference to FIG. 3a, the user confirmation message 331 may include a command to generate 332 the weather-risk product 333, for example, so that the weather-risk product 333 can be purchased by the user 285. The confirmation message 331 can be received from the weather-risk confirmation interface 328, for example, responsive to the user 285 making an affirmative selection using an input device at the tract-user computer 200. Such an affirmative selection can include, for example, the user 285 making a mouse click, for example, on reset button 602 as can be shown with reference to FIG. 6d, reset button 702 as can be shown with reference to FIG. 7a, or purchase button 703 as can be shown with reference to FIGS. 7a, 7b, and 7c. When the confirmation message 331 is received by the weather risk-product generator 250, the weather risk-product generator 250 can perform the operation of generating 332 the weather-risk product 333 responsive to the user-selected weather-risk parameters 322 and the customized contract parameters 326.

Advantageously, various embodiments of the present invention can provide one or more customized weather-risk products for one or more tracts. Various embodiments of the present invention can provide risk-products to mitigate against potential financial exposure due the occurrence of a weather-risk event as is defined according to an individual weather-risk product according to the user-selected weather-risk parameters. In an exemplary embodiment of the invention as can be shown with reference to FIG. 3a, the weather risk-product generator 250 performs an operation of generating 332 the weather-risk product 333 so that the weather-risk product 333 can be purchased by the user 285 and so that the weather risk product, in the event that circumstances occur triggering the weather-risk product's performance during the user-selected risk endurance range ("weather-risk event"), can be identified and processed for settlement according to the customized contract terms 326. The weather risk product 333 can be generated responsive to the user-selected weather-risk parameters 322 and the customized contract parameters 326 and be stored as a record in the database 270, for example as weather-risk product risk parameters and weather-risk product contract parameters. In certain embodiments, weather-risk products can be generated and stored at the weather-risk product administrative database 1240, or perhaps, at a specialized weather-risk product inventory database (not pictured), which can be part of the weather-risk product administrative database 1240.

Figure 3C:
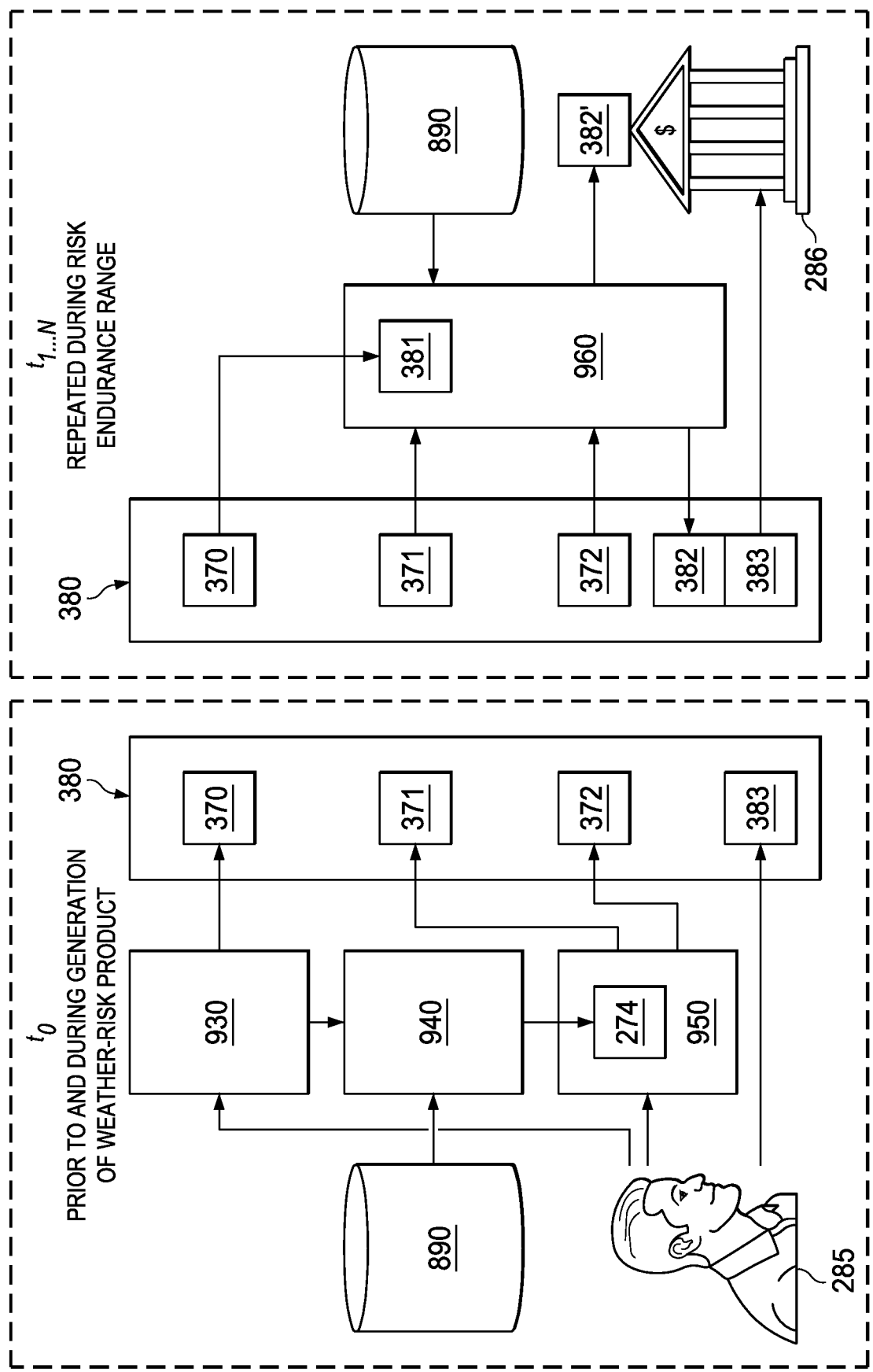
FIG. 3c is a schematic diagram and flow chart illustrating exemplary process flow and data flow according to one or more embodiments of the invention.

As can be shown with reference to the timeframe $t_0$ ("prior to and during generation of weather-risk product") in FIG. 3c, the weather risk product 380, being a record stored in the weather-risk product administrative database 1240, for example, can be structured so as to include data for the virtual weather-data-station parameters 370, weather-risk product risk parameters 371, and the weather-risk product contract parameters 372, which are unique to the user-customized weather risk product 380. The foregoing data can be written to the weather risk product 380 responsive to executed instructions within computer program product, for example, computer program products 930, 940, 950. The weather risk product 380 can also include data linking the weather-risk product to a unique weather-risk product identifier, for example, to allow the weather-risk product 380 to be associated with a user account and to facilitate the weather-risk product being processed for settlement.

Figure 15A:
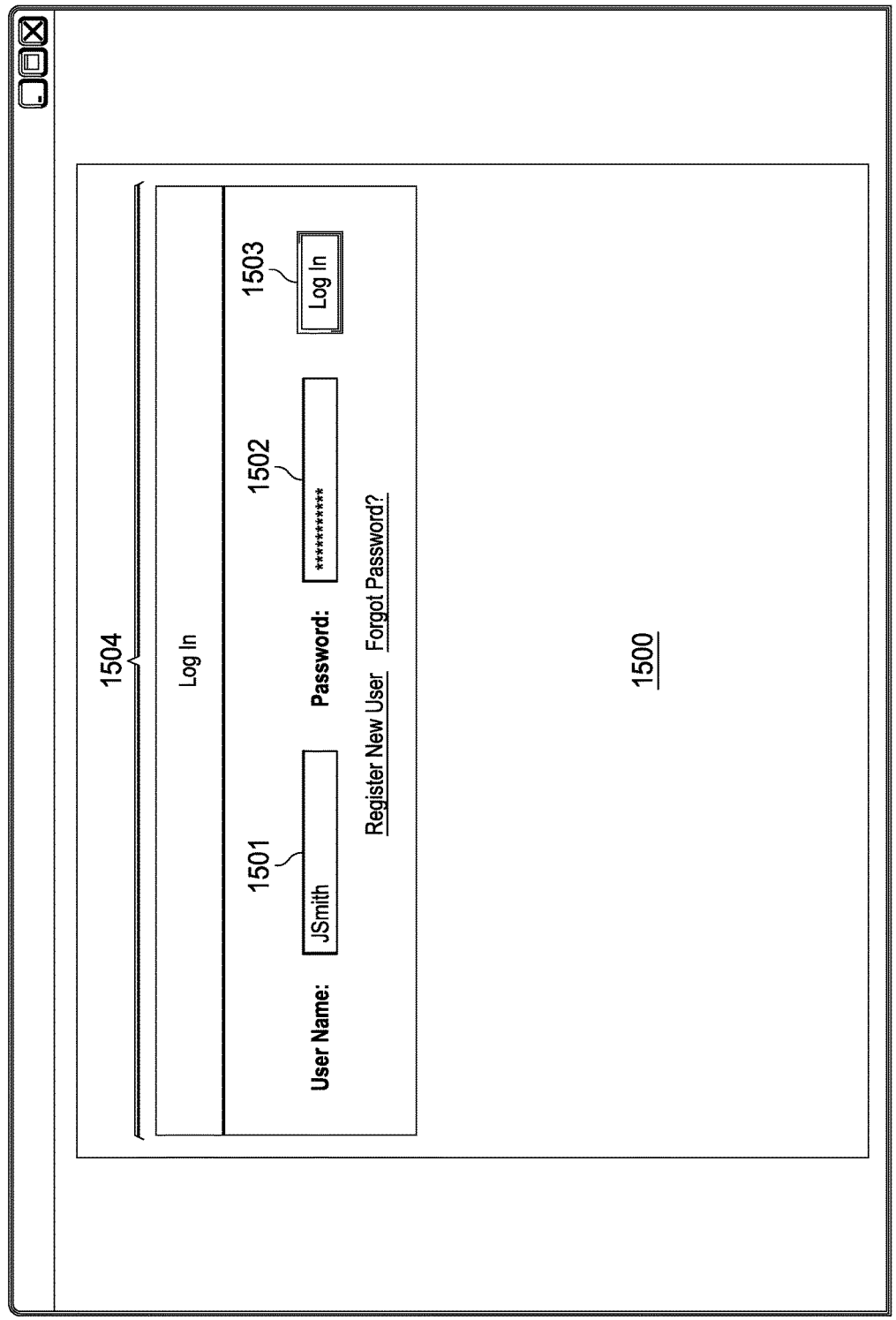
Figure 15D:
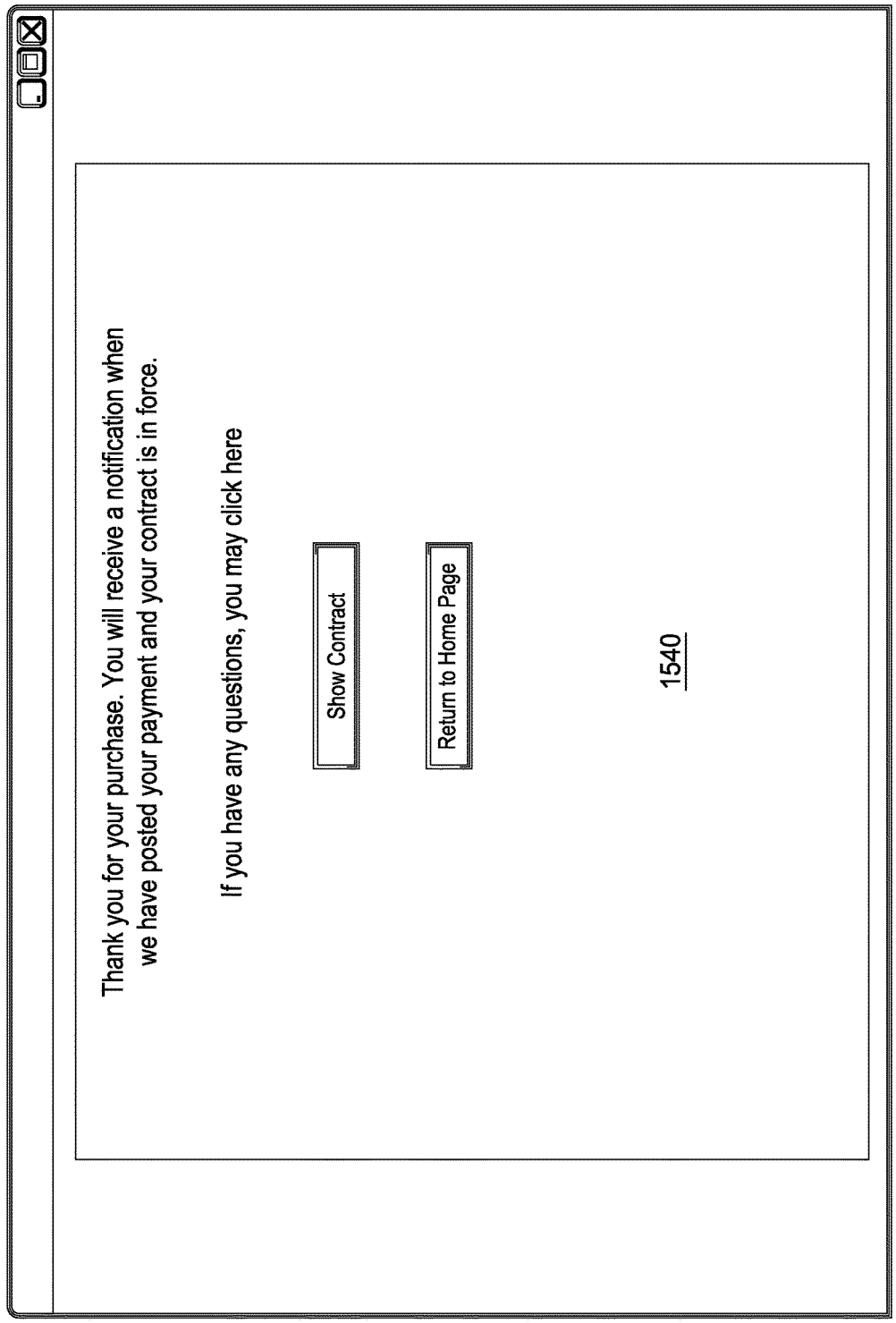
Figure 15F:
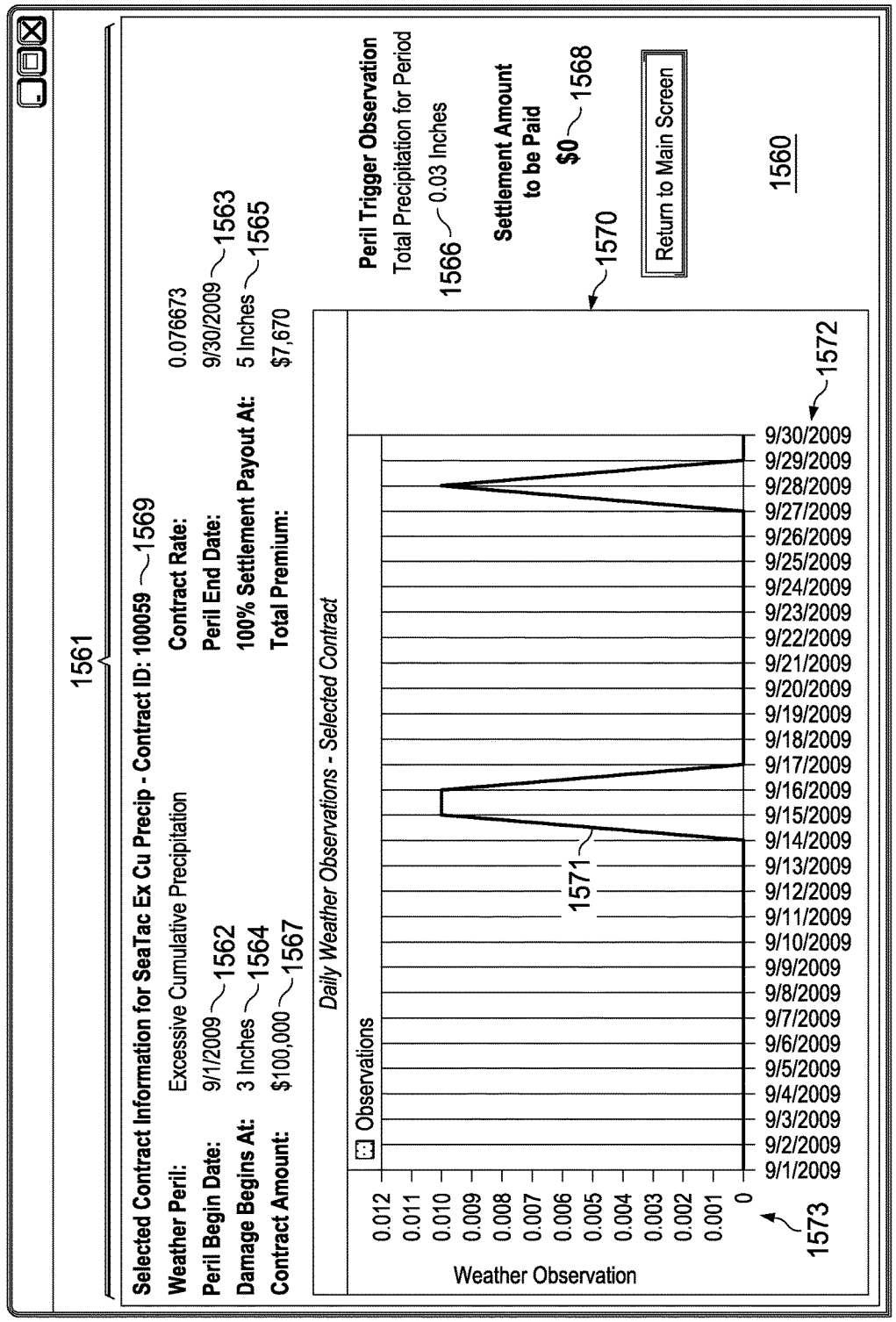

As can be shown with reference to FIG. 15b, weather risk products stored at the weather-risk product administrative database 1240, for example, can be listed at a weather-risk product inventory interface display 1520, which can be generated by the risk-product issuer computer 910, for example, and displayed on a display at the user computer 200. Three different weather-risk products are listed at the weather-risk product inventory interface display 1520, as can be identified by unique weather-risk product identifiers at location 1521 on the weather-risk product inventory interface display. As can be shown with reference to the column entitled "Contract", or more particularly, at processing status 1525, each of the weather-risk products listed can specify a processing status showing, for example, whether particular weather-risk products have been paid for by the purchasing user or whether there are settlements pending. Processing status 1525 can be a button, for example, allowing a user to enter payment or view settlement information. In addition to having a unique weather-risk product identifier 1523, each weather-risk product can also include a "friendly name," such as name 1524, so that the weather-risk product can be readily identifiable or recognizable to a user. As can be shown with reference to the location 1522, any data included in a weather risk product, such as the virtual weather-data-station parameters 370, weather-risk product risk parameters 371, and the weather-risk product contract parameters 372, can also be listed at the weather-risk product inventory interface display 1520. As will be appreciated by those having skill in the art, the foregoing description of the weather-risk product data displayed as a table of the weather-risk product inventory interface display 1520 is further descriptive of exemplary data structure for weather-risk products, such as weather risk product 380, being stored in a table at the weather-risk product administrative database 1240.

Processing status button 1525, when selected by a user at the user interface 200, can trigger the dynamic generation of a weather-risk product payment interface, for example, by the weather-risk product issuer computer 910, to displayed a weather-risk product payment interface display 1530 on a display of a user computer 200, as can be shown with reference to FIG. 15c. Weather-risk product payment interface display 1530 can include, for example, reference to the weather-risk product risk parameters 371, and the weather-risk product contract parameters 372 for a particular weather-risk product 380, as can be shown with reference to area 1531 of the weather-risk product payment interface display 1530 and identified, for example, by the weather-risk product identifier 1533. Weather-risk product payment interface display 1530 can also include, for example, reference to the virtual weather-data-station parameters 370 for the particular weather-risk product 380, as can be shown, for example, with reference to area 1532 of the weather-risk product payment interface display 1530. Also, as can be shown with reference to area 1531 of the weather-risk product payment interface display 1530, various payment options are available to the user, including electronic check, wire transfer, paper check, and a standing credit agreement. Various techniques known to those having skill in the art allow the risk-issuer computer 910 to generate a payment execution interface (not shown) to be displayed at the user computer 200 to allow the user at the user computer to execute payment via electronic check or wire transfer. Information regarding standing credit agreement can be stored and verified, for example, at the weather-risk product administrative database 1240. A user can transmit verification that a paper check has been manually submitted to the risk-product issuing entity, for example by selecting manual-payment confirmation button 1535 at the weather-risk product payment interface display 1530.

The weather risk product 380 can further include data linking the weather-risk product to an account 383, such as a user account for the tract user or a financial account for receiving premium payments and paying settlement payments by a user's financial institution 286, as can be shown with reference to FIG. 3c. Weather-risk products 333 being stored, for example, at the weather-risk product administrative database 1240 can be associated with a user account also stored at the weather-risk product administrative database 1240, for example, based on account authorization and authentication information (e.g., a user account identifier and a user account password) entered by the user at the user computer 200 and transmitted to the risk-product issuer computer 910, for example, and stored in the session database 1260 during the generation of the weather-risk product 333. Exemplary account authorization information 1501 and account authentication information 1502 (which can be masked for privacy at the user computer 200) can be entered by the user at the user computer 200 as can be shown with reference to user account login interface display 1500 as can be shown with reference to FIG. 15a. Exemplary account authorization information 1501 and account authentication information 1502 can be transmitted to the risk-product issuer computer 910, for example, upon selection by the user of the log-in button 1503, for example, using a cursor.

A settlement process can be programmatically performed, for example, pursuant to instructions by weather-risk product settlement processor program product 960, for example, instructions 1090-1091 stored in the memory 911 of the risk-product issuer computer 910, as can be shown with reference to FIGS. 9-10. Weather-risk product settlement processor program product 960 can include, for example, instructions 1090-1091, which, when executed by the processor 920, perform the operation of comparing 1090, at regular intervals, settlement data 279 to one or more weather-risk products stored in the database 270. The steps of comparing settlement data 279 to a particular weather-risk product, as can be shown with respect to the timeframe $t_{1 \ldots N}$ ("repeated during the risk endurance range") FIG. 3c, include, for example, the step of generating 1090A risk-product virtual settlement-weather data 381 from the settlement data 279 pursuant to the virtual weather-data-station parameters 370. And when the virtual settlement-weather data 381 satisfies criteria set forth by the weather-risk product risk parameters 371 and the weather-risk product contract parameters 372, a weather-risk event has occurred for that particular weather-risk product, and settlement 382 can be issued 1091 to the user account 383 responsive to the weather-risk product risk parameters 371 and the weather-risk product contract parameters 372. In certain embodiments having the user account 383 as a financial account at a financial institution 286, settlement 282' can be systematically issued directly to the financial institution 286, for example, according to electronic payment techniques known to those having skill in the art.

As can be shown with reference to FIG. 15e, processing status button 1551, when selected by a user at the user interface 200, can trigger the dynamic generation of a weather-risk product settlement interface, for example, by the weather-risk product issuer computer 910, to be displayed as a weather-risk product settlement interface display 1560 on a display of a user computer 200, as can be shown with reference to FIG. 15*e*. Weather-risk product settlement interface display 1560 can include, for example, reference to the weather-risk product risk parameters and the weather-risk product contract parameters for a particular weather-risk product, as can be shown with reference to area 1561 of the weather-risk product settlement interface display 1560 and identified, for example, by the weather-risk product identifier 1569. Weather-risk product settlement interface display 1560 can also include, for example, weather-risk product virtual settlement-weather data for the particular weather-risk product, as can be shown, for example, with reference to settlement weather chart 1570 of the weather-risk product settlement interface display 1560. Settlement weather chart 1570 can be a line plot chart having an x-axis 1572 representing an independent variable and a y-axis 1573 representing a dependent variable. In the settlement weather chart 1570, as is illustrated in FIG. 15*e*, the user-selected concern-type from the particular weather-risk product is the dependent variable and the observation date, within the user-selected risk endurance range for the particular weather-risk product, is the independent variable. The settlement weather chart 1570 includes a line plot 1571 representing weather readings in the virtual settlement-weather data, which correspond to the user-selected concern-type as it varies for each observation date.

Settlement weather chart 1570 shows the virtual settlement-weather data over the all or part of the user-selected risk endurance range. The line plot 1571 allows the user 285 to visualize the weather observations of the virtual settlement-weather data within the user-selected risk endurance range, and thereby better understand the actual effectiveness of a purchased weather-risk product, in particular, as to whether any weather observations within the virtual settlement-weather data triggers a settlement under the purchased weather-risk product. For example, the user 285 is able to readily determine from the settlement weather chart 1570 that, according to the customized contract terms and the user-selected weather-risk parameters, which are displayed in area 1561, whether the weather observations of the virtual settlement-weather data exceeded the user-selected damage onset, which is displayed to the user as "trigger observation" 1566.

Settlement weather chart 1570, which is described according to one particular embodiment herein, can also be implemented and displayed as is described with respect to the contract performance chart 749, except pertaining to the virtual settlement-weather data 381 instead of the timeframe-specific weather data 324. For example, such an implementation would allow the user 285 to visualize the compensation value, on an absolute basis, for the virtual settlement-weather data 381 and thereby better understand the actual effectiveness of the purchased weather-risk-product. Likewise, a settlement weather chart can be implemented and displayed as is described with respect to the historical weather chart 739, except pertaining to the virtual settlement-weather data 381 instead of the timeframe-specific weather data 324. Such an implementation, for example, would allow the user 285 to visualize how the virtual settlement-weather data intersects with the user-selected risk tolerance range, and thereby better understand the actual ongoing or final effectiveness of the purchased weather-risk product.

Although various embodiments of the present invention have been described mostly in terms of land tracts, the weather-risk product approach under various embodiments of the present invention is scalable and beneficially can be used to create weather-risk products applicable for any type of tract usage, including, for example, maritime oil and gas drilling or production operations.

It is also important to note that while embodiments of the present invention have been described in the context of a fully functional system, those skilled in the art will appreciate that the mechanism of at least portions of the present invention or aspects thereof are capable of being distributed in the form of a computer readable program product stored in a tangible computer medium and a computer readable medium of instructions in a variety of forms for execution on a processor, processors, or the like, and that the present invention applies equally regardless of the particular type of signal bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art. Examples of computer readable media include but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, HD-DVDs, mini disks, laser disks, Blu-ray disks, and other newer types of memories, and transmission type media such as digital and analog communication links. Also note that any of the computers or servers, such as computers 810, 830, 840, 850, 910, for example, described herein can be implemented not only as discrete computers or servers, but also as virtual computers or servers running on one or more machines implementing a virtualization scheme and having one or more non-transitory memory, input-output unit, and processor, as will be known to those having skill in the art. Furthermore, the non-transitory memory, input-output unit, or processor of the computers or servers described herein will be understood by those having skill in the art as not being limited to discrete apparatuses, for example, in a virtualization scheme; and two or more of the non-transitory memories, input-output units, or processors of the computers or servers described herein may be implemented by a one or more non-transitory memory, input-output unit, or processor, respectively.

The present application is a continuation of and claims priority to and benefit of U.S. patent application Ser. No. 14/055,329, titled "Systems, Computer Implemented Methods, Geographic Weather-Data Selection Interface Display, and Computer Readable Medium Having Program Products to Generate User-Customized Virtual Weather Data and User-Customized Weather-Risk Products Responsive Thereto, and filed Oct. 16, 2013, which is a continuation of U.S. patent application Ser. No. 13/540,436, titled "Systems, Computer Implemented Methods, Geographic Weather-Data Selection Interface Display, and Computer Readable Medium Having Program Products to Generate User-Customized Virtual Weather Data and User-Customized Weather-Risk Products Responsive Thereto" and filed Jul. 2, 2011, now U.S. Pat. No. 8,607,154, issued Dec. 10, 2013, which is a non-provisional application that relates to, claims priority to, and claims the benefit of U.S. Provisional Application Ser. No. 61/505,457, titled "Systems, Computer Implemented Methods, and Computer Readable Program Products to Generate User-Customized Virtual Weather Data and User-Customized Weather-Risk Products Responsive Thereto" and filed on Jul. 7, 2011, each of which is incorporated herein by reference in its entirety.

Moreover, the foregoing has broadly outlined certain objectives, features, and technical advantages of embodiments of the present invention and a detailed description of embodiments of the invention so that embodiments of the invention may be better understood in light of features and advantages of the invention as described herein, which form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages is better understood from the following description when considered in connection with the accompanying figures. It is to be expressly understood, however, that such description and figures are provided for the purpose of illustration and description only and are not intended as a definition of the limits of the present invention. It will be apparent to those skilled in the art that various modifications and changes can be made within the spirit and scope of the invention as described in the foregoing specification.

That claimed is:

1. A computer server for generation of a user customized weather-risk product for a selected geographic location, the computer server being positioned in communication with one or more weather-risk actuarial databases having weather-risk actuarial data associated therewith and one or more weather station databases having weather-station location data and weather-station historical data for each of a plurality of weather stations associated therewith for generating an enhanced weather data set including a simulated response to adverse or unexpected weather conditions, the computer server comprising:
  one or more processors;
  non-transitory memory positioned in communication with the one or more processors to store one or more computer programs therein;
  one or more input/output units in communication with the one or more processors and the non-transitory memory to receive inputs thereto and to transmit outputs therefrom, the one or more input/output units being adapted to be in communication with the one or more weather-risk actuarial databases and the one or more weather station databases;
  computer program, defining a virtual weather-data generator, stored in the non-transitory memory and operable on the one or more processors, the virtual weather-data generator having a set of instructions that, when executed by the one or more processors, cause the one or more processors to perform the following operations:
    generating virtual weather data responsive to a plurality of station-specific weather histories, each weather history of the plurality of station-specific weather histories being weighted by the user-selected weather-station weights for the respective weather-station and the corresponding weather readings for the respective weather-station; and
  computer program, defining a weather-risk-product generator, stored in the non-transitory memory and operable on the one or more processors, the weather-risk-product generator having a set of instructions that, when executed by the one or more processors, cause the one or more processors to perform the following operations:
    generating a weather-risk selection interface to display on one or more displays of one or more remote computer devices, thereby to allow for the selection of a plurality of user-selected weather-risk parameters,
    determining the timeframe-specific virtual weather data responsive to the virtual weather data and one or more of a plurality of user selected weather-risk parameters,
    determining a plurality of customized contract terms responsive to the user selected weather-risk parameters and timeframe-specific virtual weather data, and
    generating a weather-risk confirmation interface to display to the user at the one or more remote computer devices, responsive to the plurality of user-selected weather-risk parameters, timeframe-specific virtual weather data, and the plurality of customized contract terms a weather risk product, thereby to provide a simulated performance of the weather-risk product.

2. A computer server to facilitate generation of a user customized weather-risk product for a selected geographic location, the computer server being positioned in communication with one or more weather-risk actuarial databases having weather-risk actuarial data associated therewith and one or more weather station databases having weather-station location data and weather-station historical data for each of a plurality of weather stations associated therewith, the computer server comprising:
  one or more processors;
  non-transitory memory positioned in communication with the one or more processors to store one or more computer programs therein;
  one or more input/output units in communication with the one or more processors and the non-transitory memory to receive inputs thereto and to transmit outputs therefrom, the one or more input/output units being adapted to be in communication with the one or more weather-risk actuarial databases and the one or more weather station databases;
  computer program, defining a virtual weather-data-station-designer, stored in the non-transitory memory and operable on the one or more processors, the virtual weather-data-station designer having a set of instructions that, when executed by the one or more processors, cause the one or more processors to perform the following operations:
    generating a geographic weather-data selection interface to display on the one or more displays of the one or more remote computers so that the geographic weather-data selection interface includes a geographic map image corresponding to geographic coordinates and a plurality of weather-station markers overlaid on the geographic map image, each of the plurality of weather-station markers corresponding to a geographic location of an existing actual weather station and anchored to a specific position on the geographic map image so that the each of the plurality of weather-station markers appear to be at the same location on a simulated surface in the map image regardless of changes in scale and focus, and determining a plurality of weather-station identifiers responsive to receipt of the plurality of geographic parameters received from the geographic weather-data selection interface;

computer program, defining a virtual weather-data generator, stored in the non-transitory memory and operable on the one or more processors, the virtual weather-data generator having a set of instructions that, when executed by the one or more processors, cause the one or more processors to perform the following operations:

generating virtual weather data responsive to a plurality of station-specific weather histories, each weather history of the plurality of station-specific weather histories being weighted by the user-selected weather-station weights for the respective weather-station and the corresponding weather readings for the respective weather-station;

computer program, defining a weather-risk-product generator, stored in the non-transitory memory and operable on the one or more processors, the weather-risk-product generator having a set of instructions that, when executed by the one or more processors, cause the one or more processors to perform the following operations:

generating a weather-risk selection interface to display on the one or more displays of the one or more remote computer devices, thereby to allow for the selection of a plurality of user-selected weather-risk parameters, determining the timeframe-specific virtual weather data responsive to the virtual weather data and one or more of the plurality of user selected weather-risk parameters, determining a plurality of customized contract terms responsive to the user selected weather-risk parameters and the timeframe-specific virtual weather data, and generating a weather-risk confirmation interface to display to the user at the one or more remote computers, responsive to the plurality of user-selected weather-risk parameters, timeframe-specific virtual weather data, and plurality of customized contract terms a weather risk product, thereby to provide a simulated performance of the weather-risk product.

3. A computer server for generation of a user customized weather-risk product for a selected geographic location, the computer server being positioned in communication with one or more weather-risk actuarial databases having weather-risk actuarial data associated therewith and one or more weather station databases having weather-station location data and weather-station historical data for each of a plurality of weather stations associated therewith for developing a simulated response to adverse or unexpected weather conditions, the computer server comprising:

one or more processors;

non-transitory memory positioned in communication with the one or more processors to store one or more computer programs therein;

one or more input/output units in communication with the one or more processors and the non-transitory memory to receive inputs thereto and to transmit outputs therefrom, the one or more input/output units being adapted to be in communication with the one or more weather-risk actuarial databases and the one or more weather station databases and to transmit through a communications network to one or more graphical user interfaces of one or more displays associated with one or more remote computer devices and receive therefrom one or more user selections responsive thereto;

computer program, defining a virtual weather-data-station-designer, stored in the non-transitory memory and operable on the one or more processors, the virtual weather-data-station designer having a set of instructions that, when executed by the one or more processors, cause the one or more processors to perform the following operations:

generating a geographic weather-data selection interface to display on the one or more displays of the one or more remote computers so that the geographic weather-data selection interface includes a geographic map image corresponding to geographic coordinates and a plurality of weather-station markers overlaid on the geographic map image, each of the plurality of weather-station markers corresponding to a geographic location of an existing actual weather station and anchored to a specific position on the geographic map image so that the each of the plurality of weather-station markers appear to be at the same location on a simulated surface in the map image regardless of changes in scale and focus, the geographic weather-data selection interface configured to allow a user associated with the geographic weather-data selection interface to select a plurality of geographic parameters for the relevant geographic location on the geographic map image at one or more locations corresponding to one or more unique positions on the geographic map image, and determining a plurality of weather-station identifiers responsive to receipt of the plurality of geographic parameters received from the geographic weather-data selection interface, each of the plurality of weather station identifiers corresponding to the weather-station location data having a weather-station location adjacent the user-selected map area, thereby to be positioned for use as a key in a relational database to relate the each of the plurality of the weather station identifiers to one or more data records for the weather station corresponding to the each of the plurality of the weather-station identifiers;

computer program, defining a virtual weather-data generator, stored in the non-transitory memory and operable on the one or more processors, the virtual weather-data generator having a set of instructions that, when executed by the one or more processors, cause the one or more processors to perform the following operations:

generating virtual weather data responsive to a plurality of station-specific weather histories, each weather history of the plurality of station-specific weather histories being weighted by the user-selected weather-station weights for the respective weather-station and the corresponding weather readings for the respective weather-station reflecting user risk management need;

computer program, defining a weather-risk-product generator, stored in the non-transitory memory and operable on the one or more processors, the weather-risk-product generator having a set of instructions that, when executed by the one or more processors, cause the one or more processors to perform the following operations:
generating a weather-risk selection interface to display on the one or more displays of the one or more remote computer devices, thereby to allow for the selection of a plurality of user-selected weather-risk parameters, the weather-risk selection interface including a customized historical weather summary responsive to the virtual weather data during the user-selected risk endurance range,
determining the timeframe-specific virtual weather data responsive to the virtual weather data and one or more of the plurality of user selected weather-risk parameters,
determining a plurality of customized contract terms responsive to the user selected weather-risk parameters and the timeframe-specific virtual weather data, and
generating a weather-risk confirmation interface to display to the user at the one or more remote computers, responsive to the plurality of user-selected weather-risk parameters, timeframe-specific virtual weather data, and plurality of customized contract terms a weather risk product, thereby to provide a simulated performance of the weather-risk product.

* * * * *